(12) United States Patent
Kobayashi

(10) Patent No.: US 11,761,812 B2
(45) Date of Patent: Sep. 19, 2023

(54) MEASUREMENT METHOD, MEASUREMENT DEVICE, MEASUREMENT SYSTEM, AND MEASUREMENT PROGRAM

(71) Applicant: Seiko Epson Corporation, Toyko (JP)

(72) Inventor: Yoshihiro Kobayashi, Komagane (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/203,941

(22) Filed: Mar. 17, 2021

(65) Prior Publication Data
US 2021/0302222 A1   Sep. 30, 2021

(30) Foreign Application Priority Data
Mar. 18, 2020   (JP) .................................. 2020-047135

(51) Int. Cl.
*G01G 19/03*   (2006.01)
*G01H 17/00*   (2006.01)

(52) U.S. Cl.
CPC ............. *G01G 19/03* (2013.01); *G01H 17/00* (2013.01)

(58) Field of Classification Search
CPC .... G01G 19/03; G01G 19/021; G01G 19/024; G01G 3/12; G01H 17/00; G01H 1/00; G01M 5/0008; G01M 5/0066
See application file for complete search history.

(56) References Cited

U.S. PATENT DOCUMENTS

| 4,958,306 A * | 9/1990 | Powell ...................... G01C 7/04 73/146 |
| 7,668,692 B2 | 2/2010 | Tatom et al. |

(Continued)

FOREIGN PATENT DOCUMENTS

| JP | 2009-237805 A | 10/2009 |
| JP | 2017-003556 A | 1/2017 |

(Continued)

OTHER PUBLICATIONS

Xiang-rong Yuan "Acceleration Integration Method for Calculating Dynamic Deflection of Bridge"; Article Code 1671-4229 (2007) 01-0052-04; vol. 6, No. 1; Published by School of Civil Engineering, Guangzhou University, Guangzhou 510006, China; dated Feb. 2007 (total 16 pages).

*Primary Examiner* — Stephanie E Bloss
(74) *Attorney, Agent, or Firm* — Harness, Dickey & Pierce, P.L.C.

(57) ABSTRACT

A measurement method includes: a step of acquiring first observation point information including a time point when each part of a moving object passes a first observation point and a physical quantity which is a response to an action; a step of acquiring second observation point information including a time point when the each part passes a second observation point and a physical quantity which is a response to an action; a step of calculating a deflection waveform of a structure generated by the each part; a step of adding the deflection waveforms to calculate a moving object deflection waveform, and calculating a path deflection waveform based on the moving object deflection waveform; a step of calculating a displacement waveform by twice integrating an acceleration of a third observation point; and a step of calculating, based on the path deflection waveform, a value of each coefficient of a polynomial approximating an integration error, and correcting the displacement waveform based on the value of each coefficient.

19 Claims, 28 Drawing Sheets

(56) References Cited

U.S. PATENT DOCUMENTS

| | | | |
|---|---|---|---|
| 8,094,922 B2* | 1/2012 | Lee | G01B 11/2518 |
| | | | 382/141 |
| 10,139,308 B2 | 11/2018 | Kobayashi | |
| 10,198,640 B2 | 2/2019 | Kobayashi | |
| 10,620,085 B2* | 4/2020 | Zhang | G01H 1/14 |
| 10,768,145 B2 | 9/2020 | Kobayashi | |
| 10,788,320 B2* | 9/2020 | Takada | G06T 7/0002 |
| 10,830,652 B2 | 11/2020 | Irie | |
| 2006/0137914 A1 | 6/2006 | Hodac | |
| 2009/0024336 A1 | 1/2009 | Tatom et al. | |
| 2009/0303469 A1* | 12/2009 | Lee | G06T 7/521 |
| | | | 356/237.2 |
| 2012/0173171 A1 | 7/2012 | Bajwa et al. | |
| 2016/0171309 A1* | 6/2016 | Hay | A61B 5/0077 |
| | | | 348/143 |
| 2017/0038307 A1* | 2/2017 | Ohta | G01N 21/88 |
| 2017/0097278 A1 | 4/2017 | Kobayashi | |
| 2017/0098127 A1* | 4/2017 | Kobayashi | G01P 15/00 |
| 2017/0184471 A1 | 6/2017 | Kobayashi | |
| 2017/0184550 A1 | 6/2017 | Kobayashi | |
| 2018/0067637 A1 | 3/2018 | Hay | |
| 2018/0149554 A1 | 5/2018 | Kim et al. | |
| 2018/0224352 A1 | 8/2018 | Zhang et al. | |
| 2018/0348064 A1 | 12/2018 | Irie et al. | |
| 2019/0025813 A1 | 1/2019 | Cella et al. | |
| 2019/0121348 A1* | 4/2019 | Celia | G06F 18/2178 |
| 2019/0212141 A1* | 7/2019 | Takada | G01B 11/16 |
| 2019/0212223 A1 | 7/2019 | Kusaka et al. | |
| 2020/0247392 A1 | 8/2020 | Omori | |
| 2020/0363287 A1 | 11/2020 | Kinoshita et al. | |
| 2021/0293604 A1 | 9/2021 | Kobayashi | |
| 2021/0293605 A1 | 9/2021 | Kobayashi | |
| 2021/0293657 A1 | 9/2021 | Kobayashi | |
| 2021/0302222 A1 | 9/2021 | Kobayashi | |
| 2021/0304597 A1 | 9/2021 | Kobayashi | |
| 2022/0136927 A1 | 5/2022 | Takada | |
| 2022/0261511 A1 | 8/2022 | Umekawa et al. | |
| 2022/0291078 A1 | 9/2022 | Kobayashi | |

FOREIGN PATENT DOCUMENTS

| | | |
|---|---|---|
| JP | 2017-020796 A | 1/2017 |
| JP | 2018-031187 A | 3/2018 |
| JP | 2018-066637 A | 4/2018 |
| JP | 2019-049095 A | 3/2019 |
| JP | 6809691 B2 | 1/2021 |
| KR | 101163764 B1 | 7/2012 |
| WO | 2020-194539 A1 | 10/2020 |

* cited by examiner

FIG. 6

| VEHICLE NUMBER | LANE NUMBER | AXLE NUMBER | ENTRY TIME POINT | ACCELERATION INTENSITY AT ENTRY TIME POINT | EXIT TIME POINT | ACCELERATION INTENSITY AT EXIT TIME POINT |
|---|---|---|---|---|---|---|
| 1 | 2 | 1 | ti11 | pai11 | to11 | pao11 |
| 1 | 2 | 2 | ti12 | pai12 | to12 | pao12 |
| 1 | 2 | 3 | ti13 | pai13 | to13 | pao13 |
| 1 | 2 | 4 | ti14 | pai14 | to14 | pao14 |
| 2 | 1 | 1 | ti21 | pai21 | to21 | pao21 |
| 2 | 1 | 2 | ti22 | pai22 | to22 | pao22 |
| 3 | 1 | 1 | ti31 | pai31 | to31 | pao31 |
| 3 | 1 | 2 | ti32 | pai32 | to32 | pao32 |
| ⋮ | | | | | | |

MEASUREMENT METHOD, MEASUREMENT DEVICE, MEASUREMENT SYSTEM, AND MEASUREMENT PROGRAM

The present application is based on, and claims priority from JP Application Serial Number 2020-047135, filed Mar. 18, 2020, the disclosure of which is hereby incorporated by reference herein in its entirety.

BACKGROUND

1. Technical Field

The present disclosure relates to a measurement method, a measurement device, a measurement system, and a measurement program.

2. Related Art

In maintaining and managing a bridge, an axle load of a large vehicle passing through a bridge is important information for predicting damage to the bridge. For axle load measurement, JP-A-2009-237805 proposes weight in motion, which is a method of continuously measuring a strain value when the vehicle passes from a strain gauge installed on a main girder of the bridge and calculating the axle load. JP-A-2009-237805 discloses a bridge-passing vehicle monitoring system that measures a vehicle weight of a vehicle passing through a bridge based on a strain waveform measured by a strain gauge arranged on a main girder of the bridge.

Specifically, in the bridge-passing vehicle monitoring system, the strain gauge is arranged on the main girder for each driving lane, a passage timing of the axle is detected based on the strain waveform measured by the strain gauge, an inter-axle ratio of the vehicle is calculated, the calculated inter-axle ratio is compared with an inter-axle ratio calculated based on an inter-axle distance registered in an inter-axle distance database, and the inter-axle distance, a vehicle speed, and a vehicle type of the vehicle are identified. The bridge-passing vehicle monitoring system generates a strain waveform in which a reference axle load strain waveform is arranged on a time axis according to the passage timing of the axle, and calculates the axle load of each axle by comparing the reference axle load strain waveform with a strain waveform measured by the strain gauge. Then, the bridge-passing vehicle monitoring system calculates the vehicle weight by summing the axle loads of each axle.

In the system described in JP-A-2009-237805, although by using the strain waveform and the inter-axis distance database, the vehicle weight of the vehicle can be measured without measuring a displacement of the bridge, cost and labor for strain gauge installation are large since it is necessary to install a strain gauge. For example, the cost of the system can be reduced by replacing the strain gauge with an accelerometer such as an acceleration sensor. However, when the displacement of the bridge is calculated by twice integrating an acceleration value detected by the accelerometer, since the calculated displacement includes a large integration error due to an offset error of the acceleration value and the like, it is difficult to calculate the displacement with high accuracy.

SUMMARY

A measurement method according to a first aspect of the present disclosure includes: a first observation point information acquisition step of acquiring, based on observation information obtained by an observation device that observes, among a first observation point, a second observation point, and a third observation point between the first observation point and the second observation point of a structure which are arranged along a first direction in which a moving object moves along a path of the structure, the first observation point, first observation point information including a time point when each of a plurality of parts of the moving object passes the first observation point and a physical quantity which is a response to an action of each of the plurality of parts on the first observation point; a second observation point information acquisition step of acquiring, based on observation information obtained by an observation device that observes the second observation point, second observation point information including a time point when each of the plurality of parts passes the second observation point and a physical quantity which is a response to an action of each of the plurality of parts on the second observation point; a deflection waveform calculation step of calculating, based on the first observation point information, the second observation point information, a predetermined coefficient, and an approximate expression of deflection of the structure, a deflection waveform of the structure generated by each of the plurality of parts; a path deflection waveform calculation step of adding the deflection waveforms of the structure generated by the plurality of parts which are calculated in the deflection waveform calculation step, calculating a moving object deflection waveform which is a deflection waveform of the structure generated by the moving object, and calculating a path deflection waveform based on the moving object deflection waveform; a displacement waveform calculation step of acquiring an acceleration of the third observation point based on observation information obtained by an observation device that observes the third observation point, and calculating a displacement waveform of the third observation point by twice integrating the acquired acceleration; and a displacement waveform correction step of calculating, based on the path deflection waveform calculated in the path deflection waveform calculation step, a value of each coefficient of a polynomial approximating an integration error when the acceleration is twice integrated in the displacement waveform calculation step, and correcting the displacement waveform based on the calculated value of each coefficient.

In the measurement method according to the first aspect, in the displacement waveform correction step, the value of each coefficient of the polynomial may be calculated assuming that a difference between the displacement waveform and the polynomial is approximately proportional to the path deflection waveform.

In the measurement method according to the first aspect, in the displacement waveform correction step, a value of a proportional coefficient and the value of each coefficient of the polynomial may be calculated by a least square method, such that a difference between a waveform obtained by multiplying the proportional coefficient by the path deflection waveform and a waveform obtained by subtracting the polynomial from the displacement waveform is minimized.

In the measurement method according to the first aspect, the polynomial may be a quadratic polynomial in which a value of a primary term coefficient and a value of a zero-order term coefficient are zero, and in the displacement waveform correction step, a value of a proportional coefficient and a value of a secondary term coefficient of the polynomial may be calculated by a least square method, such that a difference between a waveform obtained by multiplying the proportional coefficient by the path deflection waveform and a waveform obtained by subtracting the polynomial from the displacement waveform is minimized.

In the measurement method according to the first aspect, in the displacement waveform correction step, a value of each coefficient of a first quadratic polynomial may be calculated, such that a waveform obtained by adding the first quadratic polynomial to a first difference between a waveform obtained by multiplying a first proportional coefficient and the path deflection waveform and the displacement waveform is minimized, a value of each coefficient of a second quadratic polynomial may be calculated, such that a waveform obtained by adding the second quadratic polynomial to a second difference between a waveform obtained by multiplying a second proportional coefficient and the path deflection waveform and the displacement waveform is minimized, a first sum of values, each being obtained by adding the first difference to a secondary term of the first quadratic polynomial, in a period in which the displacement waveform is calculated may be calculated, a second sum of values, each being obtained by adding the second difference to a secondary term of the second quadratic polynomial, in a period in which the displacement waveform is calculated may be calculated, a third proportional coefficient at which a sum is 0 is calculated based on a relationship of the first proportional coefficient, the second proportional coefficient, the first sum, and the second sum, and a value of each coefficient of a third quadratic polynomial may be calculated, such that a waveform obtained by adding the third quadratic polynomial to a third difference between a waveform obtained by multiplying the third proportional coefficient and the path deflection waveform and the displacement waveform is minimized, and the displacement waveform may be corrected based on the value of each of the coefficients of the third quadratic polynomial.

In the measurement method according to the first aspect, in the displacement waveform correction step, a value of each coefficient of a first quadratic polynomial may be calculated, such that a waveform obtained by adding the first quadratic polynomial to a first difference between a waveform obtained by multiplying a first proportional coefficient and the path deflection waveform and the displacement waveform is minimized, a value of each coefficient of a second quadratic polynomial may be calculated, such that a waveform obtained by adding the second quadratic polynomial to a second difference between a waveform obtained by multiplying a second proportional coefficient and the path deflection waveform and the displacement waveform is minimized, a first sum of values, each being obtained by adding a first difference to a first quadratic polynomial, in a period in which an amplitude of the path displacement waveform is not zero may be calculated, a second sum of values, each being obtained by adding a second difference to a second quadratic polynomial, in a period in which an amplitude of the path displacement waveform is not zero may be calculated, a third proportional coefficient at which a sum is 0 is calculated based on a relationship of the first proportional coefficient, the second proportional coefficient, the first sum, and the second sum, and a value of each coefficient of a third quadratic polynomial may be calculated, such that a waveform obtained by adding the third quadratic polynomial to a third difference between a waveform obtained by multiplying the third proportional coefficient and the path deflection waveform and the displacement waveform is minimized, and the displacement waveform may be corrected based on the value of each of the coefficients of the third quadratic polynomial.

In the measurement method according to the first aspect, the polynomial is a quadratic polynomial, and in the displacement waveform correction step, the value of each coefficient of the polynomial may be calculated such that a difference between the displacement waveform and the polynomial is minimized in a period in which an amplitude of the path displacement waveform is zero.

In the measurement method according to the first aspect, in the displacement waveform calculation step, an acceleration may be acquired in a direction intersecting a surface of the structure on which the moving object moves.

In the measurement method according to the first aspect, an approximate expression of deflection of the structure may be an expression based on a structural model of the structure.

In the measurement method according to the first aspect, the structural model may be a simple beam whose both ends are supported.

In the measurement method according to the first aspect, an approximate expression of deflection of the structure may be an expression normalized by a maximum amplitude of deflection at a central position between the first observation point and the second observation point.

In the measurement method according to the first aspect, an approximate expression of deflection of the structure may be an expression of a sinusoidal half-wave waveform.

In the measurement method according to the first aspect, the structure may be a superstructure of a bridge, the superstructure may be a structure across any one of a bridge abutment and a bridge pier adjacent to each other, two adjacent bridge abutments, or two adjacent bridge piers, both end portions of the superstructure may be located at positions of the bridge abutment and the bridge pier adjacent to each other, at positions of the two adjacent bridge abutments, or at positions of the two adjacent bridge piers, and the bridge may be a road bridge or a railway bridge.

In the measurement method according to the first aspect, the first observation point may be set at a first end portion of the structure, and the second observation point may be set at a second end portion of the structure which is different from the first end portion.

In the measurement method according to the first aspect, the moving object may be a railway vehicle, an automobile, a tram, a construction vehicle, or a military vehicle, and each of the plurality of parts may be an axle or a wheel.

In the measurement method according to the first aspect, the observation device that observes the first observation point, the observation device that observes the second observation point, and the observation device that observes the third observation point may be acceleration sensors.

In the measurement method according to the first aspect, the observation device that observes the first observation point, and the observation device that observes the second observation point may be impact sensors, microphones, strain gauges, or load cells.

In the measurement method according to the first aspect, the structure may be a structure in which Bridge Weigh in Motion (BWIM) functions.

A measurement device according to a second aspect of the present disclosure includes: a first observation point information acquisition unit that acquires, based on observation information obtained by an observation device that observes, among a first observation point, a second observation point, and a third observation point between the first observation point and the second observation point of a structure which are arranged along a first direction in which a moving object moves along a path of the structure, the first observation point, first observation point information including a time point when each of a plurality of parts of the moving object passes the first observation point and a physical quantity which is a response to an action of each of the plurality of parts on the first observation point; a second observation point information acquisition unit that acquires, based on observation information obtained by an observation device that observes the second observation point, second observation point information including a time point when each of the plurality of parts passes the second observation point and a physical quantity which is a response to an action of each of the plurality of parts on the second observation point; a deflection waveform calculation unit that calculates, based on the first observation point information, the second observation point information, a predetermined coefficient, and an approximate expression of deflection of the structure, a deflection waveform of the structure generated by each of the plurality of parts; a path deflection waveform calculation unit that adds the deflection waveforms of the structure generated by the plurality of parts which are calculated by the deflection waveform calculation unit, calculates a moving object deflection waveform which is a deflection waveform of the structure generated by the moving object, and calculates a path deflection waveform based on the moving object deflection waveform; a displacement waveform calculation unit that acquires an acceleration of the third observation point based on observation information obtained by an observation device that observes the third observation point, and calculates a displacement waveform of the third observation point by twice integrating the acquired acceleration; and a displacement waveform correction unit that calculates, based on the path deflection waveform calculated by the path deflection waveform calculation unit, a value of each coefficient of a polynomial approximating an integration error when the acceleration is twice integrated by the displacement waveform calculation unit and corrects the displacement waveform based on the calculated value of each coefficient.

A measurement system according to a third aspect of the present disclosure includes: the measurement device according to the second aspect; the observation device that observes the first observation point, the observation device that observes the second observation point, and the observation device that observes the third observation point.

A non-transitory computer-readable medium according to a fourth aspect of the present disclosure stores a measurement program that causes a computer to execute: a first observation point information acquisition step of acquiring, based on observation information obtained by an observation device that observes, among a first observation point, a second observation point, and a third observation point between the first observation point and the second observation point of a structure which are arranged along a first direction in which a moving object moves along a path of the structure, the first observation point, first observation point information including a time point when each of a plurality of parts of the moving object passes the first observation point and a physical quantity which is a response to an action of each of the plurality of parts on the first observation point; a second observation point information acquisition step of acquiring, based on observation information obtained by an observation device that observes the second observation point, second observation point information including a time point when each of the plurality of parts passes the second observation point and a physical quantity which is a response to an action of each of the plurality of parts on the second observation point; a deflection waveform calculation step of calculating, based on the first observation point information, the second observation point information, a predetermined coefficient, and an approximate expression of deflection of the structure, a deflection waveform of the structure generated by each of the plurality of parts; a path deflection waveform calculation step of adding the deflection waveforms of the structure generated by the plurality of parts which are calculated in the deflection waveform calculation step, calculating a moving object deflection waveform which is a deflection waveform of the structure generated by the moving object, and calculating a path deflection waveform based on the moving object deflection waveform; a displacement waveform calculation step of acquiring an acceleration of the third observation point based on observation information obtained by an observation device that observes the third observation point, and calculating a displacement waveform of the third observation point by twice integrating the acquired acceleration; and a displacement waveform correction step of calculating, based on the path deflection waveform calculated in the path deflection waveform calculation step, a value of each coefficient of a polynomial approximating an integration error when the acceleration is twice integrated in the displacement waveform calculation step, and correcting the displacement waveform based on the calculated value of each coefficient.

BRIEF DESCRIPTION OF THE DRAWINGS

FIG. 6 is a diagram showing an example of axle information.

DESCRIPTION OF EXEMPLARY EMBODIMENTS

Hereinafter, embodiments of the present disclosure will be described in detail with reference to the drawings. The embodiments described below do not in any way limit contents of the present disclosure described in the appended claims. Not all configurations described below are necessarily essential components of the present disclosure.

1. First Embodiment 1-1 Measurement System

Hereinafter, a measurement system for implementing a measurement method according to the present embodiment will be described by taking a case where a structure is a superstructure of a bridge and a moving object is a vehicle as an example. The vehicle passing through the bridge according to the present embodiment is a vehicle having a large weight such as a railroad vehicle, an automobile, a tram, a construction vehicle, or a military vehicle, and can be measured by bridge weigh in motion (BWIM). The BWIM is a technology that uses a bridge as a "scale" and that measures the weight and the number of axles of the vehicle passing through the bridge by measuring deformation of the bridge. The superstructure of the bridge, which enables analysis of the weight of the vehicle passing by based on a response such as deformation and strain, is a structure in which the BWIM functions. A BWIM system, which applies a physical process between an action on the superstructure of the bridge and the response, enables the measurement of the weight of the vehicle passing by.

Figure 1:
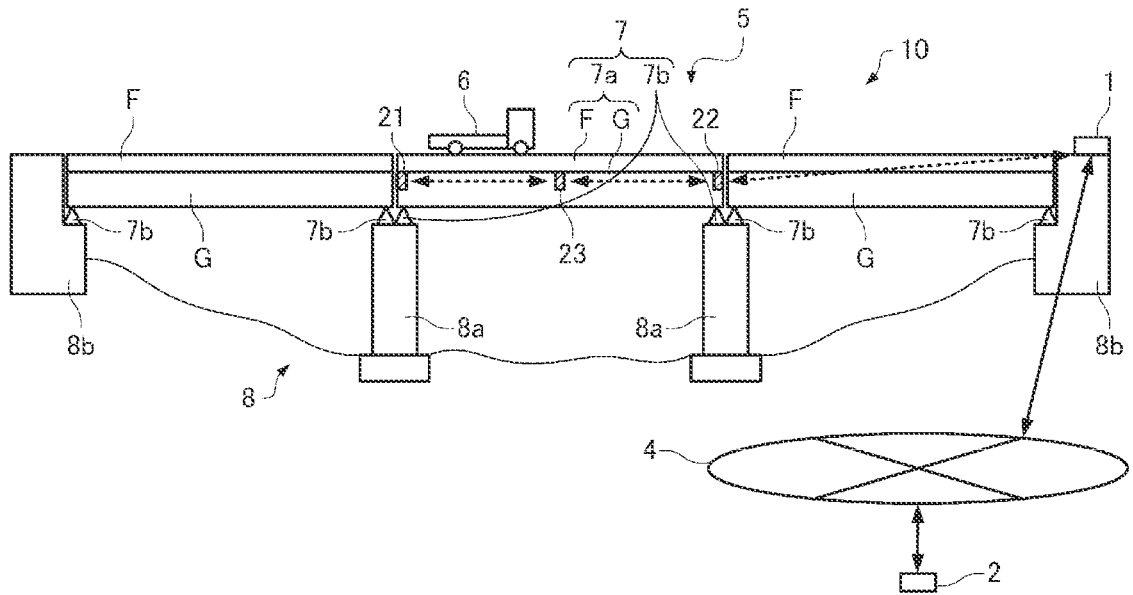
FIG. 1 is a diagram showing a configuration example of a measurement system.

FIG. 1 is a diagram showing an example of a measurement system according to the present embodiment. As shown in FIG. 1, a measurement system 10 according to the present embodiment includes a measurement device 1, and at least one sensor 21, at least one sensor 22, and at least one sensor 23 which are provided on a superstructure 7 of a bridge 5. The measurement system 10 may include a server 2.

The bridge 5 is formed of the superstructure 7 and a substructure 8. The superstructure 7 includes a bridge floor 7a formed of a floor plate F, a main girder G, and a cross girder which is not shown, and bearings 7b. The substructure 8 includes bridge piers 8a and bridge abutments 8b. The superstructure 7 is a structure across any one of the bridge abutment 8b and the bridge pier 8a adjacent to each other, two adjacent bridge abutments 8b, or two adjacent bridge piers 8a. Both end portions of the superstructure 7 are located at positions of the bridge abutment 8b and the bridge pier 8a adjacent to each other, at positions of the two adjacent bridge abutments 8b, or at positions of the two adjacent bridge piers 8a.

The measurement device 1 and the sensors 21, 22, and 23 are coupled by, for example, a cable which is not shown and communicate with one another via a communication network such as a controller area network (CAN). Alternatively, the measurement device 1 and the sensors 21, 22, and 23 may communicate with one another via a wireless network.

For example, each sensor 21 outputs data representing an impact caused by entry of the vehicle 6 which is a moving object to the superstructure 7. Each sensor 22 outputs data representing an impact caused by exit of the vehicle 6 from the superstructure 7. For example, each sensor 23 outputs data for calculating a displacement of the superstructure 7 due to the movement of the vehicle 6 which is the moving object. In the present embodiment, each of the sensors 21, 22, and 23 is an acceleration sensor, and may be, for example, a crystal acceleration sensor or a micro electro mechanical systems (MEMS) acceleration sensor.

In the present embodiment, each sensor 21 is installed at a first end portion of the superstructure 7 in a longitudinal direction. Each sensor 22 is installed at a second end portion of the superstructure 7 which is different from the first end portion in the longitudinal direction.

Each sensor 21 detects an acceleration generated when the vehicle 6 enters the superstructure 7. Each sensor 22 detects the acceleration generated when the vehicle 6 exits the superstructure 7. That is, in the present embodiment, each sensor 21 is an acceleration sensor that detects the entry of the vehicle 6 to the superstructure 7. Each sensor 22 is an acceleration sensor that detects the exit of the vehicle 6 from the superstructure 7.

Each sensor 23 is installed at a position of a central portion in the longitudinal direction. Each sensor 23 only needs to be able to detect an acceleration for calculating the displacement of the superstructure 7, and an installation position of the sensor 23 is not limited to the central portion of the superstructure 7.

The floor plate F, the main girder G, and the like of the superstructure 7 are deformed downward and bent in a vertical direction by a load of the vehicle 6 traveling on the superstructure 7. Each sensor 23 detects the acceleration of the bending of the floor plate F and the main girder G due to the load of the vehicle 6 traveling on the superstructure 7.

The measurement device 1 calculates the displacement of the bending of the superstructure 7 due to the traveling of the vehicle 6 based on acceleration data output from the sensors 21, 22, and 23.

The measurement device 1 and the server 2 can communicate with each other via, for example, a wireless network of a mobile phone and a communication network 4 such as the Internet. The measurement device 1 transmits, to the server 2, information such as a time point when the vehicle 6 travels on the superstructure 7 and the displacement of the superstructure 7 due to the traveling of the vehicle 6. The server 2 may store the information in a storage device which is not shown, and may perform, based on the information, processing such as monitoring of an overloaded vehicle or determination of an abnormality in the superstructure 7.

In the present embodiment, the bridge 5 is a road bridge, for example, a steel bridge, a girder bridge, or a reinforced-concrete (RC) bridge.

Figure 2:
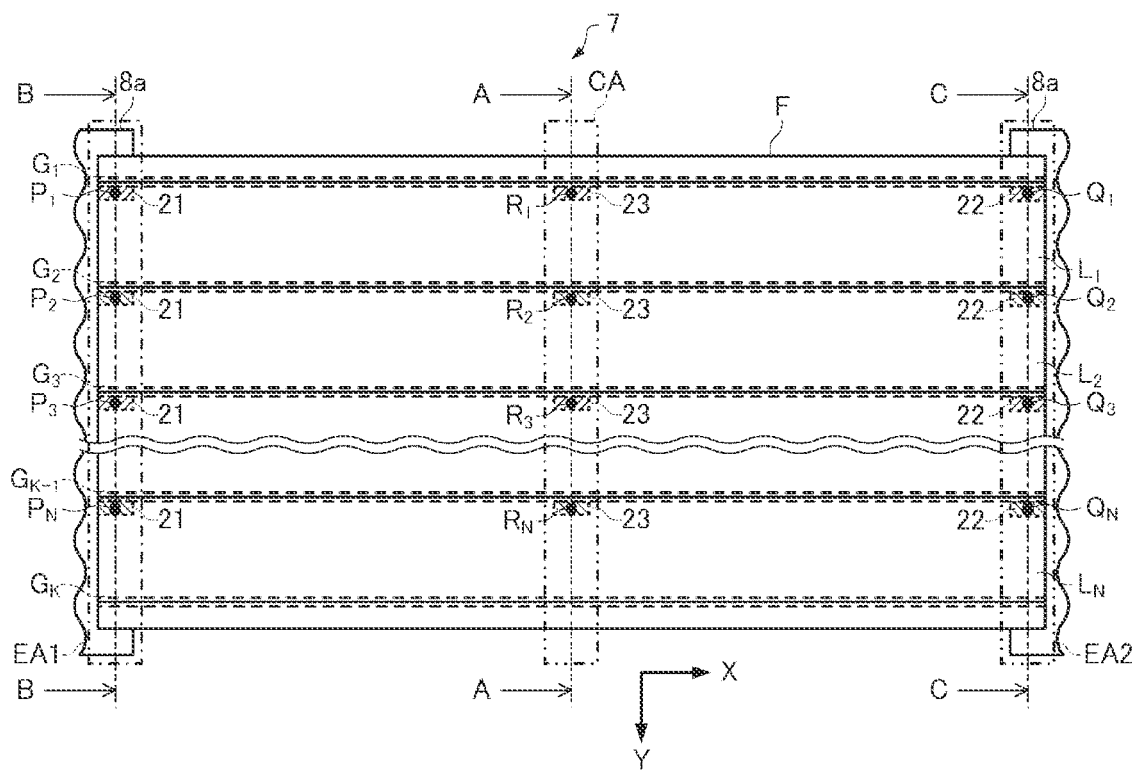
FIG. 2 is a diagram showing an arrangement example of sensors and observation points.
Figure 3:
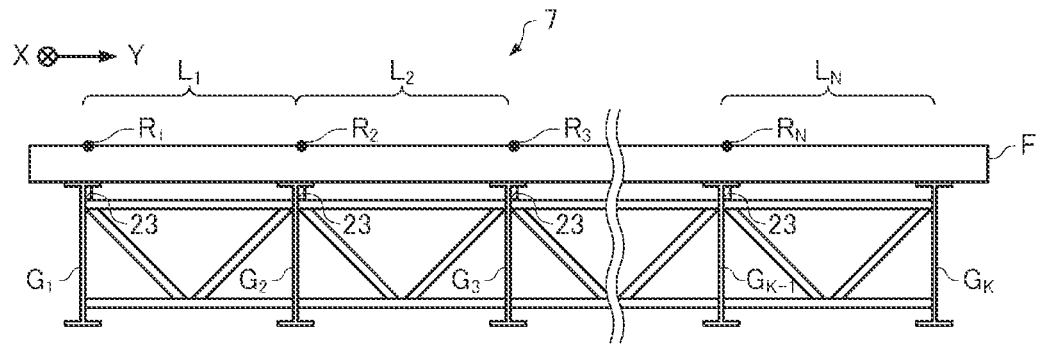
FIG. 3 is a diagram showing an arrangement example of the sensors and the observation points.
Figure 4:
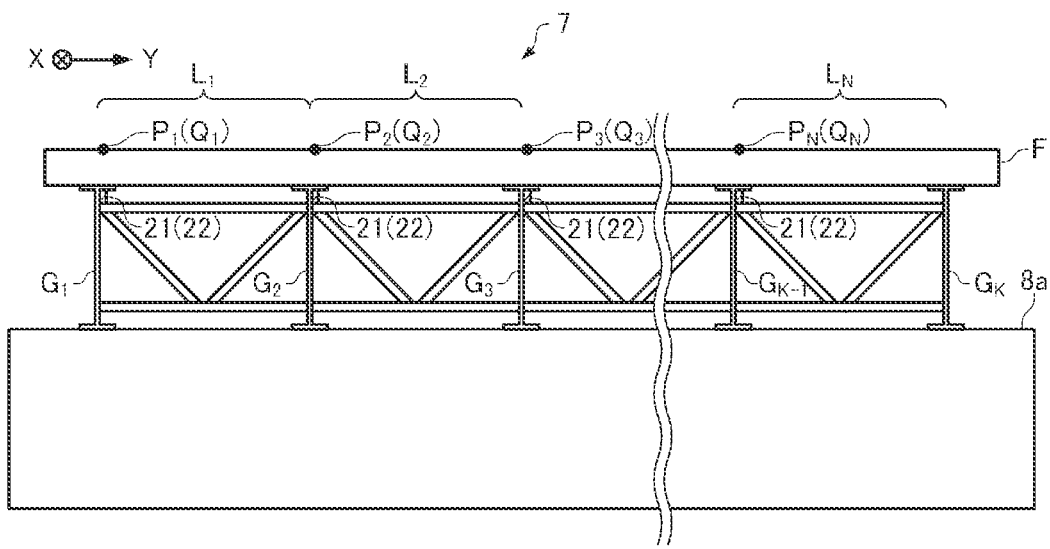
FIG. 4 is a diagram showing an arrangement example of the sensors and the observation points.

FIGS. 2, 3, and 4 are diagrams showing installation examples of the sensors 21, 22, and 23 on the superstructure 7. FIG. 2 is a diagram of the superstructure 7 as viewed from above. FIG. 3 is a cross-sectional view of FIG. 2 cut along a line A-A. FIG. 4 is a cross-sectional view of FIG. 2 cut along a line B-B line or a line C-C.

As shown in FIGS. 2, 3, and 4, the superstructure 7 has N lanes $L_1$ to $L_N$ and K main girders $G_1$ to $G_K$ as first to N-th paths through which the vehicle 6, which is the moving object, can move. Here, N and K are integers of 1 or more. In examples shown in FIGS. 2, 3, and 4, each position of the main girders $G_1$ to $G_K$ coincides with a position of each boundary between the lanes $L_1$ to $L_N$, and $N=K-1$. Alternatively, each position of the main girders $G_1$ to $G_K$ does not have to coincide with the position of each boundary between the lanes $L_1$ to $L_N$, and $N \neq K-1$.

In the examples shown in FIGS. 2, 3, and 4, the sensor 21 is provided on each of the main girders $G_1$ to $G_{K-1}$ at a first end portion EA1 of the superstructure 7 in the longitudinal direction. The sensor 22 is provided on each of the main girders $G_1$ to $G_{K-1}$ at a second end portion EA2 of the superstructure 7 in the longitudinal direction. The sensor 23 is provided on each of the main girders $G_1$ to $G_{K-1}$ at a predetermined position between the first end portion EA1 and the second end portion EA2 of the superstructure 7 in the longitudinal direction. In the examples shown in FIGS. 2, 3, and 4, $N=K-1$, and the sensors 21, 22, and 23 are not provided on the main girder $G_K$. Alternatively, the sensors 21, 22, and 23 may be provided on the main girder $G_K$, and the sensors 21, 22, and 23 may not be provided on any one of the main girders $G_1$ to $G_{K-1}$. Alternatively, $N=K$, and the sensors 21, 22, and 23 may be provided on the main girders $G_1$ to $G_K$.

When the sensors 21, 22, and 23 are provided on the floor plate F of the superstructure 7, the sensors may be destroyed by a traveling vehicle, and measurement accuracy may be affected by local deformation of the bridge floor 7a. Therefore, in the examples shown in FIGS. 2, 3 and 4, the sensors 21, 22 and 23 are provided on the main girders $G_1$ to $G_{K-1}$ of the superstructure 7.

In the present embodiment, N observation points $P_1$ to $P_N$ are set in association with the N sensors 21. The observation points $P_1$ to $P_N$ are N observation points of the superstructure 7 arranged along a second direction intersecting a first direction in which the vehicle 6 moves on the superstructure 7. In the examples shown in FIGS. 2, 3 and 4, for each integer j of 1 or more and N or less, an observation point $P_j$ is set at a position of a surface of the floor plate F in a vertically upward direction of the sensor 21 provided on a main girder $G_j$ at the first end portion EA1. That is, the sensor 21 provided on the main girder $G_j$ is an observation device that observes the observation point P The sensor 21 that observes the observation point P may be provided at a position where the acceleration generated at the observation point $P_j$ due to the traveling of the vehicle 6 can be detected, and it is desirable that the sensor 21 is provided at a position close to the observation point $P_1$. In this way, the observation points $P_1$ to $P_N$ have a one-to-one relationship with the N sensors 21.

In the present embodiment, N observation points $Q_1$ to $Q_N$ are set in association with the N sensors 22. The observation points $Q_1$ to $Q_N$ are N observation points of the superstructure 7 arranged along a third direction intersecting the first direction in which the vehicle 6 moves on the superstructure 7. In the examples shown in FIGS. 2, 3 and 4, for each integer j of 1 more and N or less, an observation point $Q_j$ is set at a position on the surface of the floor plate F in a vertically upward direction of the sensor 22 provided on the main girder $G_j$ at the second end portion EA2. That is, the sensor 22 provided on the main girder G is an observation device that observes the observation point $Q_1$. The sensor 22 that observes the observation point $Q_j$ may be provided at a position where the acceleration generated at the observation point $Q_j$ due to the traveling of the vehicle 6 can be detected, and it is desirable that the sensor 22 is provided at a position close to the observation point $Q_1$. In this way, the observation points $Q_1$ to $Q_N$ have a one-to-one relationship with the N sensors 22.

In the present embodiment, N observation points $R_1$ to $R_N$ are set in association with the N sensors 23. The observation points $R_1$ to $R_N$ are N observation points of the superstructure 7 arranged along a fourth direction intersecting the first direction in which the vehicle 6 moves on the superstructure 7. In the examples shown in FIGS. 2, 3 and 4, for each integer j of 1 or more and N or less, an observation point $R_j$ is set at a position on the surface of the floor plate F in a vertically upward direction of the sensor 23 provided on the main girder $G_j$ at the central portion CA. That is, the sensor 23 provided on the main girder $G_j$ is an observation device that observes the observation point $R_j$. The sensor 23 that observes the observation point R may be provided at a position where the acceleration generated at the observation point $R_j$ due to the traveling of the vehicle 6 can be detected, and it is desirable that the sensor 23 is provided at a position close to the observation point $R_j$. In this way, the observation points $R_1$ to $R_N$ have a one-to-one relationship with the N sensors 23.

In the present embodiment, N observation points $P_1$ to $P_N$ are associated with the lanes $L_1$ to $L_N$, respectively. Similarly, N observation points $Q_1$ to $Q_N$ are associated with the lanes $L_1$ to $L_N$, respectively. Similarly, N observation points $R_1$ to $R_N$ are associated with the lanes $L_1$ to $L_N$, respectively. For each integer j of 1 or more and N or less, the observation point $P_j$, the observation point $Q_j$, and the observation point $R_j$ between the observation point $P_j$ and the observation point $Q_j$, which are set in association with the lane $L_j$, are arranged along the first direction in which the vehicle 6 moves along the lane $L_j$ of the superstructure 7. In the examples shown in FIGS. 2, 3 and 4, the first direction is an X direction along the lanes $L_1$ to $L_N$ of the superstructure 7, that is, the longitudinal direction of the superstructure 7. The second direction, the third direction, and the fourth direction are a Y direction orthogonal to the X direction in a traveling surface of the superstructure 7 on which the vehicle 6 travels, that is, a width direction of the superstructure 7. However, when the lanes $L_1$ to $L_N$ are curved, the second direction, the third direction, and the fourth direction do not have to coincide with one another. The second direction, the third direction, and the fourth direction do not have to be orthogonal to the first direction. For example, a distance from an end of the superstructure 7 on a side where the vehicle 6 enters to the observation points $P_1$ to $P_N$ and a distance from an end of the superstructure 7 on a side where the vehicle 6 exits to the observation points $Q_1$ to $Q_N$ may be different. For example, distances from one end of the superstructure 7 to the observation points $R_1$ to $R_N$ may be different. For each integer j of 1 or more and N or less, the observation point $P_j$ is an example of a "first observation point", the observation point $Q_j$ is an example of a "second observation point", and the observation point $R_j$ is an example of a "third observation point".

The number and installation positions of the N sensors 21, 22 and 23 are not limited to the examples shown in FIGS. 2, 3 and 4, and various modifications can be made.

The measurement device 1 acquires, based on acceleration data output from each of the sensors 21, 22, and 23, an acceleration in a fifth direction which intersects the X direction, which is the first direction, and the Y direction, which is the second direction, the third direction, and the fourth direction. The observation points $P_1$ to $P_N$ and $Q_1$ to $Q_N$ are displaced by the impact in a direction orthogonal to the X and Y directions, and the observation points $R_1$ to $R_N$ bend in the direction orthogonal to the X and Y directions. Therefore, in order to accurately calculate a magnitude of the impact and a magnitude of the acceleration of the bending, it is desirable for the measurement device 1 to acquire the acceleration in the fifth direction orthogonal to the X and the Y directions, that is, in a normal direction of the floor plate F.

Figure 5:
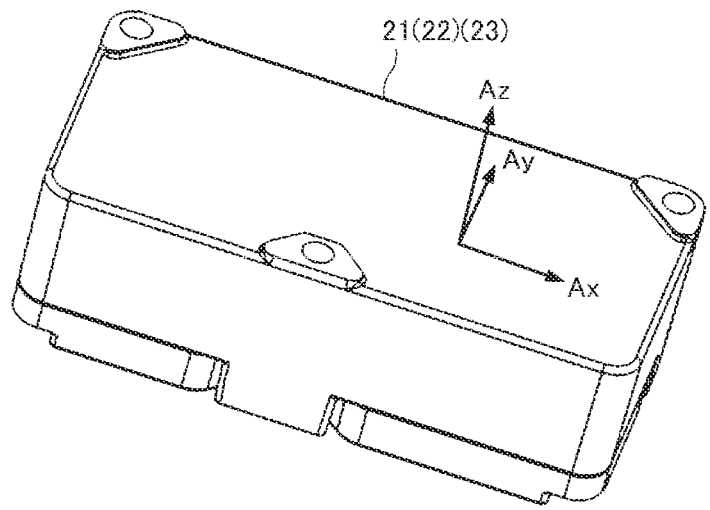
FIG. 5 is a diagram illustrating an acceleration detected by an acceleration sensor.

FIG. 5 is a diagram illustrating the acceleration detected by the sensors 21, 22, and 23. The sensors 21, 22, and 23 are acceleration sensors that detect the accelerations generated in the three axes orthogonal to one another.

In order to detect the impact applied to the observation points $P_1$ to $P_N$ due to the entry of the vehicle 6 to the superstructure 7, each sensor 21 is installed such that one of three detection axes, which are an x axis, an y axis, and a z axis, intersects the first direction and the second direction. Similarly, in order to detect the impact applied to the observation points $Q_1$ to $Q_N$ due to the exit of the vehicle 6 from the superstructure 7, each sensor 22 is installed such that one of the three detection axes, which are the x axis, the y axis, and the z axis, intersects the first direction and the third direction. In order to detect the acceleration of the bending at the observation points $R_1$ to $R_N$ due to the traveling of the vehicle 6, each sensor 23 is installed such that one of the three detection axes, which are the x axis, the y axis, and the z axis, intersects the first direction and the fourth direction. In the examples shown in FIGS. 2, 3, and 4, since the first direction is the X direction, the second direction, the third direction, and the fourth direction are the Y direction, the sensors 21, 22, and 23 are installed such that one axis intersects the X direction and the Y direction. The observation points $P_1$ to $P_N$ and $Q_1$ to $Q_N$ are displaced by the impact in the direction orthogonal to the X direction and the Y direction. Therefore, in order to accurately detect the magnitude of the impact, ideally, the sensors 21 and 22 are installed such that one axis is in the direction orthogonal to the X direction and the Y direction, that is, the normal direction of the floor plate F. Further, the observation points $R_1$ to $R_N$ bend in the direction orthogonal to the X direction and the Y direction. Therefore, in order to accurately detect the acceleration of the bending, ideally, the sensors 23 are installed such that one axis is in the direction orthogonal to the X direction and the Y direction, that is, the normal direction of the floor plate F.

However, when the sensors 21, 22, and 23 are installed on the superstructure 7, an installation location may be inclined. In the measurement device 1, even if one of the three detection axes of each of the sensors 21, 22, and 23 is not installed in the normal direction of the floor plate F, since the direction is substantially oriented in the normal direction, an error is small and thus can be ignored. The measurement device 1 can correct a detection error due to the inclination of the sensors 21, 22, and 23 by a three-axis combined acceleration that combines the accelerations in the x axis, the y axis, and the z axis even if one of the three detection axes of each of the sensors 21, 22, and 23 is not installed in the normal direction of the floor plate F. Each of the sensors 21, 22 and 23 may be a one-axis acceleration sensor that detects the acceleration generated in a direction at least substantially parallel to the vertical direction or the acceleration in the normal direction of the floor plate F.

Hereinafter, details of the measurement method according to the present embodiment executed by the measurement device 1 will be described.

1-2 Generation of Axle Information

In the present embodiment, the measurement device 1 acquires, based on the acceleration data, which is observation information obtained by the N sensors 21 as the observation device, first observation point information including a time point when each of a plurality of parts of the vehicle 6 which is the moving object passes the observation point $P_j$ and a physical quantity which is a response to an action of each of the plurality of parts on the observation point $P_j$. Similarly, in the present embodiment, the measurement device 1 acquires, based on the acceleration data, which is observation information by the N sensors 22 as the observation device, second observation point information including a time point when each of the plurality of parts of the vehicle 6 passes the observation point $Q_j$ and a physical quantity which is a response to an action of each of the plurality of parts on the observation point $Q_j$. Here, j is an integer of 1 or more and N or less.

In the present embodiment, it is considered that the load generated by a plurality of axles or wheels of the vehicle 6 is applied to the superstructure 7. Accordingly, each of the plurality of parts for which the first observation point information and the second observation point information are to be acquired is an axle or a wheel. Hereinafter, in the present embodiment, it is assumed that each of the plurality of parts is an axle.

In the present embodiment, each sensor 21, which is the acceleration sensor, detects the acceleration due to the action of each of the plurality of axles on the observation point $P_j$. Similarly, each sensor 22, which is the acceleration sensor, detects the acceleration due to the action of each of the plurality of axles on the observation point $Q_j$.

In the present embodiment, as shown in FIG. 2, the observation points $P_1$ to $P_N$ are set at the first end portion EA1, and the observation points $Q_1$ to $Q_N$ are set at the second end portion EA2. Therefore, the time point when each of the plurality of axles of the vehicle 6 passes the observation point $P_j$ can be regarded as an entry time point of each axle to the superstructure 7 and, more specifically, an entry time point to the lane $L_j$. The time point when each of the plurality of axles of the vehicle 6 passes the observation point $Q_j$ can be regarded as an exit time point of each axle from the superstructure 7, and more specifically, an exit time point from the lane $L_j$.

Therefore, in the present embodiment, the first observation point information includes an entry time point of each axle of the vehicle 6 to the lane $L_j$ and acceleration intensity as a physical quantity that is the response to the action when each axle enters the lane $L_j$. The second observation point information includes an exit time point of each axle of the vehicle 6 from the lane $L_j$ and acceleration intensity as a physical quantity that is the response to the action when each axle exits the lane $L_j$.

Further, since the entry and exit of the each axle of the vehicle 6 correspond to each other, each vehicle and each axle can be stratified based on the first observation point information and the second observation point information. The first observation point information, the second observation point information, and stratified information thereof are collectively referred to as the axle information.

That is, in addition to the first observation point information and the second observation point information, the axle information includes correspondence information on the entry time point to the lane L and the acceleration intensity at the time of entry, the exit time point from the lane $L_j$ and the acceleration intensity at the time of exit for each axle, and correspondence information between the vehicle 6 and the above corresponding information for each axle. Therefore, with the axle information, for each vehicle 6 passing through the superstructure 7, the time points when each axle passes the lane $L_j$ and the observation points $P_j$ and $Q_j$, and the acceleration intensities at the time of passing are identified.

FIG. 6 shows an example of the axle information. In the example in FIG. 6, information in first to fourth rows is information related to the vehicle 6 whose vehicle number is 1. Information in the first row is information related to a first axle whose axle number is 1. Information in the second row is information related to a second axle whose axle number is 2. Information in the third row is information related to a third axle whose axle number is 3. Information in the fourth row is information related to a fourth axle whose axle number is 4. For example, the correspondence information in the first row shows that, for the leading axle, whose axle number is 1, of the vehicle 6 whose vehicle number is 1, the entry time point to the lane $L_2$ is ti11, the acceleration intensity at the time of the entry is pai11, the exit time point from the lane $L_2$ is to11, and the acceleration intensity at the time of the exit is pao11.

Information in fifth and sixth rows is information related to the vehicle 6 whose vehicle number is 2. The information in the fifth row is the correspondence information related to the first axle whose axle number is 1. The information in the sixth row is the correspondence information related to the second axle whose axle number is 2. For example, the correspondence information in the fifth row shows that, for the leading axle, whose axle number is 1, of the vehicle 6 whose vehicle number is 2, the entry time point to the lane $L_1$ is ti21, the acceleration intensity at the time of the entry is pai21, the exit time from the lane $L_1$ is to21, and the acceleration intensity at the time of the exit is pao21.

Information in seventh and eighth rows is information related to the vehicle 6 whose vehicle number is 3. The information in the seventh row is the correspondence information related to the first axle whose axle number is 1. The information in the eighth row is the correspondence information related to the second axle whose axle number is 2. For example, the correspondence information in the seventh row shows that, for the leading axle, whose axle number is 1, of the vehicle 6 whose vehicle number is 3, the entry time point to the lane $L_1$ is ti31, the acceleration intensity at the time of the entry is pai31, the exit time point from the lane $L_1$ is to31, and the acceleration intensity at the time of the exit is pao31.

Figure 8:
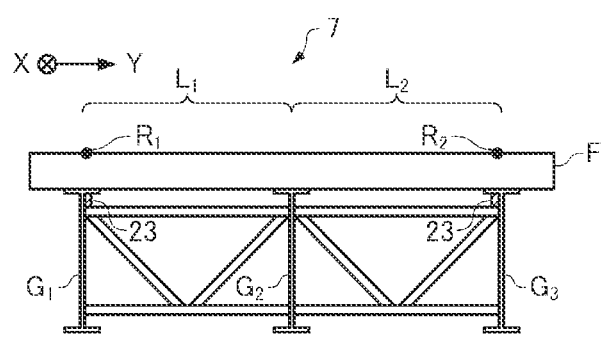
FIG. 8 is a diagram showing the arrangement example of the sensors and the observation points.
Figure 9:
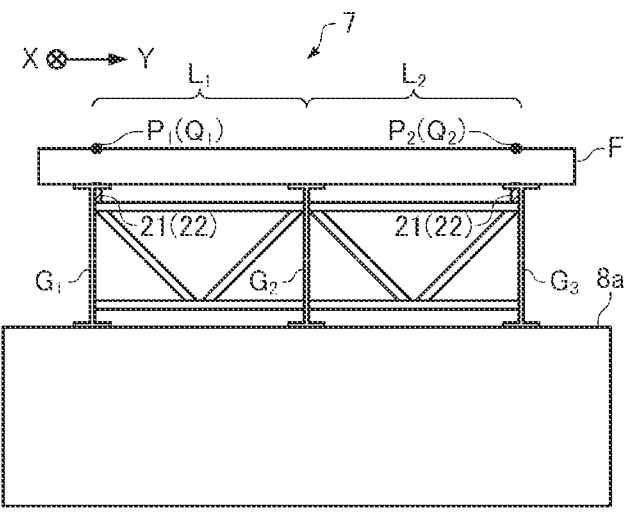
FIG. 9 is a diagram showing the arrangement example of the sensors and the observation points.

As an example, in the case of the arrangement examples shown in FIGS. 7, 8 and 9, in which arrangement examples of the sensors 21 and 22 and the observation points $P_1$, $P_2$, $Q_1$, and $Q_2$ when N=2 are shown, a procedure of generating the axle information by the measurement device 1 will be described.

Figure 7:
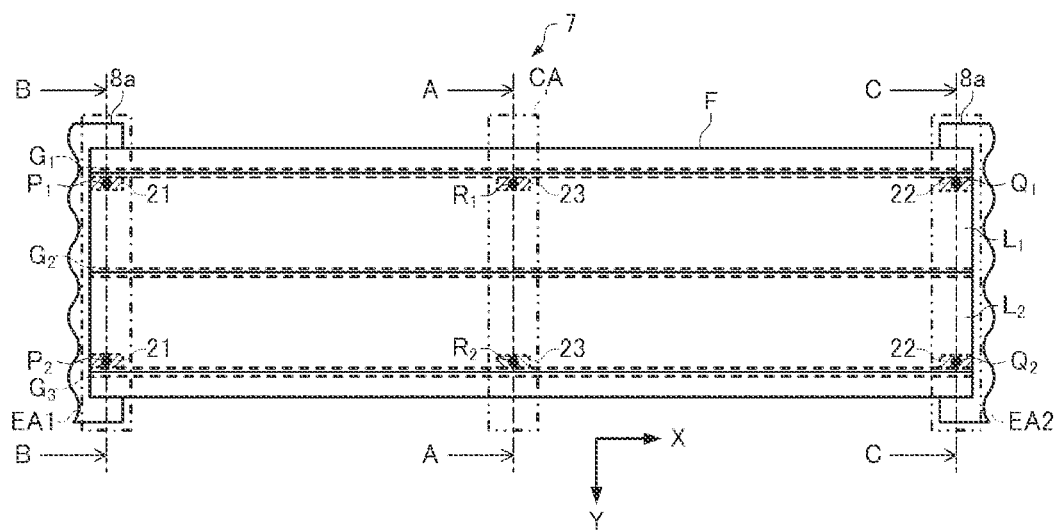
FIG. 7 is a diagram showing an arrangement example of the sensors and the observation points.

FIG. 7 is a diagram of the superstructure 7 as viewed from above. FIG. 8 is a cross-sectional view of FIG. 7 taken along a line A-A. FIG. 9 is a cross-sectional view of FIG. 7 taken along a line B-B line or a line C-C. In the examples shown in FIGS. 7, 8, and 9, two sensors 21 are provided respectively on the main girders $G_1$ to $G_3$ at the first end portion EA1 of the superstructure 7. Two sensors 22 are provided respectively on the main girders $G_1$ to $G_3$ at the second end portion EA2 of the superstructure 7. Observation points $P_1$ and $Q_1$ corresponding to the lane $L_1$ are set respectively at positions on the surface of the floor plate F in the vertically upward direction of the sensors 21 and 22 provided on the main girders $G_1$. Observation points $P_2$ and $Q_2$ corresponding to the lane $L_2$ are set respectively at positions on the surface of the floor plate F in the vertically upward direction of the sensors 21 and 22 provided on the main girders $G_3$. The sensor 21 provided on the main girder $G_1$ observes the observation point $P_1$. The sensor 21 provided on the main girder $G_3$ observes the observation point $P_2$. The sensor 22 provided on the main girder $G_1$ observes the observation point $Q_1$. The sensor 22 provided on the main girder $G_3$ observes the observation point $Q_2$. Further, two sensors 23 are provided respectively on the main girders $G_1$ and $G_3$ at the central portion CA of the superstructure 7. The observation point $R_1$ corresponding to the lane $L_1$ is set at a position on the surface of the floor plate F in the vertically upward direction of the sensor 23 provided on the main girder $G_1$. The observation point $R_2$ corresponding to the lane $L_2$ is set at a positions on the surface of the floor plate F in the vertically upward direction of the sensor 23 provided on the main girder $G_3$. The sensor 23 provided on the main girder $G_1$ observes the observation point $R_1$. The sensor 23 provided on the main girder $G_3$ observes the observation point $R_2$.

In order to generate the axle information, the measurement device 1 converts the acceleration at each time point detected by each of the sensors 21 and 22 into an amplitude, and acquires the acceleration intensity. The acceleration detected by the sensor 23 is not used for acquiring of the axle information.

Figure 10:
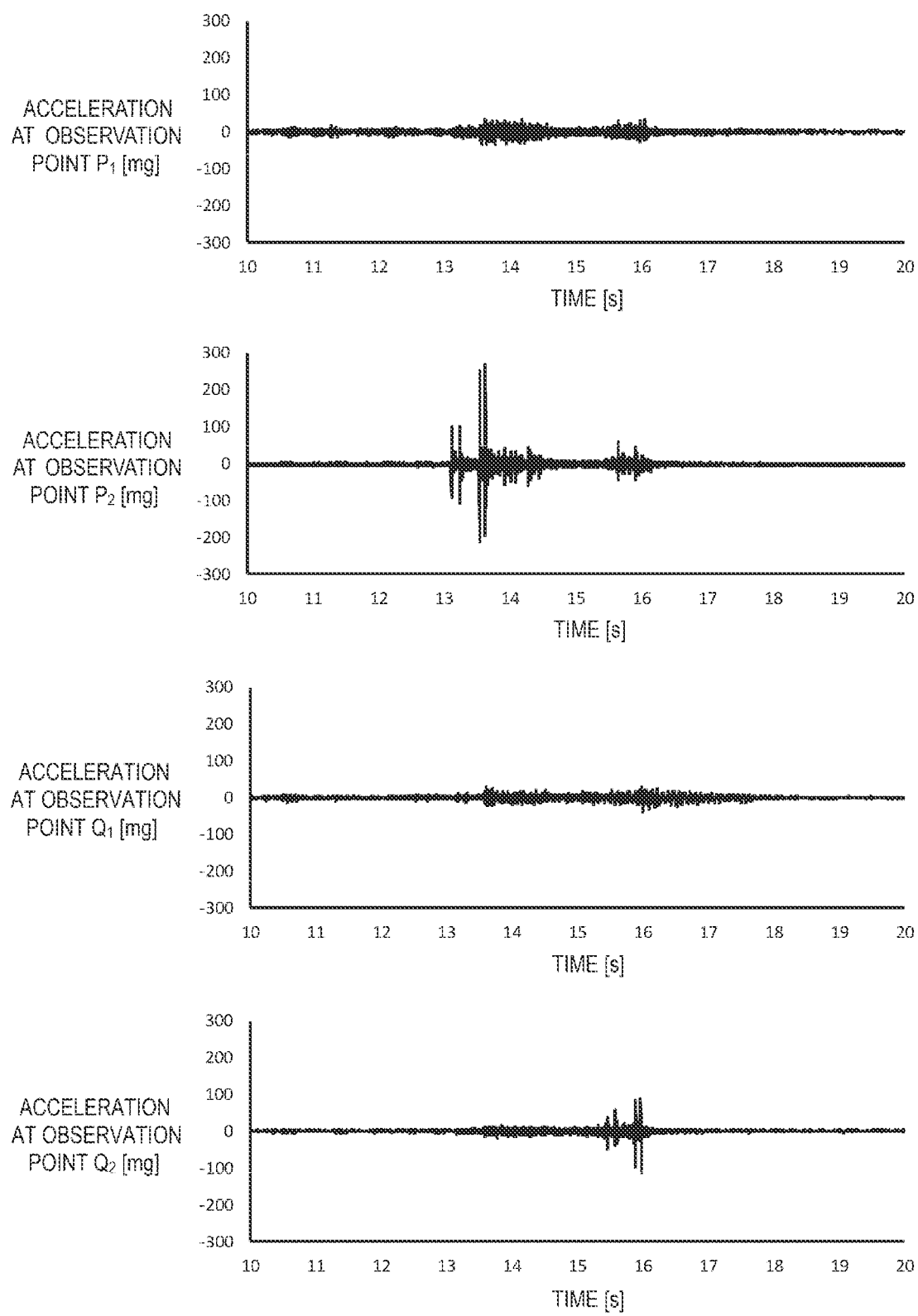
FIG. 10 shows diagrams showing examples of an acceleration detected with respect to an observation point.
Figure 11:
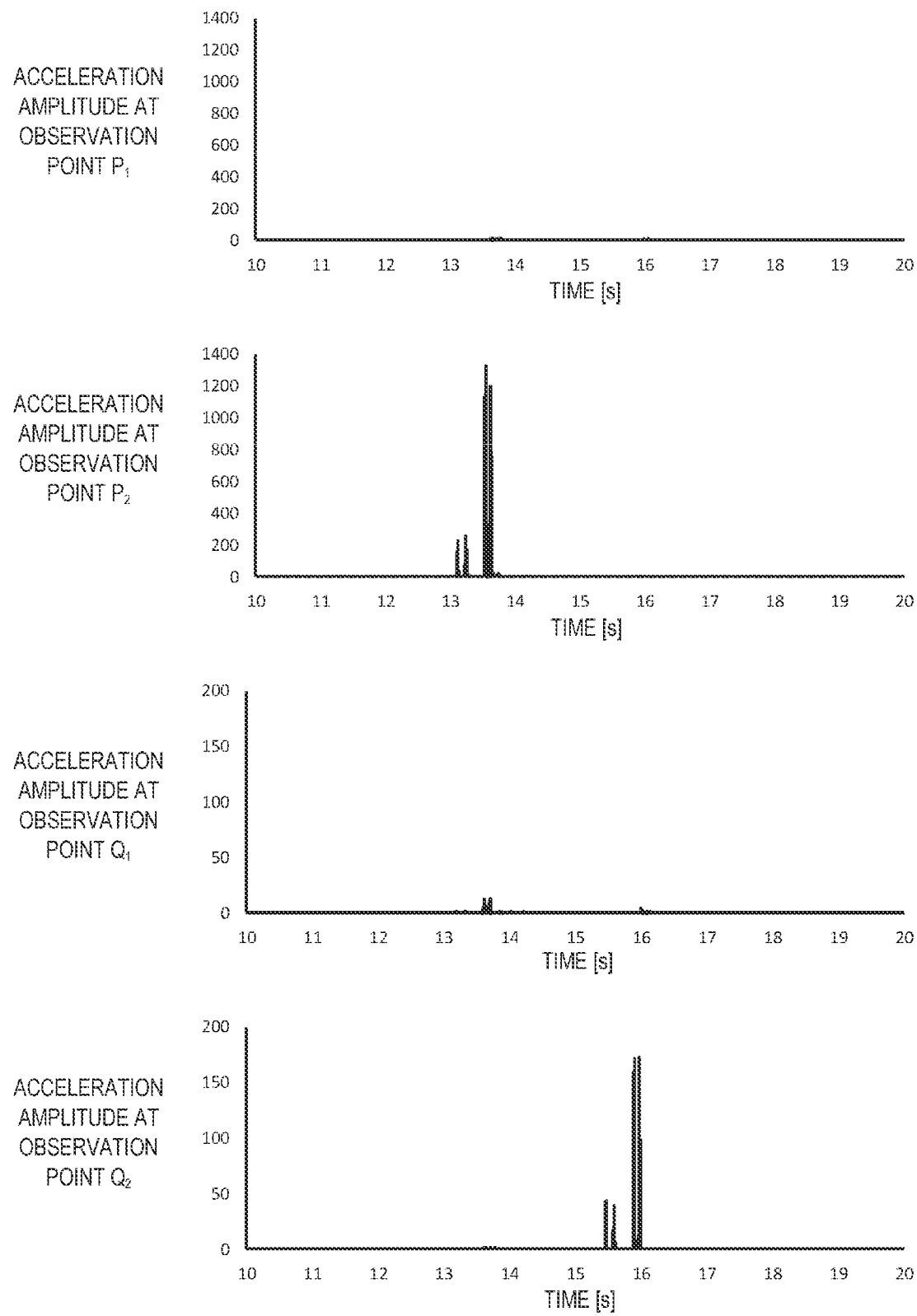
FIG. 11 is a diagram in which an acceleration amplitude at each time in FIG. 10 is converted into an acceleration intensity.

FIG. 10 shows diagrams showing examples of the acceleration detected for the observation points $P_1$, $P_2$, $Q_1$ and $Q_2$ when the vehicle 6 having four axles travels on the lane $L_2$. FIG. 11 shows diagrams in which the acceleration amplitude at each time point in FIG. 10 is converted into the acceleration intensity. In the examples in FIGS. 10 and 11, since the vehicle 6 is traveling on the lane $L_2$, a large acceleration intensity is acquired at the time when each of the four axles of the vehicle 6 passes the observation points $P_2$ and $Q_2$. The acceleration intensity acquired at the time when each of the four axles passes the observation point $P_2$ is included in the first observation point information. The acceleration intensity acquired at the time when each of the four axles passes the observation point $Q_2$ is included in the second observation point information.

The measurement device 1 acquires a time point when the acquired acceleration intensity exceeds a predetermined threshold value as time points when the first axle and subsequent axles successively pass the observation points $P_2$ and $Q_2$, that is, the entry time point of each axle to the lane $L_2$ and the exit time point of each axle from the lane $L_2$.

Figure 12:
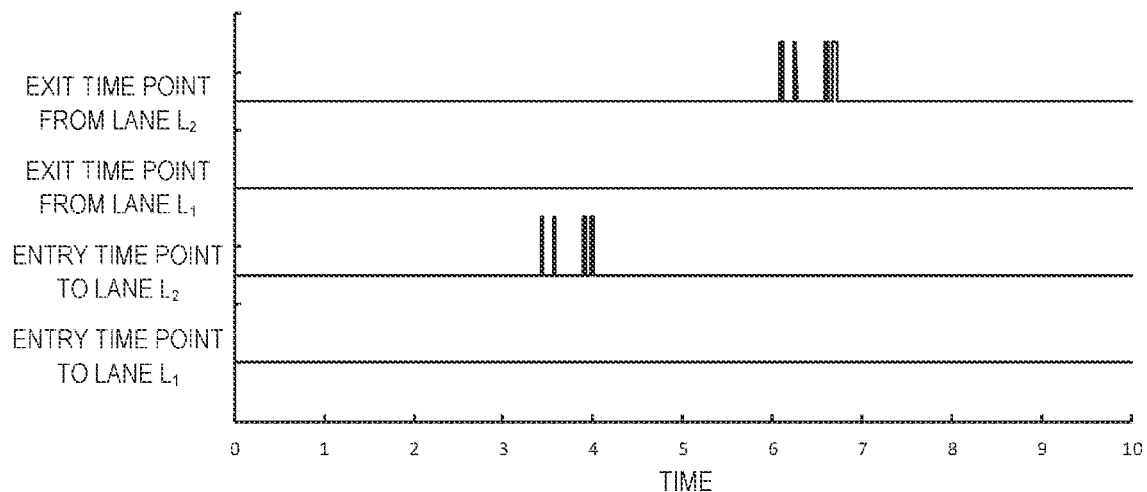
FIG. 12 is a diagram obtained by binarizing the acceleration intensity in FIG. 11 with a predetermined threshold value.

FIG. 12 is a diagram obtained by binarizing the acceleration intensities in FIG. 11 with the predetermined threshold value. In the example in FIG. 12, the entry time point of each of the four axles to the lane $L_2$ and the exit time point of each of the four axles from the lane $L_2$ are acquired. The entry time point of each of the four axles to the lane $L_2$ is included in the first observation point information. The exit time point of each of the four axles from the lane $L_2$ is included in the second observation point information.

Further, the measurement device 1 compares a pattern 1 of the entry time point of each of the four axles to the lane $L_2$ and a pattern 2 of the exit time point of each of the four axles from the lane $L_2$, and determines whether the two patterns are generated by the passage of the same vehicle 6. Since intervals among the four axles do not change, if the vehicle 6 travels on the superstructure 7 at a constant speed, the patterns 1 and 2 coincide with each other. For example, the measurement device 1 slides one of the time points of the patterns 1 and 2 so as to coincide the entry time point and the exit time point of the leading axle. When a difference between the entry time point and the exit time point of each of the second to fourth axles is less than or equal to a predetermined threshold value, the measurement device 1 determines that the patterns 1 and 2 are generated by the passage of the same vehicle 6. When the difference is greater than the predetermined threshold value, the measurement device 1 determines that the patterns 1 and 2 are generated by the passage of two vehicles 6. When two vehicles 6 continuously travel on one lane at the same speed, an erroneous determination that the plurality of axles of a preceding vehicle 6 and the plurality of axles of a rear vehicle 6 all belong to the axles of one vehicle 6 may occur. In order to avoid the erroneous determination, when an interval between the entry time point and the exit time point of two adjacent axles is a time difference more than or equal to a predetermined time, the measurement device 1 may distinguish that the entry time point and the exit time point of the two axles belong to two vehicles 6.

Figure 13:
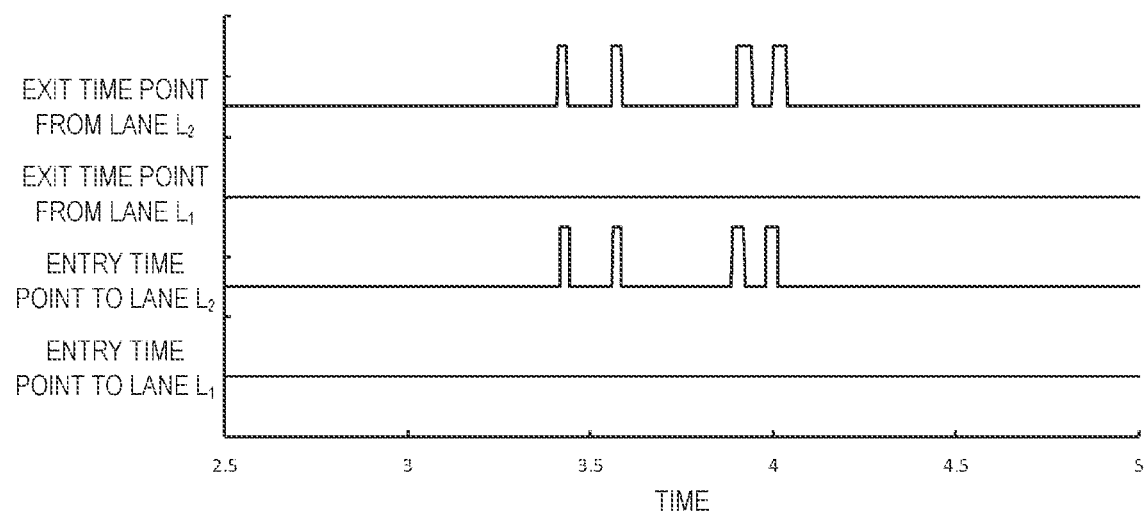
FIG. 13 is a diagram in which a pattern at an exit time is slid with respect to FIG. 12.

FIG. 13 is a diagram in which the pattern 2 showing the exit time point of each of the four axles from the lane $L_2$ is slid so as to coincide the entry time point and the exit time point of the leading axle with respect to FIG. 12. FIG. 13 is enlarged in a horizontal axis direction with respect to FIG. 12. In the example in FIG. 13, the pattern 1 showing the entry time point of each of the four axles to the lane $L_2$ and the pattern 2 showing the exit time point of each of the four axles from the lane $L_2$ are substantially the same. It is determined that the patterns 1 and 2 are generated by the passage of the same vehicle 6.

Then, by associating the four entry time points to the lane $L_2$ shown in FIG. 12 and peak values of the four acceleration intensities at the observation point $P_2$ shown in FIG. 11, the four exit time points from the lane $L_2$ shown in FIG. 12, and peak values of the four acceleration intensities at the observation point $Q_2$ shown in FIG. 11 with one another in order from the leading axle, the measurement device 1 acquires the correspondence information of the leading axle, the correspondence information of the second axle, the correspondence information of the third axle, and the correspondence information of the fourth axle. Further, the measurement device 1 acquires the correspondence information in which the vehicle 6 traveling on the lane $L_2$ and the correspondence information of the four axles are associated with each other. These pieces of information are included in the axle information together with the first observation point information and the second observation point information.

Based on the axle information, the measurement device 1 can identify, for any vehicle 6 passing through the lane $L_j$ of the superstructure 7, the entry time point of each axle of the vehicle 6 to the observation point $P_j$, the acceleration intensity at the observation point $P_j$ by each axle, the exit time point of each axle from the observation point $Q_j$, and the acceleration intensity at the observation point $Q_j$ by each axle.

1-3 Generation of Path Deflection Waveform

Figure 14:
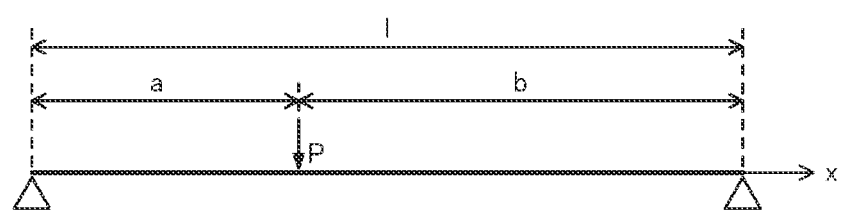
FIG. 14 is a diagram illustrating a structural model of a superstructure of a bridge.

In the present embodiment, considering that in the superstructure 7 of the bridge 5, one or more bridge floors 7a each constituted by the floor plate F and the main girders $G_1$ to $G_K$ are continuously arranged, the measurement device 1 calculates the displacement of one bridge floor 7a as the displacement at the central position in the longitudinal direction. The load applied to the superstructure 7 moves from one end to the other end of the superstructure 7. At this time, a position of the load on the superstructure 7 and a load amount can be used to express the deflection amount, which is the displacement at the central portion of the superstructure 7. In the present embodiment, in order to express the deflection deformation when the axles of the vehicle 6 move on the superstructure 7 as a trajectory of a deflection amount due to the movement on a beam with a one-point load, a structural model shown in FIG. 14 is considered. In the structural model, the deflection amount at the central position is calculated. In FIG. 14, P is the load. a is a load position from the end of the superstructure 7 on a side where the vehicle 6 enters. b is a load position from an end of the superstructure 7 on a side where the vehicle 6 exits. 1 is a distance between both ends of the superstructure 7. The structural model shown in FIG. 14 is a simple beam in which both ends are supported with both ends as fulcrums.

In the structural model shown in FIG. 14, when the position of the end of the superstructure 7 on the side where the vehicle 6 enters is zero and the observation position for the deflection amount is x, a bending moment M of the simple beam is expressed by Equation (1).

$$M = \frac{b}{l} Px - PH_a(x-a) \qquad (1)$$

In Equation (1), a function $H_a$ is defined as in Equation (2).

$$H_a = \begin{cases} 0 \text{ (if } x \leq a) \\ 1 \text{ (if } x > a) \end{cases} \qquad (2)$$

Equation (1) is transformed to obtain Equation (3).

$$-\frac{Ml}{P} = -bx + H_a l(x-a) \qquad (3)$$

Meanwhile, the bending moment M is expressed by Equation (4). In Equation (4), θ is an angle, I is a secondary moment, and E is a Young's modulus.

$$-M = EI \frac{d\theta}{dx} \qquad (4)$$

Equation (4) is substituted into Equation (3), and Equation (5) is obtained.

$$\frac{EIl}{P} \frac{d\theta}{dx} = -bx + H_a l(x-a) \qquad (5)$$

Equation (6) is obtained by integrating Equation (5) with respect to the observation position x, and Equation (7) is obtained by calculating Equation (6). In Equation (7), $C_1$ is an integral constant.

$$\int \frac{EIl}{P} \frac{d\theta}{dx} dx = \int (-bx + H_a l(x-a)) dx \qquad (6)$$

$$\frac{EIl}{P} \theta = -\frac{bx^2}{2} + H_a \frac{l(x-a)^2}{2} + C_1 \qquad (7)$$

Further, Equation (8) is obtained by integrating Equation (7) with respect to the observation position x, and Equation (9) is obtained by calculating Equation (8). In Equation (9), $C_2$ is an integral constant.

$$\int \frac{EIl}{P} \theta \, dx = \int \left\{ -\frac{bx^2}{2} + H_a \frac{l(x-a)^2}{2} + C_1 \right\} dx \qquad (8)$$

$$\frac{EIl}{P} \theta x = -\frac{bx^3}{6} + H_a \frac{l(x-a)^3}{6} + C_1 x + C_2 \qquad (9)$$

In Equation (9), ex expresses a deflection amount. Equation (10) is obtained by replacing ex with a deflection amount w.

$$\frac{EIl}{P} w = -\frac{bx^3}{6} + H_a \frac{l(x-a)^3}{6} + C_1 x + C_2 \qquad (10)$$

Based on FIG. 14, since b=l−a, Equation (10) is transformed as Equation (11).

$$\frac{EIl}{P} w = -\frac{(l-a)x^3}{6} + H_a \frac{l(x-a)^3}{6} + C_1 x + C_2 \qquad (11)$$

Since the deflection amount w=0 when x=0, and $H_a$=0 based on x≤a, Equation (12) can be obtained by substituting x=w=$H_a$=0 into Equation (11).

$$C_2 = 0 \qquad (12)$$

Since the deflection amount w=0 when x=l, and $H_a$=1 based on x>a, Equation (13) can be obtained by substituting x=l, w=0, and $H_a$=1 into Equation (11).

$$C_1 = \frac{a(l-a)(a+2(l-a))}{6} \qquad (13)$$

Equation (14) is obtained by substituting b=l−a into Equation (13).

$$C_1 = \frac{ab(a+2b)}{6} \qquad (14)$$

Equation (15) can be obtained by substituting the integral constant $C_1$ in Equation (12) and the integral constant $C_2$ in Equation (13) into Equation (10).

$$\frac{EIl}{P} w = -\frac{bx^3}{6} + H_a \frac{l(x-a)^3}{6} + \frac{ab(a+2b)}{6} x \qquad (15)$$

Equation (15) is transformed and the deflection amount w at the observation position x when the load P is applied to the position a is expressed by Equation (16).

$$w = \frac{P}{6EIl} \left\{ -bx^3 + H_a l(x-a)^3 + ab(a+2b)x \right\} \qquad (16)$$

Figure 15:
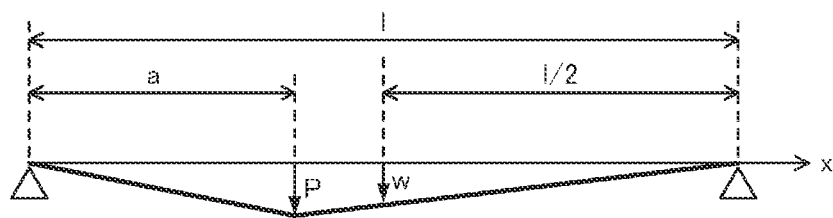
FIG. 15 is a diagram illustrating the structural model of the superstructure of the bridge.

FIG. 15 shows a state in which the load P moves from one end to the other end of the simple beam under a condition that the observation position x of the deflection amount is fixed at the central position of the simple beam, that is, when x=½.

When the load position a is on the left side of the observation position x=½, since $H_a$=1 based on x>a, Equation (17) can be obtained by substituting x=½ and $H_a$=1 into Equation (16).

$$w = \frac{P}{6EIl}\left\{-b\left(\frac{l}{2}\right)^3 + 1l\left(\left(\frac{l}{2}\right) - a\right)^3 + ab(a+2b)\left(\frac{l}{2}\right)\right\} \quad (17)$$

Equation (18) is obtained by substituting l=a+b into Equation (17).

$$w = \frac{P}{48EI}a(-a^2 + 3((a+b)^2 - a^2)) \quad (18)$$

Substituting a+b=l into Equation (18), a deflection amount $w_L$ at the observation position x when the position of the load P is on the left side of the central observation position x=½ is as shown in Equation (19).

$$w_L = \frac{P}{48EI}(3al^2 - 4a^3) \quad (19)$$

On the other hand, when the load position a is on the right side of the observation position x=½, since $H_a=0$ based on x≤a, Equation (20) is obtained by substituting x=½ and $H_a=0$ into Equation (16).

$$w = \frac{P}{6EIl}\left\{-b\left(\frac{l}{2}\right)^3 + ab(a+2b)\left(\frac{l}{2}\right)\right\} \quad (20)$$

Substituting l=a+b into Equation (20), a deflection amount $w_R$ at the observation position x when the position of the load P is on the right side of the central observation position x=½ is as shown in Equation (21).

$$w_R = \frac{P}{48EI}\{3a^2b + 6ab^2 - b^3\} \quad (21)$$

On the other hand, when the load position a is the same as the observation position x=½, since $H_a=0$ based on x≤a, Equation (22) is obtained by substituting $H_a=0$ and a=b=½ into Equation (16).

$$w = \frac{P}{6EIl}2a^4 \quad (22)$$

Further, substituting a=½ into Equation (22), the deflection amount w at the observation position x when the position of the load P is the same as the central observation position is as shown in Equation (23).

$$w = \frac{P}{48EI}l^3 \quad (23)$$

In the simple beam with fulcrums at both ends, a maximum deflection displacement is obtained when the load P is in the center. Therefore, according to Equation (23), a maximum deflection amount $w_{max}$ is expressed by Equation (24).

$$w_{max} = w = \frac{P}{48EI}l^3 \quad (24)$$

When the deflection amount $w_L$ at the observation position x when the position of the load P is on the left side of the central observation position x=½ is divided by the maximum deflection amount $w_{max}$ and normalized by the maximum deflection amount $w_{max}$, Equation (25) is obtained based on Equation (19) and Equation (24).

$$\frac{w_L}{w_{max}} = \frac{\frac{P}{48EI}(3al^2 - 4a^3)}{\frac{P}{48EI}l^3} = \frac{3a}{l} - \frac{4a^3}{l^3} \quad (25)$$

Equation (26) is obtained by setting a/l=r in Equation (25).

$$\frac{w_L}{w_{max}} = 3r - 4r^3 \quad (26)$$

On the other hand, when the deflection amount $w_R$ at the observation position x when the position of the load P is on the right side of the central observation position x=½ is divided by the maximum deflection amount $w_{max}$ and normalized by the maximum deflection amount $w_{max}$, Equation (27) is obtained based on Equation (21) and Equation (24).

$$\frac{w_R}{w_{max}} = \frac{\frac{P}{48EI}(3a^2b + 6ab^2 - b^3)}{\frac{P}{48EI}l^3} = \frac{3b}{l} - \frac{4b^3}{l^3} \quad (27)$$

Here, by a/l=r, a+b=l, since b=l×(1−r), Equation (28) is obtained by substituting b=l×(1−r) into Equation (27).

$$\frac{w_R}{w_{max}} = 3(1-r) - 4(1-r)^3 \quad (28)$$

By summarizing Equation (25) and Equation (27), a normalized deflection amount $w_{std}$ normalized by the maximum deflection amount observed at the central portion when the load P moves on the simple beam is expressed by Equation $$w_{std} = \frac{w}{w_{max}} = \begin{cases} 3r - 4r^3 & \left(\text{if } a < \frac{l}{2}\right) \\ 3(1-r) - 4(1-r)^3 & \left(\text{if } \frac{l}{2} < a\right) \end{cases} \quad (29)$$

In Equation (29), r=a/l and 1−r=b/l indicate a ratio of the position of the load P to the distance l between the fulcrums of the simple beam, and a variable R is defined as shown in Equation (30).

$$R = \begin{cases} \frac{a}{l} & \left(\text{if } a < \frac{l}{2}\right) \\ \frac{b}{l} & \left(\text{if } \frac{l}{2} < a\right) \end{cases} \quad (30)$$

Equation (29) is replaced by Equation (31) using Equation (30).

$$w_{std} = 3R - 4R^3 \quad (31)$$

Equation (30) and Equation (31) indicate that, when the observation position is in the center of the simple beam, the deflection amount is symmetrical on the right side and the left side of the center of the position of the load P.

Figure 16:
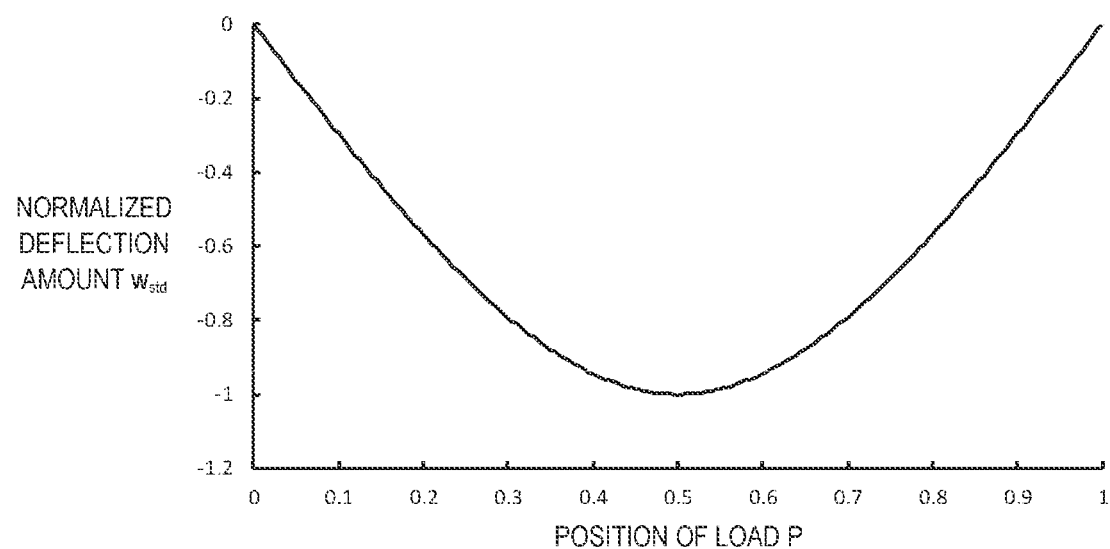
FIG. 16 is a diagram showing an example of a normalized deflection amount waveform.

FIG. 16 shows an example of a waveform of the normalized deflection amount $w_{std}$ in the case of the observation position x=½. In FIG. 16, the horizontal axis represents the position of the load P, and the vertical axis represents the normalized deflection amount $w_{std}$. In the example in FIG. 16, the distance l between the fulcrums of the simple beam is 1.

The above described axle information includes the entry time point of each axle of the vehicle 6 to the lane $L_j$ and the exit time point from the lane $L_j$, that is, the time points when the vehicle 6 passes the positions at both ends of the superstructure 7. Therefore, the positions at both ends of the superstructure 7 correspond to the entry time point and the exit time point of the axle, and the load positions a and b are replaced with time. It is assumed that the speed of the vehicle 6 is substantially constant and the position and the time are proportional.

When the load position at the left end of the superstructure 7 corresponds to an entry time point $t_i$, and the load position at the right end of the superstructure 7 corresponds to an exit time point $t_o$, the load position a from the left end is replaced with an elapsed time $t_p$ from the entry time point $t_1$. The elapsed time $t_p$ is expressed by Equation (32).

$$t_p = t - t_i \tag{32}$$

The distance l between the fulcrums is replaced by a time period $t_s$ from the entry time point $t_i$ to the exit time point $t_o$. The time period $t_s$ is expressed by Equation (33).

$$t_s = t_o - t_i \tag{33}$$

Since the speed of the vehicle 6 is constant, a time point $t_c$ when the load position a is in the center of the superstructure 7 is expressed by Equation (34).

$$t_c = \frac{t_i + t_o}{2} \tag{34}$$

By replacing the position with the time as described above, the position of the load P is expressed by Equation (35) and Equation (36).

$$\frac{a}{l} = r = \frac{t_p}{t_s} \tag{35}$$

$$1 - r = 1 - \frac{t_p}{t_s} \tag{36}$$

Substituting Equation (35) and Equation (36) into Equation (29), the normalized deflection amount $w_{stdB}$ replaced by time is expressed by Equation (37).

$$w_{std} = \begin{cases} 0 & (\text{if } t < t_i) \\ 3\frac{t_p}{t_s} - 4\left(\frac{t_p}{t_s}\right)^3 & \left(\text{if } t_i < t < \frac{(t_o+t_i)}{2}\right) \\ 3\left(1-\frac{t_p}{t_s}\right) - 4\left(1-\frac{t_p}{t_s}\right)^3 & \left(\text{if } \frac{(t_o+t_i)}{2} < t < t_o\right) \\ 0 & (\text{if } t > t_o) \end{cases} \tag{37}$$

Alternatively, according to Equation (30) and Equation (31), the normalized deflection amount $w_{std}$ normalized by the maximum amplitude is expressed by Equation (38) by substituting the variable R with time.

$$w_{std} = 3R - 4R^3,\ R = \begin{cases} 0 & (\text{if } t < t_i) \\ \frac{t_p}{t_s} & \left(\text{if } t_i < t < \frac{(t_o+t_i)}{2}\right) \\ 1 - \frac{t_p}{t_s} & \left(\text{if } \frac{(t_o+t_i)}{2} < t < t_o\right) \\ 0 & (\text{if } t > t_o) \end{cases} \tag{38}$$

Considering that a relationship between the elapse of time and the normalized deflection amount is treated as observation data, the normalized deflection amount $w_{std}$ is replaced with a normalized deflection amount model $w_{std}(t)$ at the observation position at the center of the beam due to the movement of a single concentrated load on the simple beam with fulcrums at both ends, and Equation (38) becomes Equation (39). Equation (39) is an approximate expression of deflection of the superstructure 7 which is the structure, and is an expression based on the structural model of the superstructure 7. Specifically, Equation (39) is an equation in which the deflection at the central position of the observation points $P_j$ and $Q_j$ on the lane $L_j$ on which the vehicle 6 moves is normalized by the maximum amplitude, and a maximum value of the equation is 1.

$$w_{std}(t) = 3R - 4R^3,\ R = \begin{cases} 0 & (\text{if } t < t_i) \\ \frac{t_p}{t_s} & \left(\text{if } t_i < t < \frac{(t_o+t_i)}{2}\right) \\ 1 - \frac{t_p}{t_s} & \left(\text{if } \frac{(t_o+t_i)}{2} < t < t_o\right) \\ 0 & (\text{if } t > t_o) \end{cases} \tag{39}$$

Time information required for the normalized deflection amount model $w_{std}(t)$ is obtained from the axle information described above. Since the normalized deflection amount model $w_{std}(t)$ has a maximum deflection amount $w_{max}$ at the central position of the superstructure 7, Equation (40) is obtained.

$$w_{max} = \max\{w_{std}(t)\} = w_{std}\left(t_i + \frac{1}{2}t_s\right) \tag{40}$$

The deflection amount w shown in the above Equation (23) is the deflection amount at the observation position x=½ when the position of the load P is the same as the central observation position. Since the deflection amount w coincides with the maximum deflection amount $w_{max}$, Equation (41) is obtained.

$$w_{max} = \frac{P}{48EI}l^3 \tag{41}$$

Figure 17:
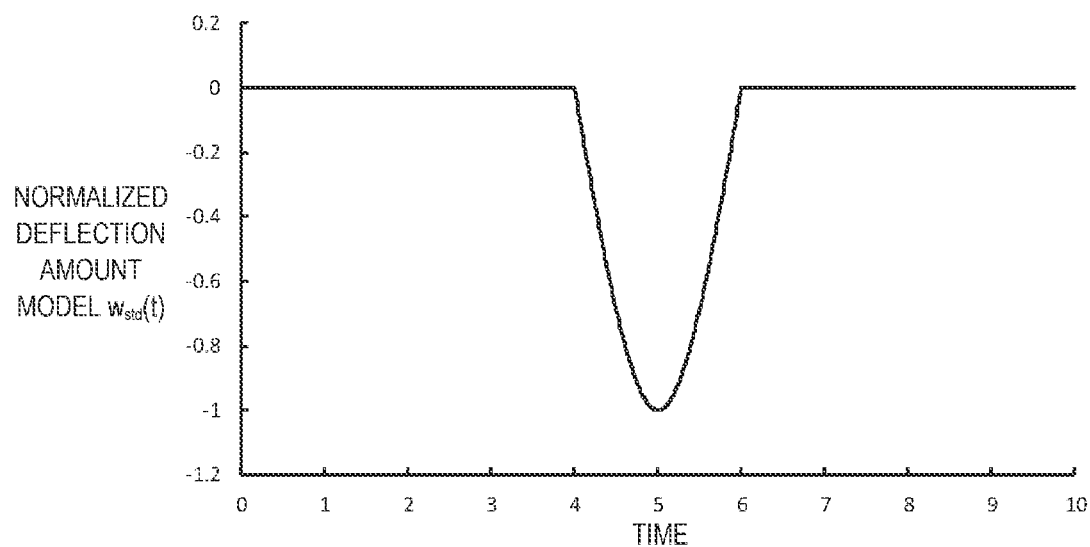
FIG. 17 is a diagram showing an example of a normalized deflection amount model.

FIG. 17 shows an example of the normalized deflection amount model $w_{std}(t)$. In the example in FIG. 17, at the time point $t_c=(t_i+t_o)/2=5$ in which the entry time point $t_i=4$ and the exit time point $t_o=6$, the normalized deflection amount model $w_{std}(t)$ has the maximum deflection amount $w_{max}=1$ at the central position of the superstructure 7.

It is assumed that the superstructure 7 which is the structure functions as bridge weigh in motion (BWIM), and is considered to be deformed in a manner of resembling a simple beam with both ends as fulcrums. Since the vehicle 6, which is a moving object, passes through the superstructure 7 substantially at a constant speed from one end portion of the superstructure 7, and moves to the other end portion, an intermediate portion of the superstructure 7 and the end portions of the upper structure 7 receive the same load. Therefore, it can be considered that the observed displacement of the superstructure 7 is approximately proportional to an acceleration intensity $a_p$ of the axle obtained based on the axle information.

Assuming that a proportional coefficient is a product of a predetermined coefficient p and the acceleration intensity $a_p$ of the axle that is obtained based on the axle information, a deflection waveform H(t) of the superstructure 7 generated by each axle is obtained based on Equation (42). The acceleration intensity $a_p$ may be the acceleration intensity at the time of entry, the acceleration intensity at the time of exit, which are included in the axle information, or a statistical value such as an average value of the acceleration intensity at the time of entry and the acceleration intensity at the time of exit.

$$H(t)=pa_p w_{std}(t) \tag{42}$$

The Equation (39) is substituted into Equation (42), and the deflection waveform H(t) is expressed by Equation (43).

$$H(t) = pa_p(3R - 4R^3),\ R = \begin{cases} 0 & (\text{if } t < t_i) \\ \dfrac{t_p}{t_s}\left(\text{if } t_i < t < \dfrac{(t_o+t_i)}{2}\right) \\ 1 - \dfrac{t_p}{t_s}\left(\text{if } \dfrac{(t_o+t_i)}{2} < t < t_o\right) \\ 0 & (\text{if } t > t_o) \end{cases} \tag{43}$$

Until now, it is assumed that a single load P is applied to the superstructure 7, but the load from each axle of the vehicle 6 is applied to the lane $L_j$ on which the vehicle 6 travels, so that Equation (43) is replaced with a deflection waveform $H_{jk}(t)$ as in Equation (44). In Equation (44), k is an integer indicating the axle number and j is an integer indicating the lane number. As shown in Equation (44), the deflection waveform $H_{jk}(t)$ is proportional to the product of the predetermined coefficient p and an acceleration intensity $a_{pjk}$.

$$H_{jk}(t) = pa_{p_{jk}} w_{std}(t) = pa_{p_{jk}}(3R - 4R^3), \tag{44}$$

$$R = \begin{cases} 0 & (\text{if } t < t_i) \\ \dfrac{t_p}{t_s}\left(\text{if } t_i < t < \dfrac{(t_o+t_i)}{2}\right) \\ 1 - \dfrac{t_p}{t_s}\left(\text{if } \dfrac{(t_o+t_i)}{2} < t < t_o\right) \\ 0 & (\text{if } t > t_o) \end{cases}$$

Figure 18:
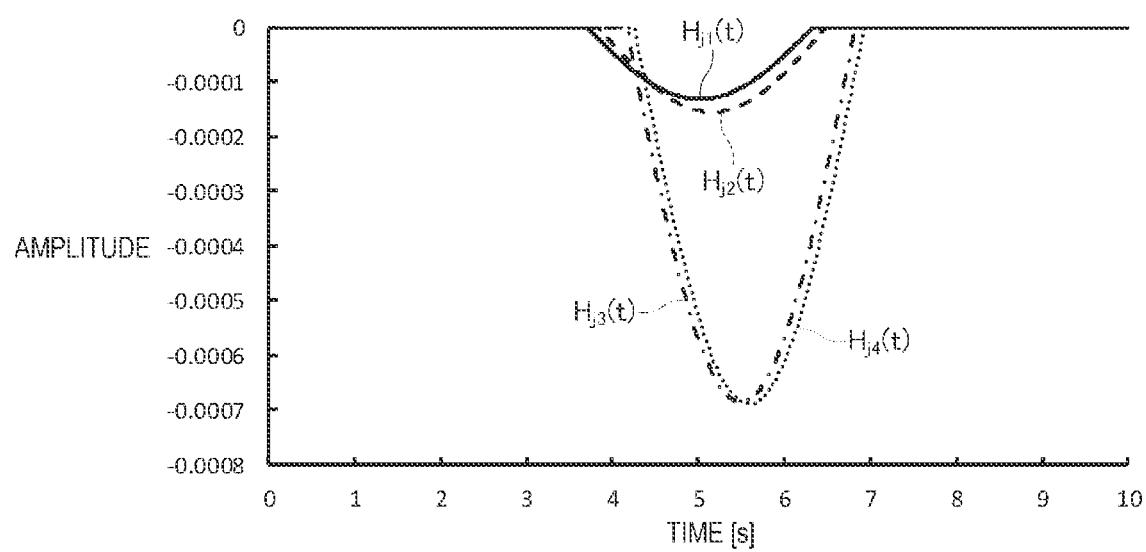
FIG. 18 is a diagram showing an example of a deflection waveform of a bridge generated by each axle.

FIG. 18 shows an example of the deflection waveform of the superstructure 7 generated by each axle provided in the vehicle 6 traveling on the lane $L_j$. In the example in FIG. 18, the vehicle 6 is a four-axle vehicle, and four deflection waveforms $H_{j1}(t)$, $H_{j2}(t)$, $H_{j3}(t)$, and $H_{j4}(t)$ are shown. In the example in FIG. 18, since the loads of the leading and second axles are relatively small and the loads of the third and fourth axles are relatively large, the maximum amplitudes of the deflection waveforms $H_{j1}(t)$ and $H_{j2}(t)$ are relatively small, and the maximum amplitudes of the deflection waveforms $H_{j3}(t)$ and $H_{j4}(t)$ are relatively large.

As shown in Equation (45), a vehicle deflection waveform $CP_{jm}(t)$, which is the deflection waveform of the superstructure 7 generated by the vehicle 6 traveling on the lane $L_j$, is obtained by adding the deflection waveforms $H_{jk}(t)$ of the superstructure 7 generated by the axles. In Equation (45), m is an integer indicating the vehicle number, k is an integer indicating the axle number, and j is an integer indicating the lane number.

$$CP_{jm}(t) = \sum_k H_{jk}(t) \tag{45}$$

Figure 19:
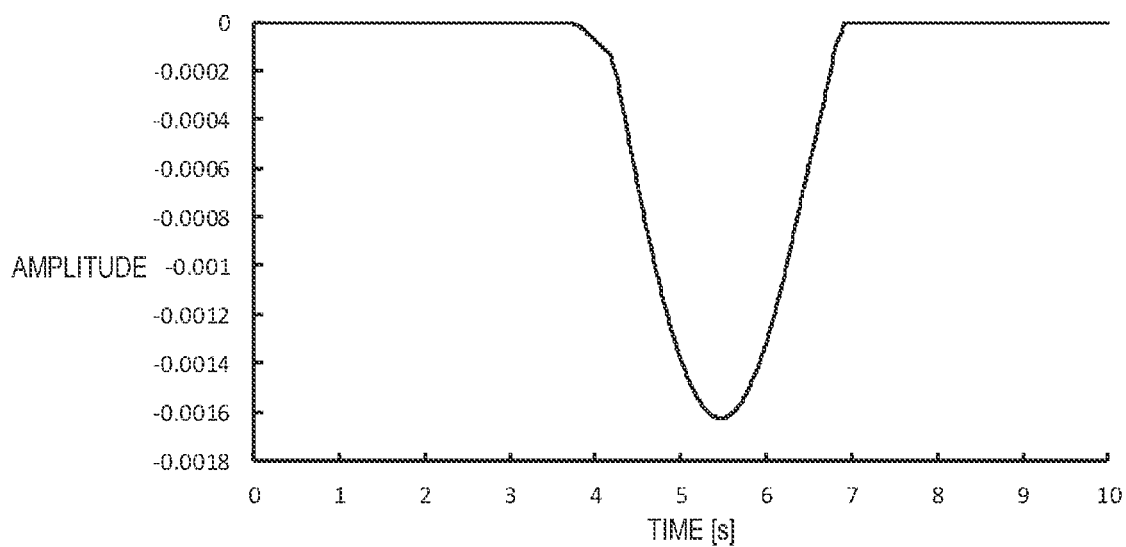
FIG. 19 is a diagram showing an example of a vehicle deflection waveform.

FIG. 19 shows a vehicle deflection waveform $CP_{jm}(t)$ obtained by adding the four deflection waveforms $H_{j1}(t)$, $H_{j2}(t)$, $H_{j3}(t)$, and $H_{j4}(t)$ shown in FIG. 18.

It is assumed that M vehicles 6 travel on the lane $L_j$ in an integral interval for calculating the displacement based on an observation result, as shown in Equation (46), a sum of the vehicle deflection waveforms $CP_{j1}(t)$ to $CP_{jM}(t)$ is defined as a path deflection waveform $CP_j(t)$, which is the deflection waveform of the lane $L_j$. M is an integer of 1 or more.

$$CP_j(t) = \sum_{m=1}^{M} CP_{jm}(t) \tag{46}$$

1-4 Displacement Correction

The acceleration detected by the sensor 23 observing the observation point $R_1$ is set as an acceleration waveform $A_j(t)$ after being subjected to low-pass filtering processing. As in Equation (47), the acceleration waveform $A_j(t)$ is a sum of an acceleration value $\alpha_{(t)}$ at a time point t and an acceleration offset error $\alpha_0$.

$$A_j(t)=\alpha_{(t)}+\alpha_0 \tag{47}$$

The acceleration waveform A (t) in Equation (47) is integrated to obtain a speed waveform V (t) expressed by Equation (48). In Equation (48), $v_{(t)}$ is a speed value at the time point t, and $v_0$ is a speed offset error.

$$V_j(t)=\int_t A_j(t)dt=\int \alpha_{(t)}+\alpha_0 dt = v_{(t)}+\alpha_0 t+v_0 \tag{48}$$

The speed waveform $V_j(t)$ in Equation (48) is integrated to obtain a displacement waveform $U_j(t)$ expressed by Equation (49). In Equation (49), $u_{(t)}$ is a speed value at the time point t, and $u_0$ is a displacement offset error.

$$U_j(t)=\int^t V_j(t)dt=\int v_{(t)}+\alpha_0 t+v_0 dt = u_{(t)}+\tfrac{1}{2}\alpha_0 t^2+v_0 t+u_0 = u_{(t)}+u_\varepsilon(t) \tag{49}$$

Since the integral interval in Equation (49) is, for example, a time period from when the vehicle 6 enters the lane $L_j$ to when the vehicle 6 exits the lane $L_j$, and is relatively short, each of the acceleration offset error $\alpha_0$, the speed offset error $v_0$, and the displacement offset error $u_0$ can be considered to be a constant value. Therefore, the integration error is approximated to a quadratic polynomial based on Equation (49), and an approximate integration error $u_\varepsilon(t)$ is expressed by Equation (50).

$$u_\varepsilon(t)=at^2+bt+c \tag{50}$$

If values of the coefficients a, b, and c in Equation (50) are obtained, the approximate integration error $u_\varepsilon(t)$ is subtracted from the displacement waveform $U_j(t)$ as in Equation (51), and thus the displacement waveform $U_j(t)$ is corrected to obtain a displacement waveform $CU_j(t)$.

$$CU_j(t)=U_j(t)-u_\varepsilon(t)=U_j(t)-(at^2+bt+c) \tag{51}$$

Since the above-described vehicle deflection waveform $CP_{jm}(t)$ is calculated using the approximate expression (39) of deflection based on the structural model of the superstructure 7, the vehicle deflection waveform $CP_{jm}(t)$ does not include an integration error that increases with time. Therefore, in the present embodiment, the measurement device 1 estimates the integration error using the vehicle deflection waveform $CP_{jm}(t)$, and calculates the values of the coefficients a, b, and c of the quadratic polynomial (50).

As shown in Equation (52), at a time point $t_k$, a residual between a waveform $dCP_j(t)$ obtained by multiplying a proportional coefficient d by the path deflection waveform $CP_j(t)$ and the waveform obtained by subtracting the quadratic polynomial (50) representing the approximate integration error $u_e(t)$ from the displacement waveform $U_j(t)$ is assumed to be $e_k$. In Equation (52), k is an integer of 1 or more and n or less. The time points $t_1$ to $t_n$ are time points at which n pieces of acceleration data are acquired in an integral interval of Equation (49). The proportional coefficient d is a coefficient for adjusting the path deflection waveform $CP_j(t)$ to a scale equivalent to the displacement waveform $U_j(t)$.

$$e_k = dCP_j(t_k) - (U_j(t_k) - u_e(t_k)) = dCP_j(t_k) - U_j(t_k) + at_k^2 + bt_k + c \tag{52}$$

The coefficients a, b, c, and d are calculated by the least square method such that the residual $e_k$ in Equation (52) is minimized. First, Equation (53) is obtained by squaring both sides of Equation (52).

$$e_k^2 = (dCP_j(t_k) - U_j(t_k) + at_k^2 + bt_k + c)^2 \tag{53}$$

Equation (53) is partially differentiated by the coefficient a, and Equation (54) is obtained.

$$at_k^4 + bt_k^3 + dCP_j(t_k)t_k^2 + ct_k^2 + ct_k^2 U_j(t_k) \tag{54}$$

Equation (53) is partially differentiated by the coefficient b, and Equation (55) is obtained.

$$at_k^3 bt_k^2 dCP_j(t_k)t_k + ct_k = t_k U_j(t_k) \tag{55}$$

Equation (53) is partially differentiated by the coefficient c, and Equation (56) is obtained.

$$at_k^2 + bt_k + dCP_j(t_k) + c = U_j(t_k) \tag{56}$$

Equation (53) is partially differentiated by the coefficient d, and Equation (57) is obtained.

$$CP_j(t_k)at_k^2 + CP_j(t_k)bt_k + CP_j(t_k)c + dCP_j(t_k)^2 = CP_j(t_k) U_j(t_k) \tag{57}$$

Equation (54) to Equation (57) are summarized, and Equation (58) is obtained.

$$\begin{pmatrix} t_k^4 & t_k^3 & t_k^2 & CP_j(t_k)t_k^2 \\ t_k^3 & t_k^2 & t_k & CP_j(t_k)t_k \\ t_k^2 & t_k & 1 & CP_j(t_k) \\ CP_j(t_k)t_k^2 & CP_j(t_k)t_k & CP_j(t_k) & CP_j(t_k)^2 \end{pmatrix} \begin{pmatrix} a \\ b \\ c \\ d \end{pmatrix} = \begin{pmatrix} U_j(t_k)t_k^2 \\ U_j(t_k)t_k \\ U_j(t_k) \\ CP_j(t_k)U_j(t_k) \end{pmatrix} \tag{58}$$

Each element of Equation (58) is replaced with a total sum of data in the integral interval, and Equation (59) is obtained.

$$\begin{pmatrix} \sum_{k=1}^{n} t_k^4 & \sum_{k=1}^{n} t_k^3 & \sum_{k=1}^{n} t_k^2 & \sum_{k=1}^{n} CP_j(t_k)t_k^2 \\ \sum_{k=1}^{n} t_k^3 & \sum_{k=1}^{n} t_k^2 & \sum_{k=1}^{n} t_k & \sum_{k=1}^{n} CP_j(t_k)t_k \\ \sum_{k=1}^{n} t_k^2 & \sum_{k=1}^{n} t_k & \sum_{k=1}^{n} 1 & \sum_{k=1}^{n} CP_j(t_k) \\ \sum_{k=1}^{n} CP_j(t_k)t_k^2 & \sum_{k=1}^{n} CP_j(t_k)t_k & \sum_{k=1}^{n} CP_j(t_k) & \sum_{k=1}^{n} CP_j(t_k)^2 \end{pmatrix} \begin{pmatrix} a \\ b \\ c \\ d \end{pmatrix} = \begin{pmatrix} \sum_{k=1}^{n} U_j(t_k)t_k^2 \\ \sum_{k=1}^{n} U_j(t_k)t_k \\ \sum_{k=1}^{n} U_j(t_k) \\ \sum_{k=1}^{n} CP_j(t_k)U_j(t_k) \end{pmatrix} \tag{59}$$

The elements of Equation (59) are replaced as shown in Equation (60), and values of coefficients a, b, c, and d are calculated as in Equations (61) to (64) by a sweep-out method.

$$\begin{pmatrix} A & B & C & E \\ B & C & D & F \\ C & D & n & G \\ E & F & G & H \end{pmatrix} \begin{pmatrix} a \\ b \\ c \\ d \end{pmatrix} = \begin{pmatrix} I \\ J \\ K \\ L \end{pmatrix} \tag{60}$$

$$a = \frac{\left(\frac{I}{E} - \frac{L}{H}\right)\left(\frac{C}{F} - \frac{F}{H}\right)\left(\frac{K}{G} - \frac{L}{H}\right)\left(\frac{D}{F} - \frac{F}{H}\right) - \left(\frac{J}{F} - \frac{L}{H}\right)\left(\frac{K}{G} - \frac{L}{H}\right)\left(\frac{B}{E} - \frac{F}{H}\right)\left(\frac{D}{G} - \frac{F}{H}\right)}{\left(\frac{A}{E} - \frac{E}{H}\right)\left(\frac{C}{G} - \frac{E}{H}\right)\left(\frac{C}{F} - \frac{F}{H}\right)\left(\frac{D}{G} - \frac{F}{H}\right) - \left(\frac{B}{F} - \frac{E}{H}\right)\left(\frac{C}{G} - \frac{E}{H}\right)\left(\frac{B}{E} - \frac{F}{H}\right)\left(\frac{D}{G} - \frac{F}{H}\right)} \tag{61}$$

$$b = \frac{\left(\frac{J}{F} - \frac{L}{H}\right)\left(\frac{n}{G} - \frac{G}{H}\right) - \left(\frac{K}{G} - \frac{L}{H}\right)\left(\frac{D}{F} - \frac{G}{H}\right) - \left\{\left(\frac{B}{F} - \frac{E}{H}\right)\left(\frac{n}{G} - \frac{G}{H}\right) - \left(\frac{C}{G} - \frac{E}{H}\right)\left(\frac{D}{F} - \frac{G}{H}\right)\right\}a}{\left(\frac{C}{F} - \frac{F}{H}\right)\left(\frac{n}{G} - \frac{G}{H}\right) - \left(\frac{D}{G} - \frac{F}{H}\right)\left(\frac{D}{F} - \frac{G}{H}\right)} \tag{62}$$

$$c = \frac{\frac{K}{G} - \frac{L}{H} - \left(\frac{C}{G} - \frac{E}{H}\right)a - \left(\frac{D}{G} - \frac{F}{H}\right)b}{\frac{n}{G} - \frac{G}{H}} \tag{63}$$

$$d = \frac{L - (a+b)E - Gc}{H} \qquad (64)$$

The measurement device 1 calculates the values of the coefficients a, b, and c by Equations (61) to (63), and substitutes the values of the coefficients a, b, and c into Equation (51) to calculate the displacement waveform $CU_j(t)$ obtained by correcting the displacement waveform $U_j(t)$.

Figure 20:
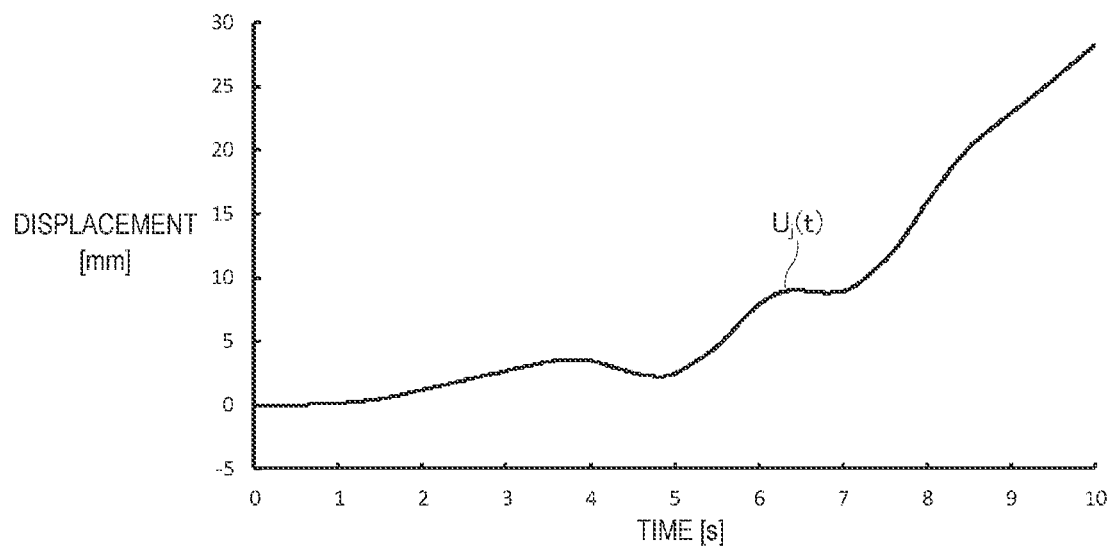
FIG. 20 is a diagram showing an example of a displacement waveform.
Figure 21:
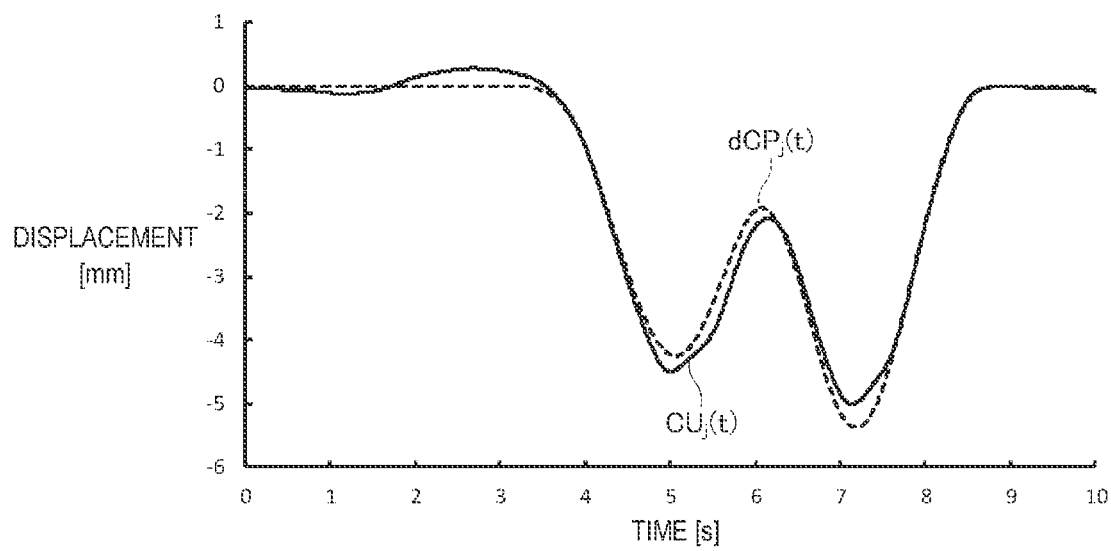
FIG. 21 is a diagram showing an example of a corrected displacement waveform.

FIG. 20 shows an example of the displacement waveform $U_j(t)$. FIG. 21 shows, by a solid line, an example of the displacement waveform $CU_j(t)$ obtained by correcting the displacement waveform $U_j(t)$ in FIG. 20. In each of FIGS. 20 and 21, a horizontal axis represents time, and a vertical axis represents a displacement. In FIG. 21, the waveform $dCP_j(t)$ obtained by multiplying the path deflection waveform $CP_j(t)$ by the proportional coefficient d is also shown by a broken line. As shown in FIG. 20, the displacement waveform $U_j(t)$ includes a large integration error approximated to a quadratic polynomial, and the displacement diverges. In contrast, as shown in FIG. 21, the displacement waveform $CU_j(t)$ obtained by correcting the displacement waveform $U_j(t)$ has almost no integration error, and is similar to the waveform $dCP_j(t)$.

1-5 Measurement Method

Figure 22:
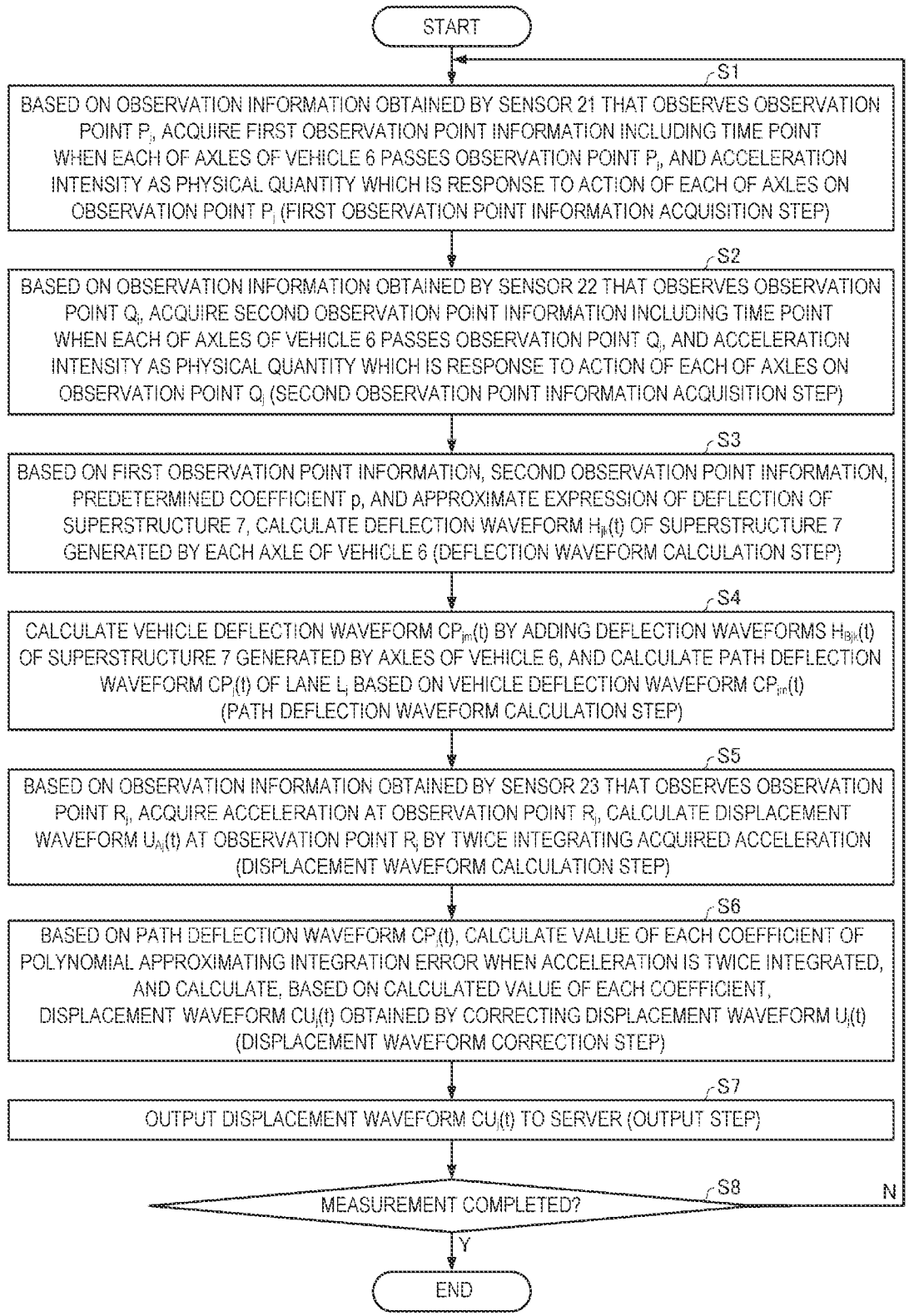
FIG. 22 is a flowchart showing an example of a procedure of a measurement method according to a first embodiment.

FIG. 22 is a flowchart showing an example of a procedure of the measurement method according to the first embodiment. In the present embodiment, the measurement device 1 executes the procedure shown in FIG. 22.

As shown in FIG. 22, first, for each integer j of 1 or more and N or less, and based on the observation information obtained by the sensor 21 that observes the observation point $P_j$, the measurement device 1 acquires first observation point information including a time point when each of a plurality of axles of the vehicle 6 passes the observation point $P_j$, and acceleration intensity as the physical quantity which is the response to the action of each of the plurality of axles on the observation point $P_j$ (step S1). As described above, the sensor 21 that observes the observation point $P_j$ is the acceleration sensor. The observation information obtained by the sensor 21 is the detection information on the acceleration generated at the observation point $P_j$. The measurement device 1 acquires the first observation point information based on the acceleration detected by each of the sensors 21. The step S1 is a first observation point information acquisition step.

Next, based on the observation information obtained by the sensor 22 that observes the observation point $Q_j$, the measurement device 1 acquires second observation point information including a time point when each of the plurality of axles of the vehicle 6 passes the observation point $Q_j$, and acceleration intensity as the physical quantity which is the response to the action of each the plurality of axles on the observation point $Q_j$ (step S2). As described above, the sensor 22 that observes the observation point $Q_j$ is the acceleration sensor. The observation information obtained by the sensor 22 is the detection information on the acceleration generated at the observation point $Q_j$. The measurement device 1 acquires the second observation point information based on the acceleration detected by each of the sensors 22. The step S2 is a second observation point information acquisition step.

Next, based on the first observation point information acquired in step S1 and the second observation point information acquired in step S2, the predetermined coefficient p, and the approximate expression of the superstructure 7, the measurement device 1 calculates the deflection waveform $H_{jk}(t)$ of the superstructure 7 generated by each of the plurality of axles of the vehicle 6 (step S3). Specifically, the measurement device 1 generates the above-described axle information using the first observation point information and the second observation point information, and calculates the deflection waveform $H_{jk}(t)$ of the superstructure 7 generated by each axle of the vehicle 6 according to the above Equation (44) using the axle information and the predetermined coefficient p. The step S3 is a deflection waveform calculation step.

Next, according to the above Equation (45), the measurement device 1 calculates a vehicle deflection waveform $CP_j(t)$ by adding the deflection waveforms $H_{jk}(t)$ of the superstructure 7 generated by the plurality of axles of the vehicle 6 and calculated in step S3, and calculates a path deflection waveform $CP_j(t)$ of the lane L based on the vehicle deflection waveform $CP_{jm}(t)$ (step S4). The step S4 is a path deflection waveform calculation step.

Next, based on observation information obtained by the sensor 23 that observes the observation point $R_j$, the measurement device 1 acquires an acceleration at the observation point $R_j$, and calculates the displacement waveform $U_j(t)$ at the observation point $R_j$ by twice integrating the acquired acceleration (step S5). As described above, the sensor 23 that observes the observation point $R_j$ is the acceleration sensor. The observation information obtained by the sensor 23 is the detection information on the acceleration generated at the observation point $R_j$. The measurement device 1 acquires an acceleration obtained by low-pass filtering processing of the acceleration detected by the sensor 23, and calculates the displacement waveform $U_j(t)$ by twice integrating the acquired acceleration. The step S5 is a displacement waveform calculation step.

Next, based on a path deflection waveform $CP_j(t)$ calculated in step S4, the measurement device 1 calculates a value of each coefficient of the polynomial approximating the integration error when the acceleration is twice integrated in step S5, and calculates, based on the calculated value of each coefficient, the displacement waveform $CU_j(t)$ obtained by correcting the displacement waveform $U_j(t)$ (step S6). Specifically, the measurement device 1 calculates the value of each coefficient of the polynomial assuming that a difference between the displacement waveform $U_j(t)$ and the polynomial approximating the integration error is approximately proportional to the path deflection waveform $CP_j(t)$. The step S6 is a displacement waveform correction step.

Next, the measurement device 1 outputs the displacement waveform $CU_j(t)$ calculated in step S6 to the server (step S7). The step S7 is an output step.

The measurement device 1 repeats the processing in steps S1 to S7 until the measurement is completed (N in step S8).

Figure 23:
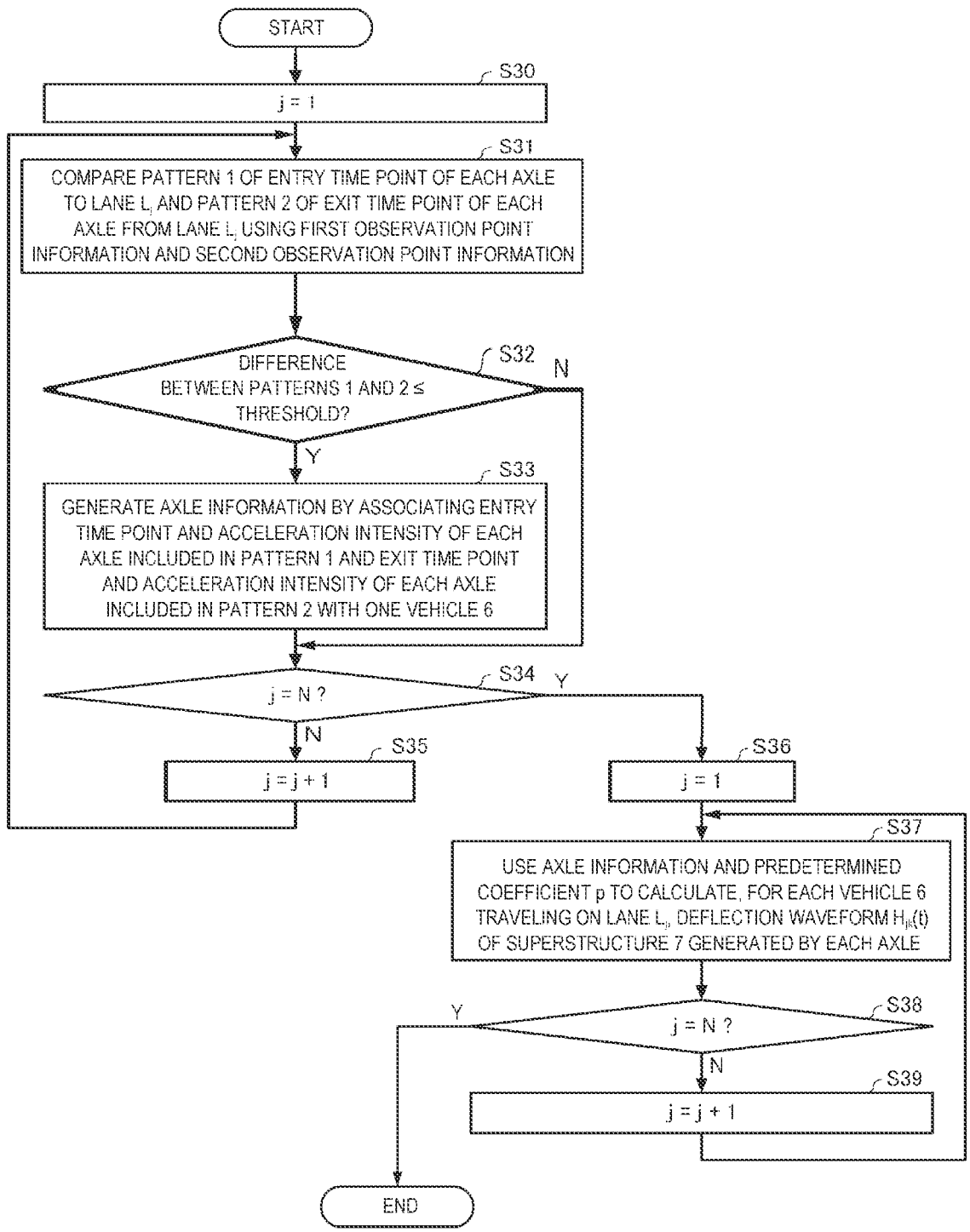
FIG. 23 is a flowchart showing an example of a procedure of a deflection waveform calculation step.

FIG. 23 is a flowchart showing an example of a procedure of the deflection waveform calculation step, which is step S3 in FIG. 22.

As shown in FIG. 23, first, the measurement device 1 sets the integer j to 1 (step S30), and compares the pattern 1 of the entry time point of each axle to the lane $L_j$ and the pattern 2 of the exit time point of each axle from the lane $L_j$ using the first observation point information and the second observation point information (step S31).

Then, when a difference between the entry time point of each axle included in pattern 1 and the exit time point of each axle included in the pattern 2 is equal to or less than a threshold (Y in step S32), the measurement device 1 generates axle information by associating the entry time point and the acceleration intensity of each axle included in the pattern 1 and the exit time point and the acceleration intensity of each axle included in the pattern 2 with one vehicle 6 (step S33).

When the difference between the entry time point of each axle included in the pattern 1 and the exit time point of each axle included in the pattern 2 is larger than the threshold (N in step S32), the measurement device 1 does not perform the processing in step S33.

When the integer j is not N (N in step S34), the measurement device 1 adds 1 to the integer j (step S35), and repeats the processing in steps S31 to S33.

Then, when the integer j is N (Y in step S34), the measurement device 1 sets the integer j to 1 (step S36), and uses the axle information generated in step S33 and the predetermined coefficient p to calculate, for each of the vehicles 6 traveling on the lane $L_j$, a deflection waveform $H_{jk}(t)$ of the superstructure 7 generated by each axle (step S37).

When the integer j is not N (N in step S38), the measurement device 1 adds 1 to the integer j (step S39), and repeats the processing in step S37.

Then, when the integer j is N (Y in step S38), the measurement device 1 ends the processing in the deflection waveform calculation step.

Figure 24:
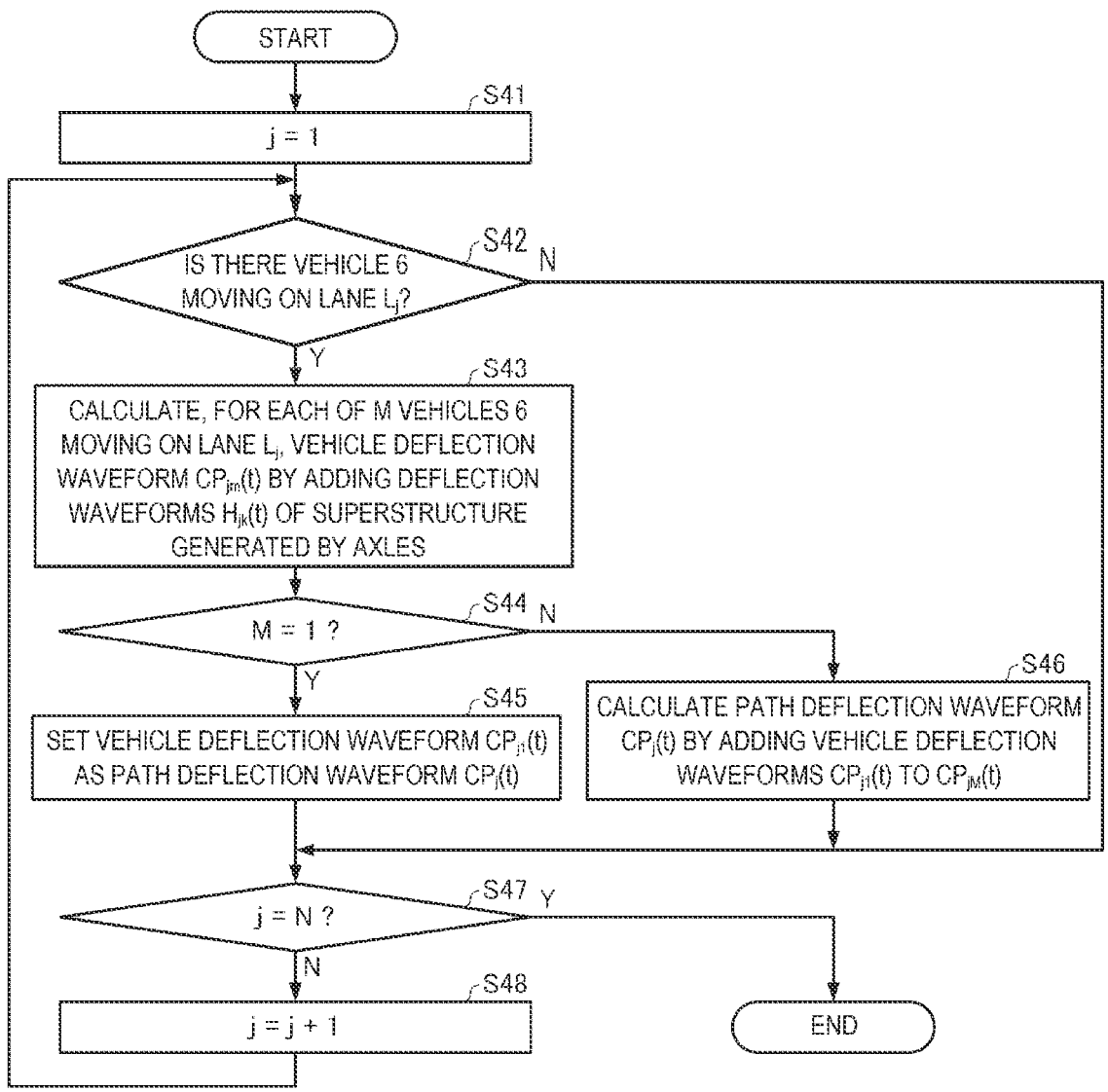
FIG. 24 is a flowchart showing an example of a procedure of a path deflection waveform calculation step.

FIG. 24 is a flowchart showing an example of a procedure of the path deflection waveform calculation step, which is step S4 in FIG. 22.

As shown in FIG. 24, first, the measurement device 1 sets the integer j to 1 (step S41). When there is the vehicle 6 traveling on the lane $L_j$ (Y in step S42), according to the above-described Equation (45), the measurement device 1 calculates, for the M vehicles 6 traveling on the lane L the vehicle deflection waveform $CP_j(t)$ by adding the deflection waveforms $H_{jk}(t)$ of the superstructure 7 generated by the axles (step S43).

Next, when M is 1 (Y in step S44), the measurement device 1 sets the vehicle deflection waveform $CP_{j1}(t)$ as the path deflection waveform $CP_j(t)$ of the lane $L_j$ (step S45).

When M is not 1 (N in step S44), according to Equation (46), the measurement device 1 calculates the path deflection waveform $CP_j(t)$ of the lane L by adding vehicle deflection waveforms $CP_{j1}(t)$ to $CP_{jM}(t)$ (step S46).

When there is no vehicle 6 moving on the lane $L_j$ (N in step S42), the measurement device 1 does not perform the processing in steps S43 to S46.

When the integer j is not N (N in step S47), the measurement device 1 adds 1 to the integer j (step S48), and repeats the processing in steps S42 to S46.

Then, when the integer j is N (Y in step S47), the measurement device 1 ends the processing in the path deflection waveform calculation step.

Figure 25:
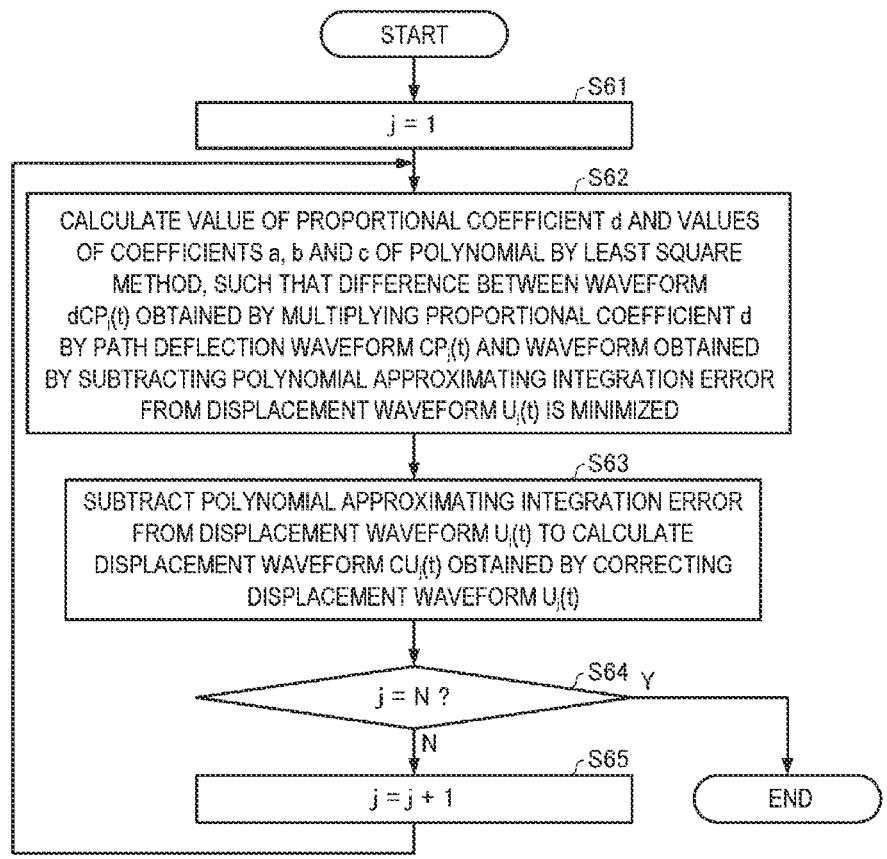
FIG. 25 is a flowchart showing an example of a procedure of a displacement waveform correction step according to the first embodiment.

FIG. 25 is a flowchart showing an example of a procedure of the displacement waveform correction step, which is step S6 in FIG. 22.

As shown in FIG. 25, first, the measurement device 1 sets the integer j to 1 (step S61), and calculates the value of the proportional coefficient d and the values of the coefficients a, b and c of the polynomial by the least square method, such that a difference between a waveform $dCP_j(t)$ obtained by multiplying the proportional coefficient d by the path deflection waveform $CP_j(t)$ and a waveform obtained by subtracting the above-described Equation (50) which is the polynomial approximating the integration error from the displacement waveform $U_j(t)$ is minimized (step S62). Specifically, the measurement device 1 calculates the values of a, b, c and d according to the above-described Equations (61) to (64).

Next, as the above-described Equation (51), by subtracting the Equation (50) which is the polynomial approximating the integration error from the displacement waveform $U_j(t)$, the measurement device 1 calculates a displacement waveform $CU_j(t)$ obtained by correcting the displacement waveform $U_j(t)$ (step S63).

When the integer j is not N (N in step S64), the measurement device 1 adds 1 to the integer j (step S65), and repeats the processing in steps S62 and S63.

Then, when the integer j is N (Y in step S64), the measurement device 1 ends the processing in the displacement waveform correction step.

1-6 Measurement Device Configuration

Figure 26:
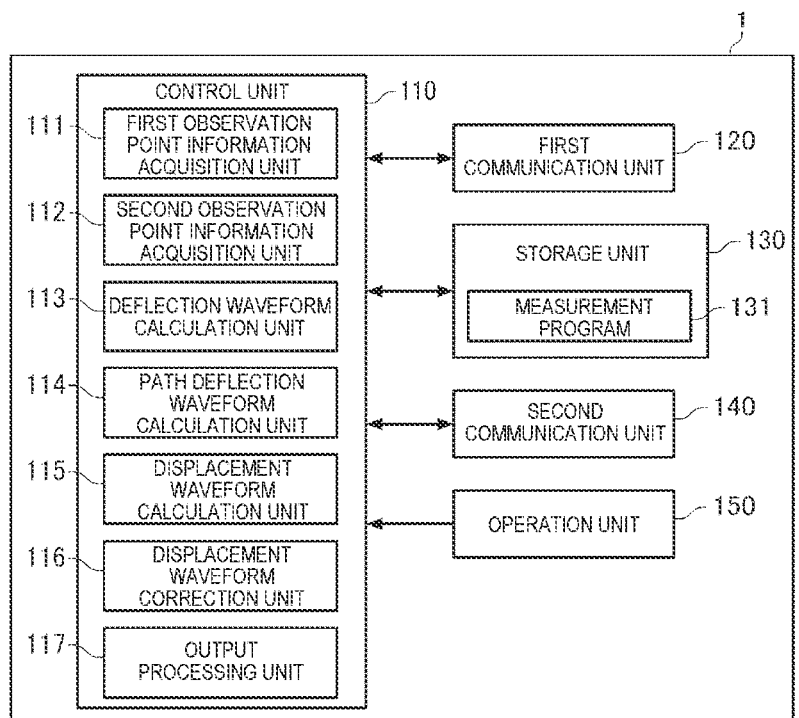
FIG. 26 is a diagram showing a configuration example of a measurement device according to the first embodiment.

FIG. 26 is a diagram showing a configuration example of the measurement device 1 according to the first embodiment. As shown in FIG. 26, the measurement device 1 includes a control unit 110, a first communication unit 120, a storage unit 130, a second communication unit 140, and an operation unit 150.

The control unit 110 calculates a displacement or the like of the superstructure 7 based on the acceleration data output from each of the sensors 21, 22, and 23 installed in the bridge 5.

The first communication unit 120 receives the acceleration data from each of the sensors 21, 22, and 23. The acceleration data output from each of the sensors 21 and 22 is, for example, a digital signal. The first communication unit 120 outputs the acceleration data received from each of the sensors 21, 22, and 23 to the control unit 110.

The storage unit 130 is a memory that stores a program, data, and the like for the control unit 110 to perform calculation processing and control processing. In addition, the storage unit 130 stores a program, data, and the like for the control unit 110 to implement a predetermined application function. The storage unit 130 is implemented by, for example, various integrated circuit (IC) memories such as a read only memory (ROM), a flash ROM, and a random access memory (RAM), and a recording medium such as a hard disk and a memory card.

The storage unit 130 includes a non-volatile information storage device that is a device or a medium that can be read by a computer. Various programs, data, and the like may be stored in the information storage device. The information storage device may be an optical disk such as an optical disk DVD or a CD, a hard disk drive, or various types of memory such as a card-type memory or a ROM. The control unit 110 may receive various programs, data, and the like via the communication network 4 and store the programs, the data, and the like in the storage unit 130.

The second communication unit 140 transmits information such as a calculation result of the control unit 110 to the server 2 via the communication network 4.

The operation unit 150 acquires operation data from the user and transmits the operation data to the control unit 110.

The control unit 110 includes a first observation point information acquisition unit 111, a second observation point information acquisition unit 112, a displacement waveform calculation unit 113, a path deflection waveform calculation unit 114, a displacement waveform calculation unit 115, a displacement waveform correction unit 116, and an output processing unit 117.

For each integer j of 1 or more and N or less, and based on the observation information obtained by the sensor 21 that observes the observation point $P_j$, the first observation point information acquisition unit 111 performs processing of acquiring the first observation point information including the time point when each of a plurality of axles of the vehicle 6 passes the observation point $P_j$, and acceleration intensity as the physical quantity which is the response to the action of each of the plurality of axles on the observation point P That is, the first observation point information acquisition unit 111 performs the processing of the first observation point information acquisition step in FIG. 22. The first observation point information acquired by the first observation point information acquisition unit 111 is stored in the storage unit 130.

Based on the observation information obtained by the sensor 22 that observes the observation point $Q_j$, the second observation point information acquisition unit 112 performs processing of acquiring the second observation point information including the time point when each of the plurality of axles of the vehicle 6 passes the observation point $Q_j$, and acceleration intensity as the physical quantity which is the response to the action of each of the plurality of axles on the observation point Q That is, the second observation point information acquisition unit 112 performs the processing of the second observation point information acquisition step in FIG. 22. The second observation point information acquired by the second observation point information acquisition unit 112 is stored in the storage unit 130.

Based on the first observation point information acquired by the first observation point information acquisition unit 111, the second observation point information acquired by the second observation point information acquisition unit 112, the predetermined coefficient p, and the approximate expression of deflection of the superstructure 7 based on the structural model of the superstructure 7, the deflection waveform calculation unit 113 performs processing of calculating the deflection waveform $H_{jk}(t)$ of the superstructure 7 generated by each of the plurality of axles of the vehicle 6. That is, the deflection waveform calculation unit 113 performs the processing of the deflection waveform calculation step in FIG. 22. The deflection waveforms $H_{jk}(t)$ calculated by the deflection waveform calculation unit 113 are stored in the storage unit 130. The predetermined coefficient p and the approximate expression of deflection of the superstructure 7 are stored in the storage unit 130 in advance.

The path deflection waveform calculation unit 114 performs processing of calculating the vehicle deflection waveform $CP_{jm}(t)$ by adding the deflection waveforms $H_{jk}(t)$ of the superstructure 7 generated by the plurality of axles of the vehicle 6, which are calculated by the deflection waveform calculation unit 113, and calculating a path deflection waveform $CP_j(t)$ of the lane $L_j$ based on the vehicle deflection waveform $CP_{jm}(t)$. That is, the path deflection waveform calculation unit 114 performs the processing of the path deflection waveform calculation step in FIG. 22. The path deflection waveform $CP_j(t)$ calculated by the path deflection waveform calculation unit 114 is stored in the storage unit 130.

Based on observation information obtained by the sensor 23 that observes the observation point R, the displacement waveform calculation unit 115 performs processing of acquiring the acceleration at the observation point $R_j$, and calculating the displacement waveform $U_j(t)$ at the observation point $R_j$ by twice integrating the acquired acceleration. That is, the displacement waveform calculation unit 115 performs the processing of the displacement waveform calculation step in FIG. 22. The displacement waveform $U_j(t)$ calculated by the displacement waveform calculation unit 115 is stored in the storage unit 130.

Based on the path deflection waveform $CP_j(t)$ calculated by the path deflection waveform calculation unit 114, the displacement waveform correction unit 116 performs processing of calculating the value of each coefficient of the polynomial approximating the integration error when the acceleration is twice integrated by the displacement waveform calculation unit 115, and correcting the displacement waveform $U_j(t)$ based on the calculated value of each coefficient. That is, the displacement waveform correction unit 116 performs the processing of the displacement waveform correction step in FIG. 22. The displacement waveform $U_j(t)$ obtained by the displacement waveform correction unit 116 correcting the displacement waveform $U_j(t)$ is stored in the storage unit 130.

The output processing unit 117 performs processing of outputting the displacement waveform $CU_j(t)$ calculated by the displacement waveform correction unit 116 to the server 2 via the second communication unit 140. That is, the output processing unit 117 performs the processing of the output step in FIG. 22.

In the present embodiment, the control unit 110 is a processor that executes various programs stored in the storage unit 130. By executing a measurement program 131 stored in the storage unit 130, the control unit 110 implements each function of the first observation point information acquisition unit 111, the second observation point information acquisition unit 112, the deflection waveform calculation unit 113, the path deflection waveform calculation unit 114, the displacement waveform calculation unit 115, the displacement waveform correction unit 116, and the output processing unit 117. In other words, the measurement program 131 is a program that causes the measurement device 1 which is a computer to execute each procedure in the flowchart shown in FIG. 22.

In the processor, for example, functions of each part may be implemented by individual hardware, or the functions of each part may be implemented by integrated hardware. For example, the processor may include hardware. The hardware may include at least one of a circuit for processing the digital signal and a circuit for processing an analog signal. The processor may be a central processing unit (CPU), a graphics processing unit (GPU), a digital signal processor (DSP), or the like. The control unit 110 is implemented as a custom integrated circuit (IC) such as an application specific integrated circuit (ASIC), and may implement the functions of each part, or may implement the functions of each part by the CPU and the ASIC.

1-7 Operation Effect

In the measurement method according to the first embodiment described above, the measurement device 1 acquires, based on the observation information obtained by each sensor 21 that observes the observation point $P_j$, the first observation point information including the time point when each axle of the vehicle 6 traveling on the lane $L_j$ passes the observation point $P_j$ and the acceleration intensity. The measurement device 1 acquires, based on the observation information obtained by the sensor 22 that observes the observation point $Q_j$, the second observation point information including the time point when each axle of the vehicle 6 passes any observation point $Q_j$ and the acceleration intensity. Based on the first observation point information, the second observation point information, the predetermined coefficient p, and the approximate expression (39) of deflection of the superstructure 7 based on the structural model of the superstructure 7, the measurement device 1 calculates, according to Equation (44), the deflection waveform $H_{jk}(t)$ of the superstructure 7 generated by each axle, calculates the vehicle deflection waveform $CP_{jm}(t)$ by adding the deflection waveforms $H_{jk}(t)$, and calculates the path deflection waveform $CP_j(t)$ of the lane $L_j$ based on the vehicle deflection waveform $CP_j(t)$. Next, based on the observation information obtained by the sensor 23 that observes the observation point $R_j$, the measurement device 1 acquires the acceleration at the observation point $R_j$, and calculates the displacement waveform $U_j(t)$ of the observation point $R_j$ by twice integrating the acquired acceleration. Next, based on a path deflection waveform $CP_j(t)$, the measurement device 1 calculates the values of the coefficients a, b and c in the polynomial (50) approximating the integration error when the acceleration is twice integrated, and corrects the displacement waveform $U_j(t)$ based on the calculated values of the coefficients a, b and c. Specifically, the measurement device 1 calculates the value of the proportional coefficient d and the values of the coefficients a, b and c of the polynomial (50) by the least square method such that the difference between the waveform obtained by multiplying the proportional coefficient d by the path deflection waveform $CP_j(t)$ and the waveform obtained by subtracting the polynomial (50) from the displacement waveform $U_j(t)$ is minimized, and calculates, according to Equation (51), the displacement waveform $CU_j(t)$ obtained by subtracting the polynomial (50) from the displacement waveform $U_j(t)$. Therefore, according to the measurement method of the first embodiment, the measurement device 1 can estimate the integration error when the acceleration acting on the superstructure 7 by the vehicle 6 is integrated, and can accurately calculate the displacement waveform $CU_j(t)$ of the superstructure 7.

According to the measurement method of the first embodiment, the measurement device 1 calculates the values of the coefficients a, b, and c in the polynomial (50) and the value of the proportionality coefficient d by the least square method using all data of the displacement waveform $U_j(t)$ and the path deflection waveform $CP_j(t)$ in the integral interval. Therefore, the effect to the correction due to a noise of the observed displacement data is small although the calculation amount is larger, so that a highly accurate displacement waveform $CU_j(t)$ is obtained.

According to the measurement method of the first embodiment, the measurement device 1 calculates the displacement waveform $CU_j(t)$ using the acceleration sensor that has a degree of freedom in installation higher than those of the displacement meter and the strain gauge, and that can be easily installed, so that cost of the measurement system 10 can be reduced.

According to the measurement method of the first embodiment, since the measurement device 1 calculates the displacement waveform which is the deformation of the superstructure 7 due to the axle weight of the vehicle 6 passing through the superstructure 7, sufficient information can be provided for maintenance of the bridge 5 to predict the damage of the superstructure 7.

2. Second Embodiment

A measurement method according to a second embodiment is different from the measurement method according to the first embodiment in processing of the displacement waveform correction step. Hereinafter, in the second embodiment, the same components as those in the first embodiment will be denoted by the same reference numerals, repetitive description as that in the first embodiment will be omitted or simplified, and contents different from that in the first embodiment will be mainly described.

In the measurement method according to the second embodiment, it is assumed that in Equation (50) which is the quadratic polynomial of the approximate integration error $u_\varepsilon(t)$ that approximates the integration error when the displacement is calculated based on the acceleration, the primary term coefficient b and the zero-order term coefficient c are sufficiently small with respect to the secondary term coefficient a, so that b and c may be considered to be zero. Accordingly, the quadratic polynomial (50) is replaced with a quadratic polynomial (65) in which the primary term coefficient b and the zero-order term coefficient c are zero.

$$u_\varepsilon(t) = at^2 \tag{65}$$

Since Equation (50) is replaced with Equation (65), Equation (51) for correcting the displacement waveform $U_j(t)$ is replaced with Equation (66).

$$CU_j(t) = U_j(t) - u_\varepsilon(t) = U_j(t) - at^2 \tag{66}$$

Since Equation (51) is replaced by Equation (66), Equation (52) indicating the residual $e_k$ is replaced with Equation (67).

$$e_k dCP_j(t_k) - (U_j(t_k) - u_\varepsilon(t_k)) = dCP_j(t_k) - U_j(t_k) + at_k^2 \tag{67}$$

The coefficients a and d are calculated by the least square method such that the residual $e_k$ in Equation (67) is minimized. First, Equation (68) is obtained by squaring both sides of Equation (67).

$$e_k^2 = (dCP_j(t_k) - U_j(t_k) + at_k^2)^2 \tag{68}$$

Equation (68) is partially differentiated by the coefficient a, and Equation (69) is obtained.

$$at_k^4 + dCP_j(t_k)t_k^2 = t_k^2 U_j(t_k) \tag{69}$$

Equation (68) is partially differentiated by the coefficient d, and Equation (70) is obtained.

$$CP_j(t_k)at_k^2 + dCP_j(t_k)^2 = CP_j(t_k)U_j(t_k) \tag{70}$$

Equation (69) and Equation (70) are summarized, and Equation (71) is obtained.

$$\begin{pmatrix} t_k^4 & CP_j(t_k)t_k^2 \\ CP_j(t_k)t_k^2 & CP_j(t_k)^2 \end{pmatrix} \begin{pmatrix} a \\ d \end{pmatrix} = \begin{pmatrix} U_j(t_k)t_k^2 \\ CP_j(t_k)U_j(t_k) \end{pmatrix} \tag{71}$$

Each element of Equation (71) is replaced with a total sum of data in the integral interval, and Equation (72) is obtained.

$$\begin{pmatrix} \sum_{k=1}^{n} t_k^4 & \sum_{k=1}^{n} CP_j(t_k)t_k^2 \\ \sum_{k=1}^{n} CP_j(t_k)t_k^2 & \sum_{k=1}^{n} CP_j(t_k)^2 \end{pmatrix} \begin{pmatrix} a \\ d \end{pmatrix} = \begin{pmatrix} \sum_{k=1}^{n} U_j(t_k)t_k^2 \\ \sum_{k=1}^{n} CP_j(t_k)U_j(t_k) \end{pmatrix} \tag{72}$$

The elements of Equation (72) are replaced as shown in Equation (73), and values of coefficients a and d are calculated as in Equations (74) and (75) by the sweep-out method.

$$\begin{pmatrix} A & B \\ B & C \end{pmatrix} \begin{pmatrix} a \\ d \end{pmatrix} = \begin{pmatrix} D \\ E \end{pmatrix} \tag{73}$$

$$a = \frac{CD - BE}{AC - B^2} = \frac{\sum_{k=1}^{n} CP_j(t_k)^2 \sum_{k=1}^{n} U_j(t_k)_k^2 - \sum_{k=1}^{n} CP_j(t_k)t_k^2 \sum_{k=1}^{n} CP_j(t_k)U_j(t_k)}{\sum_{k=1}^{n} t_k^4 \sum_{k=1}^{n} CP_j(t_k)^2 - \left(\sum_{k=1}^{n} CP_j(t_k)t_k^2\right)^2} \tag{74}$$

$$d = \frac{E - Ba}{C} = \frac{\sum_{k=1}^{n} CP_j(t_k)U_j(t_k) - a\sum_{k=1}^{n} CP_j(t_k)t_k^2}{\sum P_k^2}$$
$$= \frac{\sum P_k u_k - a\sum P_k t_k^2}{\sum P_k^2} \tag{75}$$

The measurement device 1 calculates the value of the coefficient a according to Equation (74), and substitutes the value of the coefficient a into Equation (66) to calculate the displacement waveform $CU_j(t)$ obtained by correcting the displacement waveform $U_j(t)$.

Figure 27:
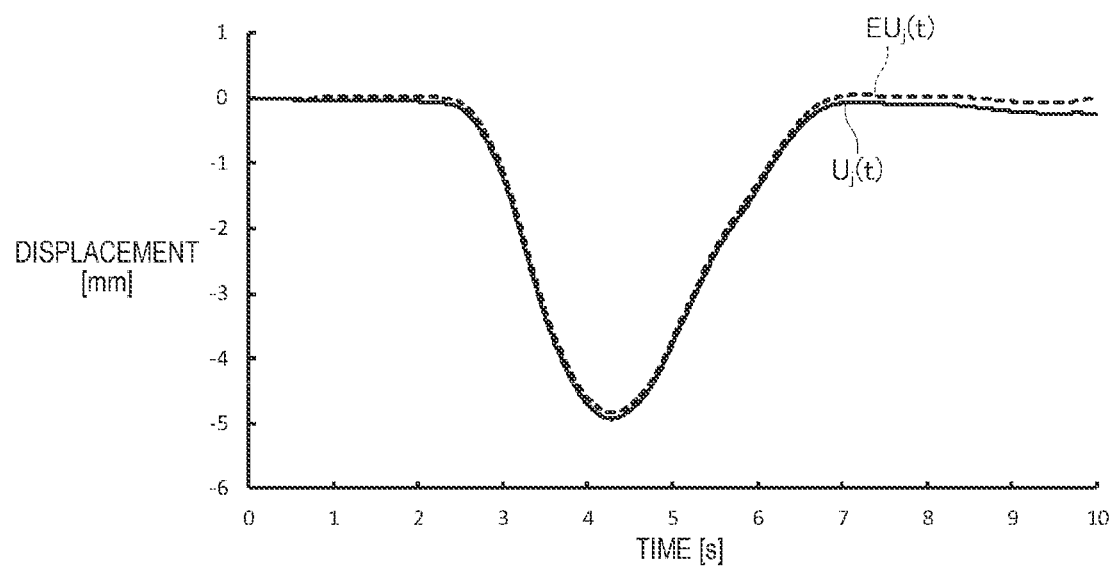
FIG. 27 is a diagram showing an example of a corrected displacement waveform according to a second embodiment.
Figure 28:
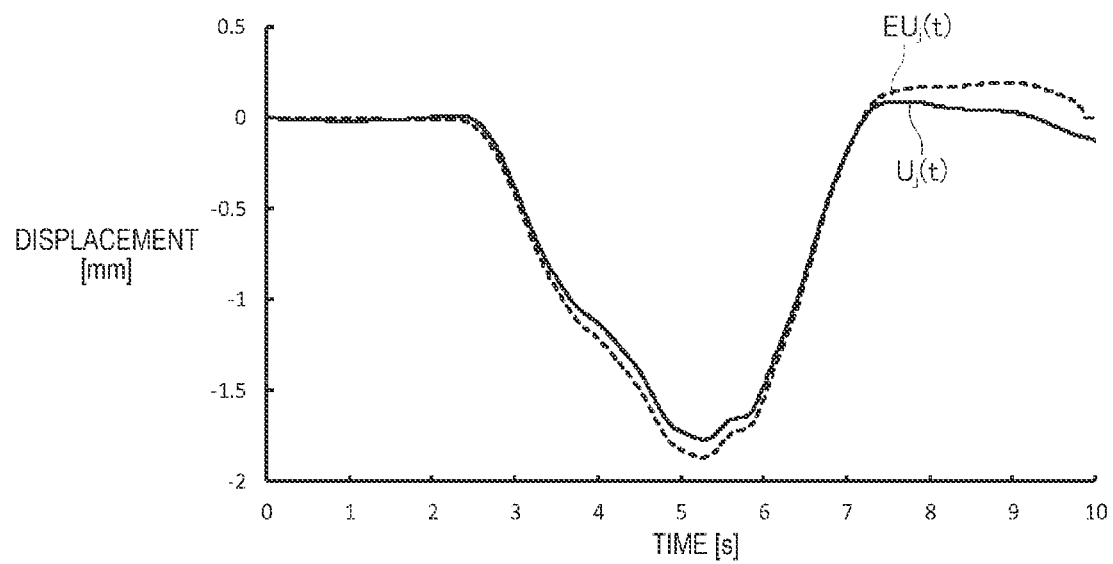
FIG. 28 is a diagram showing another example of the corrected displacement waveform according to the second embodiment.

FIG. 27 shows, by a solid line, an example of the displacement waveform $CU_j(t)$ obtained by correcting the displacement waveform $U_j(t)$. FIG. 28 shows, by a solid line, an example of the displacement waveform $CU_j(t)$. In each of FIGS. 27 and 28, a horizontal axis represents time, and a vertical axis represents a displacement. A strain gauge is installed at the observation point $R_j$ in a test manner, and a displacement waveform $EU_j(t)$ converted from a waveform measured by the strain gauge is also shown in FIGS. 27 and 28 by a broken line. As shown in FIGS. 27 and 28, in the displacement waveform $CU_j(t)$, the integration error is almost removed, and the displacement waveform $CU_j(t)$ is similar to the displacement waveform $EU_j(t)$. That is, a result that the quadratic polynomial of the approximate integration error $u_e(t)$ may be defined as Equation (65) is obtained.

Figure 29:
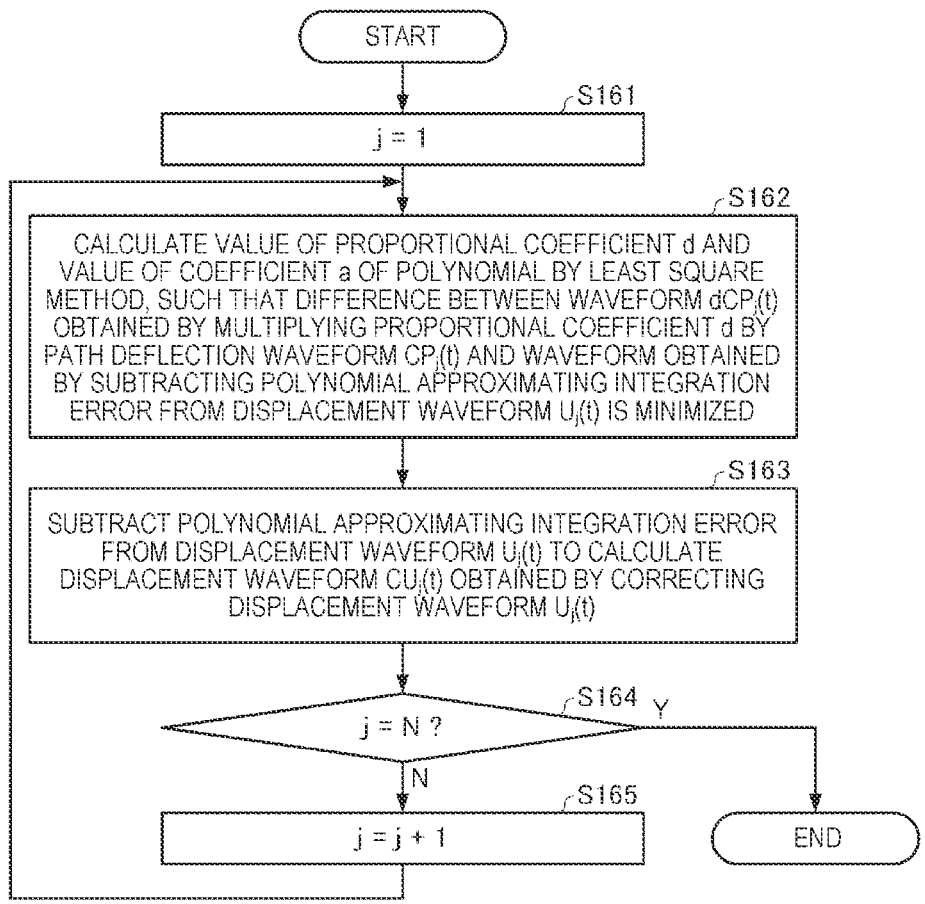
FIG. 29 is a flowchart showing an example of a procedure of a displacement waveform correction step according to the second embodiment.

FIG. 29 is a flowchart showing an example of a procedure of the displacement waveform correction step, which is step S6 in FIG. 22.

As shown in FIG. 29, first, the measurement device 1 sets the integer j to 1 (step S161), and calculates the value of the proportional coefficient d and the value of the coefficient a of the polynomial by the least square method, such that a difference between the waveform $dCP_j(t)$ obtained by multiplying the proportional coefficient d by the path deflection waveform $CP_j(t)$ and a waveform obtained by subtracting the above-described Equation (65) which is the polynomial approximating the integration error from the displacement waveform $U_j(t)$ is minimized (step S162). Specifically, the measurement device 1 calculates the values of a and d according to the above-described Equations (74) and (75).

Next, as Equation (66), by subtracting Equation (65) which is the polynomial approximating the integration error from the displacement waveform $U_j(t)$, the measurement device 1 calculates the displacement waveform $CU_j(t)$ obtained by correcting the displacement waveform $U_j(t)$ (step S163).

When the integer j is not N (N in step S164), the measurement device 1 adds 1 to the integer j (step S165), and repeats the processing in steps S162 and S163.

Then, when the integer j is N (Y in step S164), the measurement device 1 ends the processing in the displacement waveform correction step.

The configuration of the measurement device 1 according to the second embodiment is the same as that in FIG. 26, and thus illustration and description thereof will be omitted.

In the measurement method of the second embodiment described above, the measurement device 1 calculates the value of the proportional coefficient d and the value of the secondary term coefficient a of the quadratic polynomial (65) by the least square method, such that the difference between the waveform obtained by multiplying the proportional coefficient d by the path deflection waveform $CP_j(t)$ and the waveform obtained by subtracting the quadratic polynomial (65), in which the value of the primary term coefficient b and the value of the zero-order term coefficient c are zero, from the displacement waveform $U_j(t)$ is minimized, and calculates, according to Equation (66), the displacement waveform $CU_j(t)$ obtained by subtracting the quadratic polynomial (65) from the displacement waveform $U_j(t)$. Therefore, according to the measurement method of the second embodiment, the measurement device 1 can estimate the integration error when the acceleration acting on the superstructure 7 by the vehicle 6 is integrated, and can accurately calculate the displacement waveform $CU_j(t)$ of the superstructure 7.

According to the measurement method of the second embodiment, the measurement device 1 calculates the value of the coefficient a in the quadratic polynomial (65) and the value of the proportionality coefficient d by the least square method using all data of the displacement waveform $U_j(t)$ and the path deflection waveform $CP_j(t)$ in the integral interval. Therefore, although a correction accuracy is lower than that of the measurement method according to the first embodiment in which the values of the coefficients a, b, and c and the value of the proportionality coefficient d are calculated, a calculation amount is small.

According to the measurement method of the second embodiment, since the measurement device 1 calculates the displacement waveform $CU_j(t)$ using the acceleration sensor that has a degree of freedom in installation higher than those of the displacement meter and the strain gauge, and that can be easily installed, the cost of the measurement system 10 can be reduced.

3. Third Embodiment

A measurement method according to a third embodiment is different from the measurement methods according to the first embodiment and the second embodiment in processing of the displacement waveform correction step. Hereinafter, in the third embodiment, the same components as those in the first embodiment or the second embodiment will be denoted by the same reference numerals, repetitive description as that in the first embodiment or the second embodiment will be omitted or simplified, and contents different from those in the first embodiment and the second embodiment will be mainly described.

As shown in Equation (76), at the time point $t_k$, a residual between a waveform $d_1 CP_j(t)$ obtained by multiplying any first proportional coefficient $d_1$ by the path deflection waveform $CP_j(t)$ and a waveform obtained by subtracting a first quadratic polynomial from the displacement waveform $U_j(t)$ is set to $e_{k1}$. In other words, the residual $e_{k1}$ is a waveform obtained by adding the first quadratic polynomial to a first difference between the waveform $d_1 CP_j(t)$ obtained by multiplying the first proportional coefficient $d_1$ by the path deflection waveform $CP_j(t)$ and the displacement waveform $U_j(t)$.

$$e_{k1} = d_1 CP_j(t_k) - \{(U_j(t_k) - (a_1 t_k^2 + b_1 t_k + c_1)\} = d_1 CP_j(t_k) - U_j(t_k) + a_1 t_k^2 + b_1 t_k + c_1 \tag{76}$$

Similarly, as shown in Equation (77), at the time point $t_k$, a residual between a waveform $d_2CP_j(t)$ obtained by multiplying any second proportional coefficient $d_2$, which is different from the first proportional coefficient $d_1$, by the path deflection waveform $CP_j(t)$ and a waveform obtained by subtracting a second quadratic polynomial from the displacement waveform $U_j(t)$ is set to $e_{k2}$. In other words, the residual $e_{k2}$ is a waveform obtained by adding the second quadratic polynomial to a second difference between the waveform $d_2CP_j(t)$ obtained by multiplying the second proportional coefficient $d_2$ by the path deflection waveform $CP_j(t)$ and the displacement waveform $U_j(t)$.

$$e_{k2}=d_2CP_j(t_k)-(U_j(t_k)-(a_2t_k^2+b_2t_k+c_2))=d_2CP_j(t_k)-U_j(t_k)+a_2t_k^2+b_2t_k+c_2 \quad (77)$$

In Equation (76), when the first difference between the waveform $d_1CP_j(t_k)$ and the displacement waveform $U_j(t_k)$ is set to $u_1'(t_k)$, Equation (76) becomes Equation (78).

$$e_{k1}=u_1'(t_k)+(a_1t_k^2+b_1t_k+c_1) \quad (78)$$

Similarly, in Equation (77), when the second difference between the waveform $d_2CP_j(t_k)$ and the displacement waveform $U_j(t_k)$ is set to $u_2'(t_k)$, Equation (77) becomes Equation (79).

$$e_{k2}=u_2'(t_k)+(a_2t_k^2+b_2t_k+c_2) \quad (79)$$

The coefficients $a_1$, $b_1$ and $c_1$ of the first quadratic polynomial are calculated by the least square method such that the residual $e_{k1}$ in Equation (78) is minimized. First, Equation (80) is obtained by squaring both sides of Equation (78).

$$e_{k1}^2=\{u_1'(t_k)+(a_1t_k^2+b_1t_k+c_1)\}^2 \quad (80)$$

Equation (80) is partially differentiated by the coefficient $a_1$, and Equation (81) is obtained.

$$a_1t_k^4+b_1t_k^3+c_1t_k^2=-t_k^2u_1'(t_k) \quad (81)$$

Equation (80) is partially differentiated by the coefficient $b_1$, and Equation (82) is obtained.

$$a_1t_k^3+b_1t_k^2+c_1t_k=-t_ku_1'(t_k) \quad (82)$$

Equation (80) is partially differentiated by the coefficient cl, and Equation (83) is obtained.

$$a_1t_k^2+b_1t_k+c_1=-u_1'(t_k) \quad (83)$$

Equation (81) to Equation (83) are summarized, and Equation (84) is obtained.

$$\begin{pmatrix} t_k^4 & t_k^3 & t_k^2 \\ t_k^3 & t_k^2 & t_k \\ t_k^2 & t_k & 1 \end{pmatrix} \begin{pmatrix} a_1 \\ b_1 \\ c_1 \end{pmatrix} = \begin{pmatrix} -t_k^2 u_1'(t_k) \\ -t_k u_1'(t_k) \\ -u_1'(t_k) \end{pmatrix} \quad (84)$$

Each element of Equation (84) is replaced with a total sum of data in the integral interval, and Equation (85) is obtained.

$$\begin{pmatrix} \sum_{k=1}^{n} t_k^4 & \sum_{k=1}^{n} t_k^3 & \sum_{k=1}^{n} t_k^2 \\ \sum_{k=1}^{n} t_k^3 & \sum_{k=1}^{n} t_k^2 & \sum_{k=1}^{n} t_k \\ \sum_{k=1}^{n} t_k^2 & \sum_{k=1}^{n} t_k & \sum_{k=1}^{n} 1 \end{pmatrix} \begin{pmatrix} a_1 \\ b_1 \\ c_1 \end{pmatrix} = \begin{pmatrix} -\sum_{k=1}^{n} t_k^2 u_1'(t_k) \\ -\sum_{k=1}^{n} t_k u_1'(t_k) \\ -\sum_{k=1}^{n} u_1'(t_k) \end{pmatrix} \quad (85)$$

The elements of Equation (85) are replaced as shown in Equation (86), and values of coefficients $a_1$, $b_1$ and $c_1$ are calculated as in Equations (87) and (89) by the sweep-out method.

$$\begin{pmatrix} A_1 & B_1 & C_1 \\ B_1 & C_1 & D_1 \\ C_1 & D_1 & n \end{pmatrix} \begin{pmatrix} a_1 \\ b_1 \\ c_1 \end{pmatrix} = \begin{pmatrix} E_1 \\ F_1 \\ G_1 \end{pmatrix} \quad (86)$$

$$a_1 = \frac{(nE_1 - C_1G_1)(nC_1 - D_1^2) - (nF_1 - D_1C_1)(nB_1 - C_1D_1)}{(nA_1 - C_1^2)(nC_1 - D_1^2) - (nB_1 - C_1D_1)^2} \quad (87)$$

$$b_1 = \frac{nF_1 - D_1C_1 - a_1(nB_1 - C_1D_1)}{nC_1 - D_1^2} \quad (88)$$

$$c_1 = \frac{1}{n}(G_1 - C_1a_1 - D_1b_1) \quad (89)$$

Similarly, the coefficients $a_2$, $b_2$ and $c_2$ of the second quadratic polynomial are calculated by the least square method such that the residual $e_{k2}$ in Equation (79) is minimized. First, Equation (90) is obtained by squaring both sides of Equation (79).

$$e_{k2}^2=\{u_2'(t_k)+(a_2t_k^2+b_2t_k+c_2)\}^2 \quad (90)$$

Equation (90) is partially differentiated by the coefficients $a_2$, $b_2$ and $c_2$ respectively and summarized, and Equation (91) is obtained.

$$\begin{pmatrix} t_k^4 & t_k^3 & t_k^2 \\ t_k^3 & t_k^2 & t_k \\ t_k^2 & t_k & 1 \end{pmatrix} \begin{pmatrix} a_2 \\ b_2 \\ c_2 \end{pmatrix} = \begin{pmatrix} -t_k^2 u_2'(t_k) \\ -t_k u_2'(t_k) \\ -u_2'(t_k) \end{pmatrix} \quad (91)$$

Each element of Equation (91) is replaced with a total sum of data in the integral interval, and Equation (92) is obtained.

$$\begin{pmatrix} \sum_{k=1}^{n} t_k^4 & \sum_{k=1}^{n} t_k^3 & \sum_{k=1}^{n} t_k^2 \\ \sum_{k=1}^{n} t_k^3 & \sum_{k=1}^{n} t_k^2 & \sum_{k=1}^{n} t_k \\ \sum_{k=1}^{n} t_k^2 & \sum_{k=1}^{n} t_k & \sum_{k=1}^{n} 1 \end{pmatrix} \begin{pmatrix} a_2 \\ b_2 \\ c_2 \end{pmatrix} = \begin{pmatrix} -\sum_{k=1}^{n} t_k^2 u_2'(t_k) \\ -\sum_{k=1}^{n} t_k u_2'(t_k) \\ -\sum_{k=1}^{n} u_2'(t_k) \end{pmatrix} \quad (92)$$

The elements of Equation (92) are replaced as shown in Equation (93), and values of coefficients $a_2$, $b_2$ and $c_2$ are calculated as in Equations (94) and (96) by the sweep-out method.

$$\begin{pmatrix} A_2 & B_2 & C_2 \\ B_2 & C_2 & D_2 \\ C_2 & D_2 & n \end{pmatrix} \begin{pmatrix} a_2 \\ b_2 \\ c_2 \end{pmatrix} = \begin{pmatrix} E_2 \\ F_2 \\ G_2 \end{pmatrix} \quad (93)$$

$$a_2 = \frac{(nE_2 - C_2G_2)(nC_2 - D_2^2) - (nF_2 - D_2C_2)(nB_2 - C_2D_2)}{(nA_2 - C_2^2)(nC_2 - D_2^2) - (nB_2 - C_2D_2)^2} \quad (94)$$

$$b_2 = \frac{nF_2 - D_2C_2 - a_2(nB_2 - C_2D_2)}{nC_2 - D_2^2} \quad (95)$$

$$c_2 = \frac{1}{n}(G_2 - C_2a_2 - D_2b_2) \quad (96)$$

A sum of the residuals $e_{11}$ to $e_{n1}$ represented by the above Equation (76) is defined as a first sum $E_{n1}$. However, as shown in Equation (97), the coefficients $b_1$ and $c_1$ are set to zero, and the first sum $E_{n1}$ is calculated. In other words, the first sum $E_{n1}$ is a sum of values each being obtained by adding the first difference between the waveform $d_1 CP_j(t)$, which is obtained by multiplying the first proportional coefficient $d_1$ by the path deflection waveform $CP_j(t)$, and the displacement waveform $U_j(t)$ to the secondary term $a_1 t^2$ in the first quadratic polynomial in a period when the displacement waveform $U_j(t)$ is calculated.

$$E_{n1} = \sum_{k=1}^{n} e_{k1} = \sum_{k=1}^{n} \{d_1 CP_j(t_k) - U_j(t_k) + a_1 t_k^2\} \quad (97)$$

Similarly, a sum of the residuals $e_{12}$ to $e_{n2}$ represented by the above Equation (77) is defined as a second sum $E_{n2}$. However, as shown in Equation (98), the coefficients $b_2$ and $c_2$ are set to zero, and the second sum $E_{n2}$ is calculated. In other words, the second sum $E_{n2}$ is a sum of values each being obtained by adding the second difference between the waveform $d_2 CP_j(t)$, which is obtained by multiplying the second proportional coefficient $d_2$ by the path deflection waveform $CP_j(t)$, and the displacement waveform $U_j(t)$ to the secondary term $a_2 t^2$ in the second quadratic polynomial in a period when the displacement waveform $U_j(t)$ is calculated.

$$E_{n2} = \sum_{k=1}^{n} e_{k2} = \sum_{k=1}^{n} \{d_2 CP_j(t_k) - U_j(t_k) + a_2 t_k^2\} \quad (98)$$

According to Equations (97) and (98), the sum of the residuals linearly increases or decreases as the proportionality coefficient increases or decreases. Therefore, a correlation between the proportionality coefficient and the sum of the residuals is expressed by Equation (99) using the first proportional coefficient $d_1$, the second proportional coefficient $d_2$, the first sum $E_{n1}$, and the second sum $E_{n2}$ in a phasor coordinate where the proportionality coefficient is an x coordinate and the residual is a y coordinate.

$$y = \frac{E_{n2} - E_{n1}}{d_2 - d_1} x + E_{n2} - \frac{E_{n2} - E_{n1}}{d_2 - d_1} d_2 \quad (99)$$

A value of the x coordinate at a point at which a straight line represented by the Equation (99) intersects y=0, that is, a third proportional coefficient $d_0$ at which the sum of the residuals is zero, is calculated by Equation (100).

$$d_0 = d_2 - E_{n2} \frac{d_2 - d_1}{E_{n2} - E_{n1}} \quad (100)$$

Figure 30:
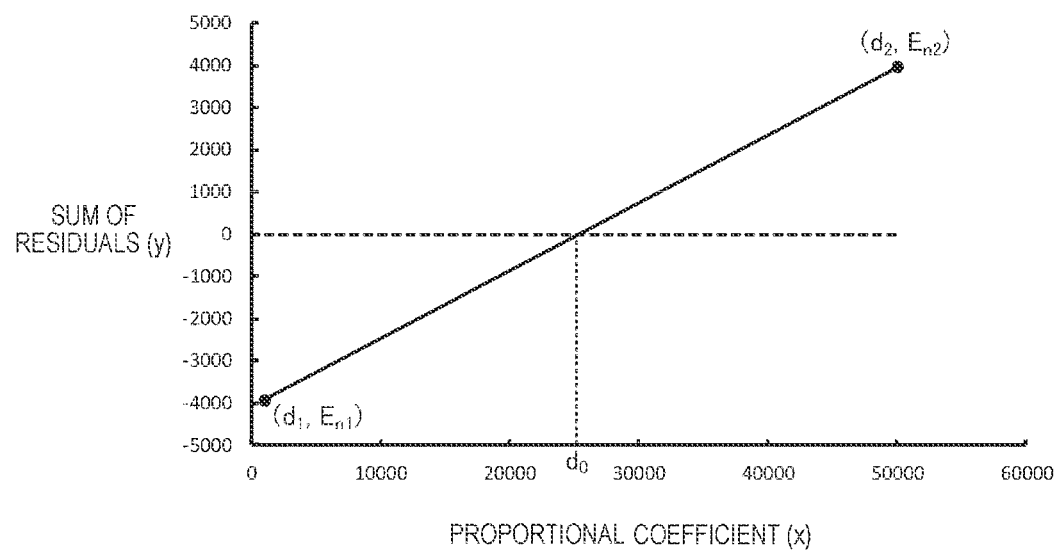
FIG. 30 is a diagram showing an example of a correlation straight line between a proportional coefficient and a sum of residuals according to a third embodiment.

FIG. 30 shows an example of a straight line showing the correlation between the proportional coefficient and the sum of the residuals expressed by Equation (99), and the third proportional coefficient $d_0$ calculated by Equation (100).

The approximate integration error $u_\varepsilon(t)$ approximating the integration error is represented by a third quadratic polynomial (101).

$$u_\varepsilon(t) = a_0 t^2 + b_0 t + c_0 \quad (101)$$

At this time, as shown in Equation (102), at the time point $t_k$, a residual between a waveform $d_0 CP_j(t)$ obtained by multiplying the third proportional coefficient do by the path deflection waveform $CP_j(t)$ and a waveform obtained by subtracting the approximate integration error $u_\varepsilon(t)$ represented by the third quadratic polynomial (101) from the displacement waveform $U_j(t)$ is set to $e_{k0}$. In other words, the residual $e_{k0}$ is a waveform obtained by adding the third quadratic polynomial (101) to the third difference between the waveform $d_0 CP_j(t)$ obtained by multiplying the third proportional coefficient $d_0$ by the path deflection waveform $CP_j(t)$ and the displacement waveform $U_j(t)$.

$$e_{k0} = d_0 CP_j(t_k) - (U_j(t_k) - u_\varepsilon(t_k)) = d_0 CP_j(t_k) - U_j(t_k) + a_0 t_k^2 + b_0 t_k + c_0 \quad (102)$$

According to Equation (100), the third proportional coefficient $d_0$ in which a third sum $E_{n0}$ of the values each being obtained by adding the third difference between the waveform $d_0 CP_j(t_k)$ and the displacement waveform $U_j(t_k)$ and the secondary term $a_0 t^2$ of the third quadratic polynomial (101) in the integral interval is zero is calculated. In Equation (102), when the third difference between the waveform $d_0 CP_j(t_k)$ and the displacement waveform $U_j(t_k)$ is set to $u_0'(t_k)$, Equation (102) becomes Equation (103).

$$e_{k0} = u_0'(t_k) + (a_0 t_k^2 + b_0 t_k + c_0) \quad (103)$$

The coefficients $a_0$, $b_0$ and $c_0$ are calculated by the least square method such that the residual $e_{k0}$ in Equation (103) is minimized. First, Equation (104) is obtained by squaring both sides of Equation (103).

$$e_{k0}^2 = \{u_0'(t_k) + (a_0 t_k^2 + b_0 t_k + c_0)\}^2 \quad (104)$$

Equation (104) is partially differentiated by the coefficients $a_0$, $b_0$ and $c_0$ respectively and summarized, and Equation (105) is obtained.

$$\begin{pmatrix} t_k^4 & t_k^3 & t_k^2 \\ t_k^3 & t_k^2 & t_k \\ t_k^2 & t_k & 1 \end{pmatrix} \begin{pmatrix} a_0 \\ b_0 \\ c_0 \end{pmatrix} = \begin{pmatrix} -t_k^2 u_0'(t_k) \\ -t_k u_0'(t_k) \\ -u_0'(t_k) \end{pmatrix} \quad (105)$$

Each element of Equation (105) is replaced with a total sum of data in the integral interval, and Equation (106) is obtained.

$$\begin{pmatrix} \sum_{k=1}^{n} t_k^4 & \sum_{k=1}^{n} t_k^3 & \sum_{k=1}^{n} t_k^2 \\ \sum_{k=1}^{n} t_k^3 & \sum_{k=1}^{n} t_k^2 & \sum_{k=1}^{n} t_k \\ \sum_{k=1}^{n} t_k^2 & \sum_{k=1}^{n} t_k & \sum_{k=1}^{n} 1 \end{pmatrix} \begin{pmatrix} a_0 \\ b_0 \\ c_0 \end{pmatrix} = \begin{pmatrix} -\sum_{k=1}^{n} t_k^2 u_0'(t_k) \\ -\sum_{k=1}^{n} t_k u_0'(t_k) \\ -\sum_{k=1}^{n} u_0'(t_k) \end{pmatrix} \quad (106)$$

The elements of Equation (106) are replaced as shown in Equation (107), and values of coefficients $a_0$, $b_0$ and $c_0$ are calculated as in Equations (108) to (110) by the sweep-out method.

$$\begin{pmatrix} A_0 & B_0 & C_0 \\ B_0 & C_0 & D_0 \\ C_0 & D_0 & n \end{pmatrix} \begin{pmatrix} a_0 \\ b_0 \\ c_0 \end{pmatrix} = \begin{pmatrix} E_0 \\ F_0 \\ G_0 \end{pmatrix} \quad (107)$$

$$a_0 = \frac{(nE_0 - C_0 G_0)(nC_0 - D_0^2) - (nF_0 - D_0 C_0)(nB_0 - C_0 D_0)}{(nA_0 - C_0^2)(nC_0 - D_0^2) - (nB_0 - C_0 D_0)^2} \quad (108)$$

$$b_0 = \frac{nF_0 - D_0 C_0 - a_0(nB_0 - C_0 D_0)}{nC_0 - D_0^2} \quad (109)$$

$$c_0 = \frac{1}{n}(G_0 - C_0 a_0 - D_0 b_0) \qquad (110)$$

As shown in Equation (111), the third quadratic polynomial which represents the approximate integration error $u_\varepsilon(t)$ is subtracted from the displacement waveform $U_j(t)$, and thus the displacement waveform $U_j(t)$ is corrected to obtain the displacement waveform $CU_j(t)$.

$$CU_j(t) = U_j(t) - u_\varepsilon(t) = U_j(t) - (a_0 t^2 + b_0 t + c_0) \qquad (111)$$

The measurement device 1 calculates the values of the coefficients $a_0$, $b_0$ and $c_0$ according to Equations (108) to (110), and substitutes the values of the coefficients $a_0$, $b_0$ and $c_0$ into Equation (111) to calculate the displacement waveform $CU_j(t)$ obtained by correcting the displacement waveform $U_j(t)$.

Figure 31:
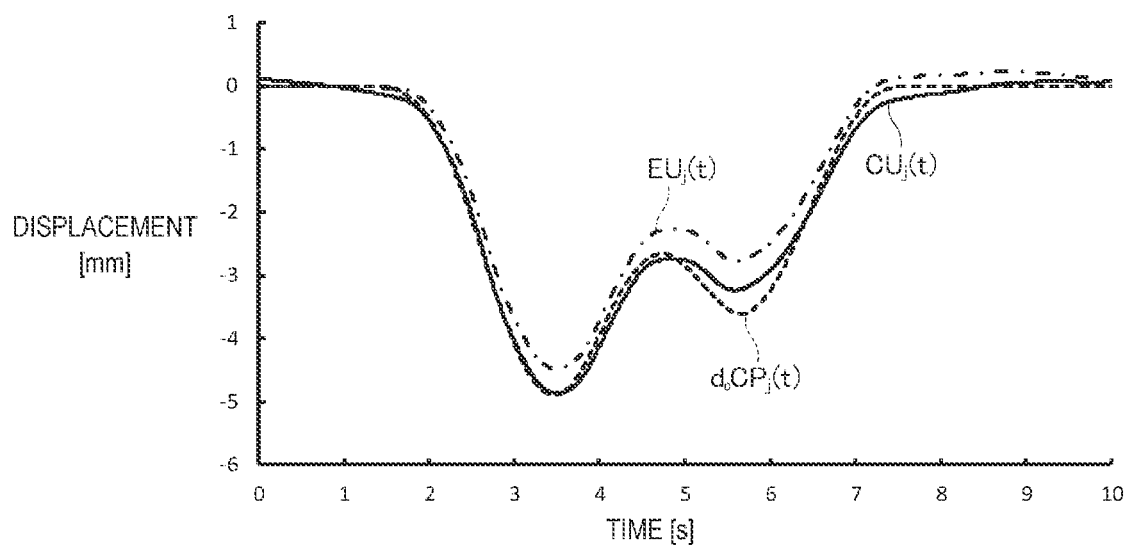
FIG. 31 is a diagram showing an example of a corrected displacement waveform according to the third embodiment.

FIG. 31 shows, by a solid line, an example of the displacement waveform $CU_j(t)$ obtained by correcting the displacement waveform $U_j(t)$. In FIG. 31, a horizontal axis represents time and a vertical axis represents a displacement. In FIG. 31, the waveform $d_0 CP_j(t)$ obtained by multiplying the path deflection waveform $CP_j(t)$ by the third proportional coefficient $d_0$ is also shown by a broken line. A strain gauge is installed at the observation point $R_j$ in a test manner, and a displacement waveform $EU_j(t)$ converted from a waveform measured by the strain gauge is also shown in FIG. 31 by a one dot chain line. As shown in FIG. 31, in the displacement waveform $CU_j(t)$, the integration error is almost removed, and the displacement waveform $CU_j(t)$ is similar to the waveform $d_0 CP_j(t)$ and the displacement waveform $EU_j(t)$.

Figure 32:
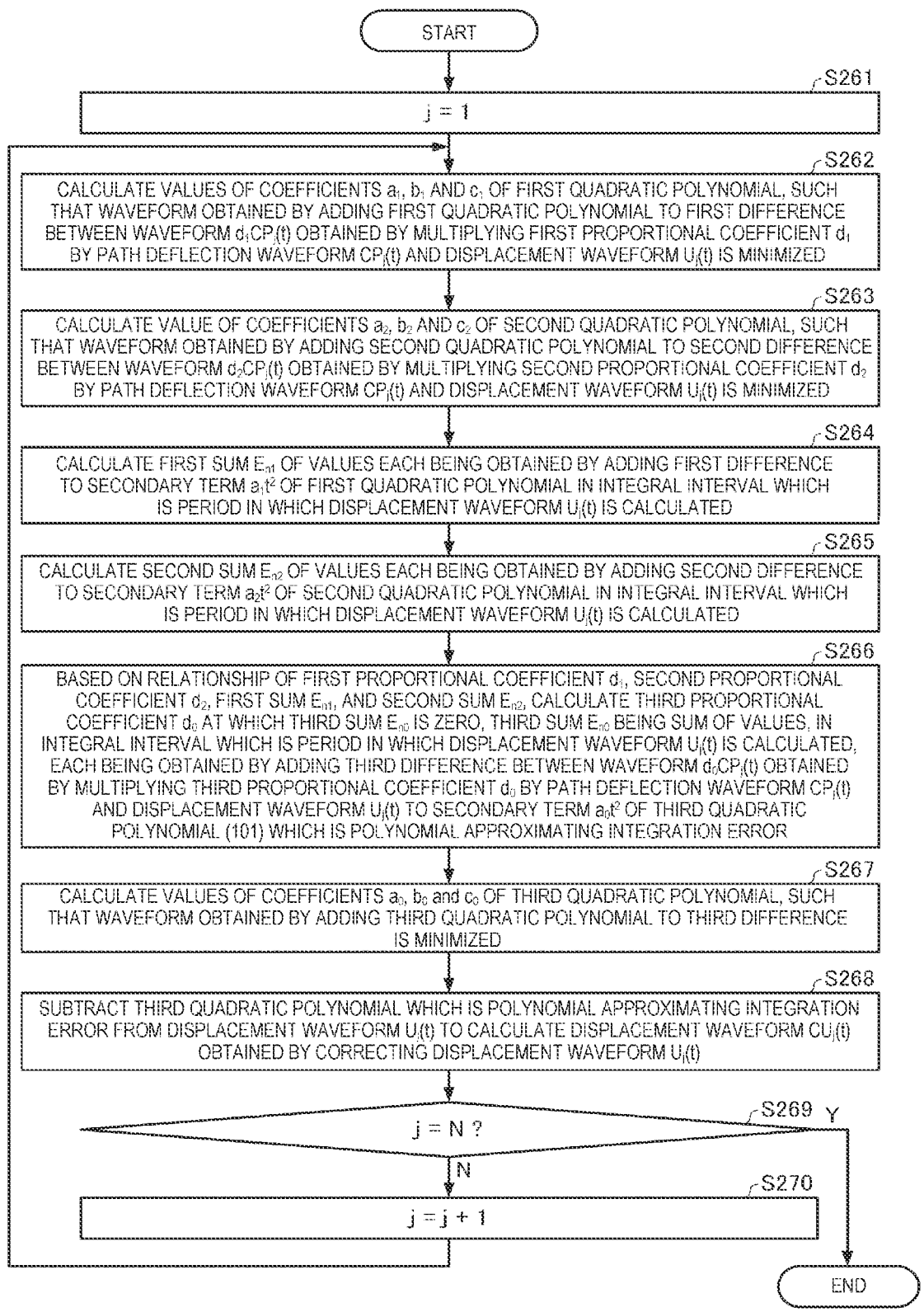
FIG. 32 is a flowchart showing an example of a procedure of a displacement waveform correction step according to the third embodiment.

FIG. 32 is a flowchart showing an example of a procedure of the displacement waveform correction step, which is step S6 in FIG. 22.

As shown in FIG. 32, first, the measurement device 1 sets the integer j to 1 (step S261), and calculates the values of the coefficients $a_1$, $b_1$ and $c_1$ of the first quadratic polynomial, such that the waveform obtained by adding the first quadratic polynomial $a_1 t^2 + b_1 t + c_1$ to the first difference between the waveform $d_1 CP_j(t)$ obtained by multiplying the first proportional coefficient $d_1$ by the path deflection waveform $CP_j(t)$ and the displacement waveform $U_j(t)$ is minimized (step S262). Specifically, the measurement device 1 calculates the values of the coefficients $a_1$, $b_1$ and $c_1$ according to Equations (87) to (89).

Next, the measurement device 1 calculates the values of the coefficients $a_2$, $b_2$ and $c_2$ of the second quadratic polynomial, such that the waveform obtained by adding the second quadratic polynomial $a_2 t^2 + b_2 t + c_2$ to the second difference between the waveform $d_2 CP_j(t)$ obtained by multiplying the second proportional coefficient $d_2$ by the path deflection waveform $CP_j(t)$ and the displacement waveform $U_j(t)$ is minimized (step S263). Specifically, the measurement device 1 calculates the values of the coefficients $a_2$, $b_2$ and $c_2$ according to Equations (94) to (96).

Next, the measurement device 1 calculates the first sum $E_{n1}$ of a values each being obtained by adding the first difference to the secondary term $a_1 t^2$ of the first quadratic polynomial in an integral interval, which is a period in which the displacement waveform $U_j(t)$ is calculated (step S264). Specifically, the measurement device 1 calculates the first sum $E_{n1}$ according to Equation (97).

Next, the measurement device 1 calculates the second sum $E_{n2}$ of values each being obtained by adding the second difference to the secondary term $a_2 t^2$ of the second quadratic polynomial in an integral interval, which is a period in which the displacement waveform $U_j(t)$ is calculated (step S265). Specifically, the measurement device 1 calculates the second sum $E_{n2}$ according to Equation (98).

Next, based on a relationship of the first proportional coefficient $d_1$, the second proportional coefficient $d_2$, the first sum $E_{n1}$, and the second sum $E_{n2}$, the measurement device 1 calculates the third proportional coefficient $d_0$ at which the third sum $E_{n0}$ is zero, and the third sum $E_{n0}$ is a sum of the values, in the integral interval which is a period in which the displacement waveform $U_j(t)$ is calculated, each being obtained by adding the third difference between the waveform $d_0 CP_j(t)$ obtained by multiplying the third proportional coefficient $d_0$ by the path deflection waveform $CP_j(t)$ and the displacement waveform $U_j(t)$ to the secondary term $a_0 t^2$ of the third quadratic polynomial (101) which is the polynomial approximating the integration error (step S266). Specifically, the measurement device 1 calculates the third proportional coefficient $d_0$ according to Equation (100).

Next, the measurement device 1 calculates the values of the coefficients $a_0$, $b_0$ and $c_0$ of the third quadratic polynomial (101), such that the waveform obtained by adding the third quadratic polynomial (101) to the third difference is minimized (step S267). Specifically, the measurement device 1 calculates the values of the coefficients $a_0$, $b_0$ and $c_0$ according to Equations (108) to (110).

Next, the measurement device 1 subtracts the third quadratic polynomial (101) which is the polynomial approximating the integration error from the displacement waveform $U_j(t)$, as show in Equation (111), to calculate the displacement waveform $CU_j(t)$ obtained by correcting the displacement waveform $U_j(t)$ (step S268).

When the integer j is not N (N in step S269), the measurement device 1 adds 1 to the integer j (step S270), and repeats the processing in steps S262 to S268.

Further, when the integer j is N (Y in step S269), the measurement device 1 ends the processing in the displacement waveform correction step.

The configuration of the measurement device 1 according to the third embodiment is the same as that in FIG. 26, and thus illustration and description thereof will be omitted.

In the measurement method according to the above-described third embodiment, the measurement device 1 calculates the values of the coefficients $a_1$, $b_1$ and $c_1$ of the first quadratic polynomial, such that the waveform obtained by adding the first quadratic polynomial $a_1 t^2 + b_1 t + c_1$ to the first difference between the waveform $d_1 CP_j(t)$ obtained by multiplying the first proportional coefficient $d_1$ by the path deflection waveform $CP_j(t)$ and the displacement waveform $U_j(t)$ is minimized. The measurement device 1 calculates the values of the coefficients $a_2$, $b_2$ and $c_2$ of the second quadratic polynomial, such that the waveform obtained by adding the second quadratic polynomial $a_2 t^2 + b_2 t + c_2$ to the second difference between the waveform $d_2 CP_j(t)$ obtained by multiplying the second proportional coefficient $d_2$ by the path deflection waveform $CP_j(t)$ and the displacement waveform $U_j(t)$ is minimized. The measurement device 1 calculates the first sum $E_{n1}$ of values each being obtained by adding the first difference to the secondary term $a_1 t^2$ of the first quadratic polynomial in the integral interval. The measurement device 1 calculates the second sum Ent of values each being obtained by adding the second difference to the secondary term $a_2 t^2$ of the second quadratic polynomial in an integral interval. Based on the relationship of the first proportional coefficient $d_1$, the second proportional coefficient $d_2$, the first sum Eni, and the second sum $E_{n2}$, the measurement device 1 calculates the third proportional coefficient $d_0$ at which the third sum $E_{n0}$ is zero, and the third sum $E_{n0}$ is a sum of the values, in the integral interval, each being obtained by adding the third difference between the waveform $d_0 CP_j(t)$ obtained by multiplying the third proportional coefficient $d_0$ by the path deflection waveform $CP_j(t)$ and the displacement waveform $U_j(t)$ to the secondary term $a_0 t^2$ of the third quadratic polynomial (101) approximating the integration error. Next, the measurement device 1 calculates the values of the coefficients $a_0$, $b_0$ and $c_0$ of the third quadratic polynomial (101), such that the waveform obtained by adding the third quadratic polynomial (101) to the third difference is minimized. Next, the measurement device 1 subtracts the third quadratic polynomial 101 from the displacement waveform $U_j(t)$, as shown in Equation (111), to calculate the displacement waveform $CU_j(t)$ obtained by correcting the displacement waveform $U_j(t)$. Therefore, according to the measurement method of the third embodiment, the measurement device 1 can estimate an integration error when the acceleration acting on the superstructure 7 by the vehicle 6 is integrated, and can accurately calculate the displacement waveform $CU_j(t)$ of the superstructure 7.

According to the measurement method of the third embodiment, although the measurement device 1 performs a calculation process for calculating the values of the coefficients $a_0$, $b_0$ and $c_0$ of the third quadratic polynomial (101) is long, and a calculation amount is moderate, the displacement waveform $CU_j(t)$ with a relatively high accuracy is obtained.

According to the measurement method of the third embodiment, since the measurement device 1 calculates the displacement waveform $CU_j(t)$ using the acceleration sensor that has a degree of freedom in installation higher than those of the displacement meter and the strain gauge, and that can be easily installed, the cost of the measurement system 10 can be reduced.

4. Fourth Embodiment

A measurement method according to a fourth embodiment is different from the measurement methods according to the first embodiment and the third embodiment in the processing of the displacement waveform correction step. Hereinafter, in the fourth embodiment, the same components as those in the first embodiment to the third embodiment will be denoted by the same reference numerals, repetitive description as those in the first embodiment to the third embodiment will be omitted or simplified, and contents different from those in the first embodiment to the third embodiment will be mainly described.

In the measurement method according to the fourth embodiment, the process of calculating the first sum $E_{n1}$ and the second sum $E_{n2}$ by the measurement device 1 is different from that of the third embodiment, and other processes of the measurement device 1 are the same as those of the third embodiment.

Specifically, Equations (97) and (98) for respectively calculating the first sum $E_{n1}$ and the second sum $E_{n2}$ are replaced by Equations (112) and (113), respectively.

$$E_{n1} = \sum_{k=1}^{n} e_{k1} = \sum_{k=1}^{n} \{d_1 CP_j(t_k) - U_j(t_k) + a_1 t_k^2 + b_1 t_k + c_1\} H_{(P_k)} \quad (112)$$

$$E_{n2} = \sum_{k=1}^{n} e_{k2} = \sum_{k=1}^{n} \{d_2 CP_j(t_k) - U_j(t_k) + a_2 t_k^2 + b_2 t_k + c_2\} H_{(P_k)} \quad (113)$$

In Equations (112) and (113), a function $H_{(P_k)}$ is defined as in Equation (114).

$$H_{(P_k)} = \begin{cases} 0 & (\text{if } CP_j(t_k) = 0) \\ 1 & (\text{if } CP_j(t_k) \neq 0) \end{cases} \quad (114)$$

Figure 33:
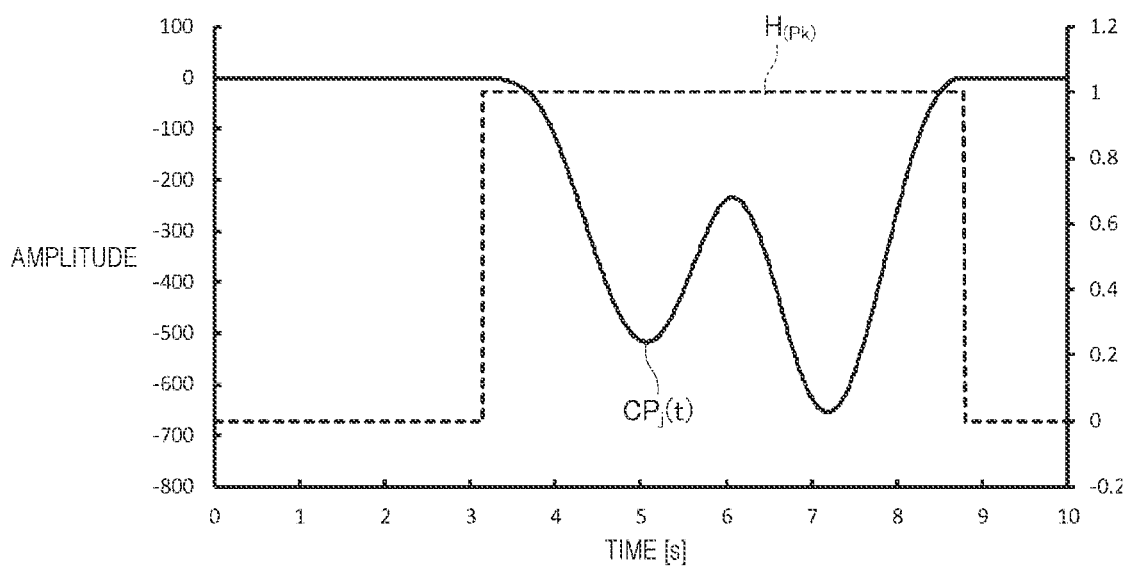
FIG. 33 is a diagram showing an example of a relationship between a path deflection waveform and a function according to a fourth embodiment.

FIG. 33 shows an example of a relationship between the path deflection waveform $CP_j(t)$ and the function $H_{(P_k)}$. In FIG. 33, a horizontal axis represents time, a left vertical axis represents an amplitude of the path deflection waveform $CP_j(t)$, and a right vertical axis represents a value of the function $H_{(P_k)}$. As shown in FIG. 33, in the integral interval, a value of the function $H_{(P_k)}$ is 0 in a period in which the amplitude of the path deflection waveform $CP_j(t)$ is zero, and the value of the function $H_{(P_k)}$ is 1 in a period in which the amplitude of the path deflection waveform $CP_j(t)$ is not zero. Therefore, the first sum $E_{n1}$ of values each being obtained by adding the first difference between the waveform obtained by multiplying the first proportional coefficient $d_1$ by the path deflection waveform $CP_j(t)$ and the displacement waveform $U_j(t_k)$ and the first quadratic polynomial $a_1 t^2 + b_1 t + c_1$ in a period in which the amplitude of the path deflection waveform $CP_j(t)$ is not zero, is calculated according to Equation (112). Similarly, the second sum $E_{n2}$ of values each being obtained by adding the second difference between the waveform obtained by multiplying the second proportional coefficient $d_2$ by the path deflection waveform $CP_j(t)$ and the displacement waveform $U_j(t_k)$ and the second quadratic polynomial $a_2 t^2 + b_2 t + c_2$ in a period in which the amplitude of the path deflection waveform $CP_j(t)$ is not zero, is calculated according to Equation (113).

By using the first proportional coefficient $d_1$, the second proportional coefficient $d_2$, the first sum $E_{n1}$, and the second sum $E_{n2}$, the third proportional coefficient $d_0$ is calculated according to the above Equation (100). Specifically, the third proportional coefficient $d_0$ at which the third sum $E_{n0}$ is not zero is calculated according to Equation (100), and the third sum $E_{n0}$ is a sum of the values, in a period in which the amplitude of the path deflection waveform $CP_j(t)$ is not zero, each being obtained by adding the third difference between the waveform $d_0 CP_j(t_k)$ and the displacement waveform $U_j(t_k)$ and the third quadratic polynomial $a_0 t^2 + b_0 t + c_0$ indicated by the above Equation (101).

Then, the measurement device 1 calculates the values of the coefficients $a_0$, $b_0$ and $c_0$ by the above Equations (108) to (110), and substitutes the values of the coefficients $a_0$, $b_0$ and $c_0$ into Equation (111) to calculate the displacement waveform $CU_j(t)$ obtained by correcting the displacement waveform $U_j(t)$.

Figure 34:
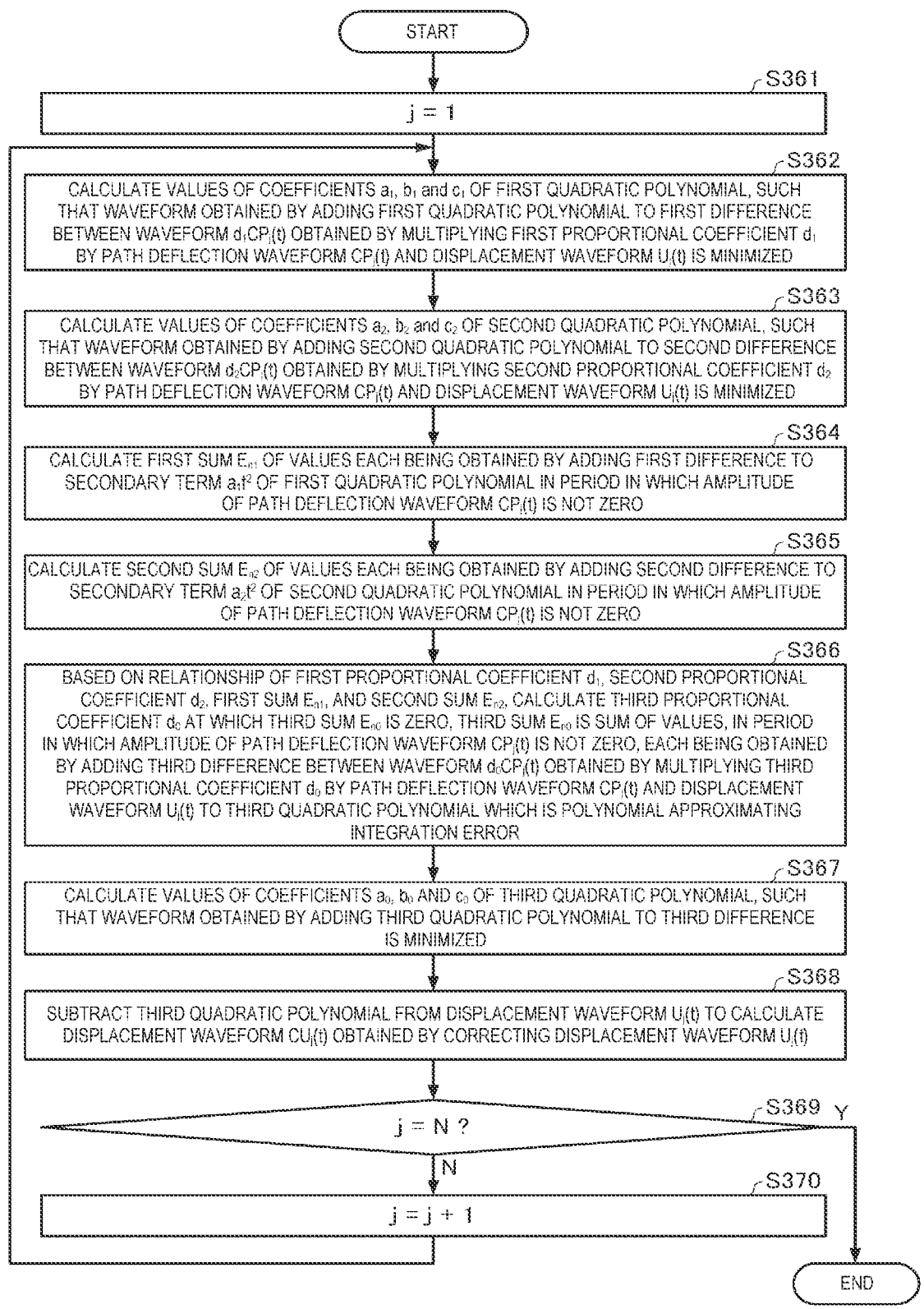
FIG. 34 is a flowchart showing an example of a procedure of a displacement waveform correction step according to the fourth embodiment.

FIG. 34 is a flowchart showing an example of a procedure of the displacement waveform correction step, which is step S6 in FIG. 22.

As shown in FIG. 34, first, the measurement device 1 sets the integer j to 1 (step S361), and calculates the values of the coefficients $a_1$, $b_1$ and $c_1$ of the first quadratic polynomial, such that the waveform obtained by adding the first quadratic polynomial $a_1 t^2 + b_1 t + c_1$ to the first difference between the waveform $d_1 CP_j(t)$ obtained by multiplying the first proportional coefficient $d_1$ by the path deflection waveform $CP_j(t)$ and the displacement waveform $U_j(t)$ is minimized (step S362). Specifically, the measurement device 1 calculates the values of the coefficients $a_1$, $b_1$ and $c_1$ according to the Equations (87) to (89).

Next, the measurement device 1 calculates the values of the coefficients $a_2$, $b_2$ and $c_2$ of the second quadratic polynomial, such that the waveform obtained by adding the second quadratic polynomial $a_2t^2+b_2t+c_2$ to the second difference between the waveform $d_2CP_j(t)$ obtained by multiplying the second proportional coefficient $d_2$ by the path deflection waveform $CP_j(t)$ and the displacement waveform $U_j(t)$ is minimized (step S363). Specifically, the measurement device 1 calculates the values of the coefficients $a_2$, $b_2$ and $c_2$ according to the above Equations 94 to 96.

Next, the measurement device 1 calculates the first sum $E_{n1}$ of values each being obtained by adding the first difference to the first quadratic polynomial $a_1t^2+b_1t+c_1$ in a period in which the path deflection waveform $CP_j(t)$ is not zero (step S364). Specifically, the measurement device 1 calculates the first sum $E_{n1}$ according to the Equation (112).

Next, the measurement device 1 calculates the second sum Ent of values each being obtained by adding the second difference to the second quadratic polynomial $a_2t^2+b_2t+c_2$ in a period in which the path deflection waveform $CP_j(t)$ is not zero (step S365). Specifically, the measurement device 1 calculates the second sum Ent according to Equation (113).

Next, based on the relationship of the first proportional coefficient $d_1$, the second proportional coefficient $d_2$, the first sum Eni, and the second sum $E_{n2}$, the measurement device 1 calculates the third proportional coefficient $d_0$ at which the third sum $E_{n0}$ is zero, and the third sum $E_{n0}$ is a sum of values, in a period in which the amplitude of the path deflection waveform $CP_j(t)$ is not zero, each being obtained by adding the third difference between the waveform $d_0CP_j(t)$ obtained by multiplying the third proportional coefficient $d_0$ by the path deflection waveform $CP_j(t)$ and the displacement waveform $U_j(t)$ to the third quadratic polynomial $a_0t^2+b_0t+c_0$ which is the polynomial approximating the integration error (step S366). Specifically, the measurement device 1 calculates the third proportional coefficient $d_0$ according to the above Equation (100).

Next, the measurement device 1 calculates the values of the coefficients $a_0$, $b_0$ and $c_0$ of the third quadratic polynomial, such that the waveform obtained by adding the third quadratic polynomial $a_0t^2+b_0t+c_0$ to the third difference is minimized (step S367). Specifically, the measurement device 1 calculates the values of the coefficients $a_0$, $b_0$ and $c_0$ according to the above Equations (108) to (110).

Next, the measurement device 1 subtracts the third quadratic polynomial $a_0t^2+b_0t+c_0$ which is the polynomial approximating the integration error from the displacement waveform $U_j(t)$, as shown in Equation (111), to calculate the displacement waveform $CU_j(t)$ obtained by correcting the displacement waveform $U_j(t)$ (step S368).

When the integer j is not N (N in step S369), the measurement device 1 adds 1 to the integer j (step S370), and repeats the processing in steps S362 to S368.

Then, when the integer j is N (Y in step S369), the measurement device 1 ends the processing in the displacement waveform correction step.

The configuration of the measurement device 1 according to the fourth embodiment is the same as that in FIG. 26, and thus illustration and description thereof will be omitted.

In the measurement method according to the above-described fourth embodiment, the measurement device 1 calculates the values of the coefficients $a_1$, $b_1$ and $c_1$ of the first quadratic polynomial, such that the waveform obtained by adding the first quadratic polynomial $a_1t^2+b_1t+c_1$ to the first difference between the waveform $d_1CP_j(t)$ obtained by multiplying the first proportional coefficient $d_1$ by the path deflection waveform $CP_j(t)$ and the displacement waveform $U_j(t)$ is minimized. The measurement device 1 calculates the values of the coefficients $a_2$, $b_2$ and $c_2$ of the second quadratic polynomial, such that the waveform obtained by adding the second quadratic polynomial $a_2t^2+b_2t+c_2$ to the second difference between the waveform $d_2CP_j(t)$ obtained by multiplying the second proportional coefficient $d_2$ by the path deflection waveform $CP_j(t)$ and the displacement waveform $U_j(t)$ is minimized. The measurement device 1 calculates the first sum $E_{n1}$ of values each being obtained by adding the first difference to the secondary term $a_1t^2$ of the first quadratic polynomial in a period in which the amplitude of the path deflection waveform $CP_j(t)$ is not zero. The measurement device 1 calculates the second sum $E_{n2}$ of values each being obtained by adding the second difference to the secondary term $a_2t^2$ the second quadratic polynomial in a period in which the amplitude of the path deflection waveform $CP_j(t)$ is not zero. Based on the relationship of the first proportional coefficient $d_1$, the second proportional coefficient $d_2$, the first sum Eni, and the second sum $E_{n2}$, the measurement device 1 calculates the third proportional coefficient $d_0$ at which the third sum $E_{n0}$ is zero, and the third sum $E_{n0}$ is a sum of values, in a period in which the amplitude of the path deflection waveform $CP_j(t)$ is not zero, each being obtained by adding the third difference between the waveform $d_0CP_j(t)$ obtained by multiplying the third proportional coefficient do by the path deflection waveform $CP_j(t)$ and the displacement waveform $U_j(t)$ to the secondary term $a_0t^2$ of the third quadratic polynomial (101) approximating the integration error. The measurement device 1 calculates the values of the coefficients $a_0$, $b_0$ and $c_0$ of the third quadratic polynomial (101), such that the waveform obtained by adding the third quadratic polynomial (101) to the third difference is minimized. Next, the measurement device 1 subtracts the third quadratic polynomial (101) from the displacement waveform $U_j(t)$, as shown in Equation (111), to calculate the displacement waveform $CU_j(t)$ obtained by correcting the displacement waveform $U_j(t)$. Therefore, according to the measurement method of the fourth embodiment, the measurement device 1 can estimate the integration error when the acceleration acting on the superstructure 7 by the vehicle 6 is integrated, and can accurately calculate the displacement waveform $CU_j(t)$ of the superstructure 7.

According to the measurement method of the fourth embodiment, since the measurement device 1 calculates the first sum $E_{n1}$ and the second sum Ent in a period in which the amplitude of the path deflection waveform $CP_j(t)$ is not zero, a calculation amount is smaller than that in the first embodiment in which the first sum $E_{n1}$ and the second sum Ent are calculated in the integral interval.

According to the measurement method of the fourth embodiment, since the measurement device 1 calculates the displacement waveform $CU_j(t)$ using the acceleration sensor that has a degree of freedom in installation higher than those of the displacement meter and the strain gauge, and that can be easily installed, the cost of the measurement system 10 can be reduced.

5. Fifth Embodiment

A measurement method according to a fifth embodiment is different from the measurement methods according to the first embodiment to the fourth embodiment in the processing of the displacement waveform correction step. Hereinafter, in the fifth embodiment, the same components as those in the first embodiment to the fourth embodiment will be denoted by the same reference numerals, repetitive description as that in the first embodiment to the fourth embodiment will be omitted or simplified, and contents different from those in the first embodiment to the fourth embodiment will be mainly described.

Considering that the observation point $R_j$ is not displaced during a period in which the vehicle 6 is not traveling on the lane $L_j$, the displacement waveform $U_j(t)$ during this period can be considered to indicate an integration error caused by an acceleration not related to the travelling of the vehicle 6. Then, the period in which the vehicle 6 is not travelling on the lane L corresponds to a period in which the amplitude of the path deflection waveform $CP_j(t)$ is zero. Therefore, in the measurement method according to the fifth embodiment, the measurement device 1 calculates the values of the coefficients of the polynomial such that a difference between the displacement waveform $U_j(t)$ and the polynomial approximating the integration error is minimized in a period in which the amplitude of the path deflection waveform $CP_j(t)$ is zero.

A displacement waveform $U_j'(t)$ which is a displacement waveform $U_j(t)$ selected in a period in which the amplitude of the path deflection waveform $CP_j(t)$ is zero is defined as Equation (115). In Equation (115), a function $H_{inv(Pk)}$ is defined as Equation (116).

$$U_j'(t_k) = \begin{cases} \text{no data} & (\text{if } H_{inv(P_k)} = 0) \\ U_j(t_k) & (\text{if } H_{inv(P_k)} = 1) \end{cases} \quad (115)$$

$$H_{inv(P_k)} = \begin{cases} 1 & (\text{if } CP_j(t_k) = 0) \\ 0 & (\text{if } CP_j(t_k) \neq 0) \end{cases} \quad (116)$$

Figure 35:
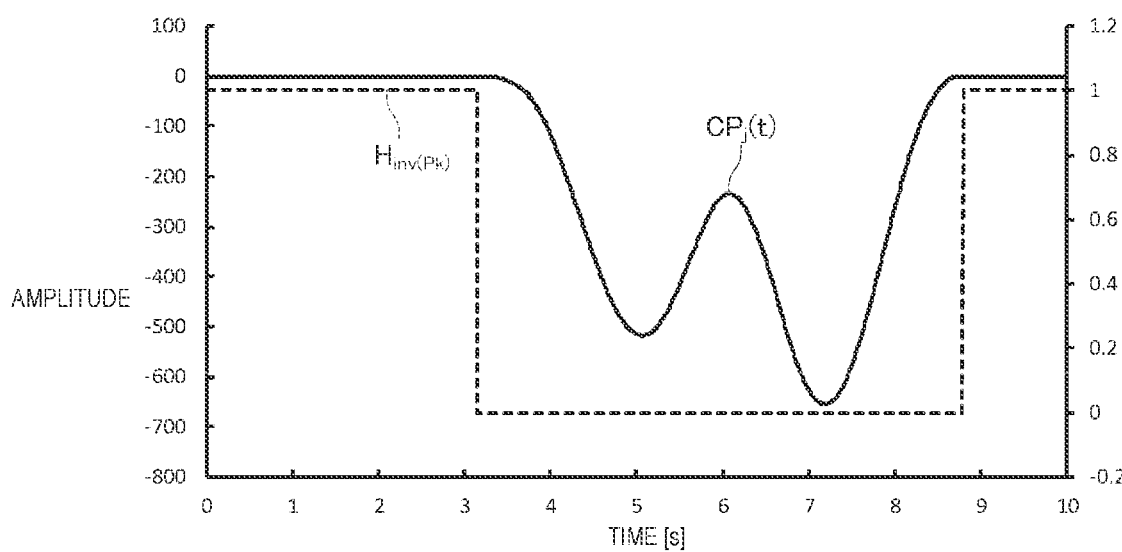
FIG. 35 is a diagram showing an example of a relationship between a path deflection waveform and a function according to a fifth embodiment.

FIG. 35 shows an example of a relationship between the path deflection waveform $CP_j(t)$ and the function $H_{inv(Pk)}$. In FIG. 35, a horizontal axis represents time, a left vertical axis represents the amplitude of the path deflection waveform $CP_j(t)$, and a right vertical axis represents a value of the function $H_{inv(Pk)}$. As shown in FIG. 35, in the integral interval, the value of the function $H_{inv(Pk)}$ is 0 in a period in which the amplitude of the path deflection waveform $CP_j(t)$ is not zero, and the value of the function $H_{inv(Pk)}$ is 1 in a period in which the amplitude of the path deflection waveform $CP_j(t)$ is zero.

In the present embodiment, the integration error is also approximated to a quadratic polynomial, and an approximate integration error $u_e(t)$ is expressed by the above Equation (50). As shown in Equation (117), at the time point $t_k$, a residual between the displacement waveform $U'(t)$ and the approximate integration error $u_e(t)$ is set to $e_k$. In Equation (117), k is an integer of 1 or more and n or less.

$$e_k = U_j'(t_k) - u_e(t_k) = U_j'(t_k) - (at_k^2 + bt_k + c) \quad (117)$$

The coefficients a, b and c are calculated by the least square method such that the residual $e_k$ in Equation (117) is minimized. First, Equation (118) is obtained by squaring both sides of Equation (117).

$$e_k^2 = \{U_j'(t_k) - (at_k^2 + bt_k + c)\}^2 \quad (118)$$

Equation (118) is partially differentiated by the coefficients a, b and c respectively and summarized, and Equation (119) is obtained.

$$\begin{pmatrix} t_k^4 & t_k^3 & t_k^2 \\ t_k^3 & t_k^2 & t_k \\ t_k^2 & t_k & 1 \end{pmatrix} \begin{pmatrix} a_0 \\ b_0 \\ c_0 \end{pmatrix} = \begin{pmatrix} t_k^2 U_j'(t_k) \\ t_k U_j'(t_k) \\ U_0'(t_k) \end{pmatrix} \quad (119)$$

Each element of Equation (119) is replaced with a total sum of data in the period in which the amplitude of the path deflection waveform $CP_j(t)$ is zero, and Equation (120) is obtained.

$$\begin{pmatrix} \sum_{k=1}^n t_k^4 & \sum_{k=1}^n t_k^3 & \sum_{k=1}^n t_k^2 \\ \sum_{k=1}^n t_k^3 & \sum_{k=1}^n t_k^2 & \sum_{k=1}^n t_k \\ \sum_{k=1}^n t_k^2 & \sum_{k=1}^n t_k & \sum_{k=1}^n 1 \end{pmatrix} \begin{pmatrix} a_0 \\ b_0 \\ c_0 \end{pmatrix} = \begin{pmatrix} \sum_{k=1}^n t_k^2 U_j'(t_k) \\ \sum_{k=1}^n t_k U_j'(t_k) \\ \sum_{k=1}^n U_j'(t_k) \end{pmatrix} \quad (120)$$

The elements of Equation (120) are replaced as shown in Equation (121), and values of coefficients a, b and c are calculated as in Equations (122) and (124) by the sweep-out method.

$$\begin{pmatrix} A & B & C \\ B & C & D \\ C & D & n \end{pmatrix} \begin{pmatrix} a \\ b \\ c \end{pmatrix} = \begin{pmatrix} E \\ F \\ G \end{pmatrix} \quad (121)$$

$$a = \frac{(nE - CG)(nC - D^2) - (nF - DC)(nB - CD)}{(nA - C^2)(nC - D^2) - (nB - CD)^2} \quad (122)$$

$$b = \frac{nF - DC - a(nB - CD)}{nC - D^2} \quad (123)$$

$$c = \frac{1}{n}(G - Ca - Db) \quad (124)$$

Figure 36:
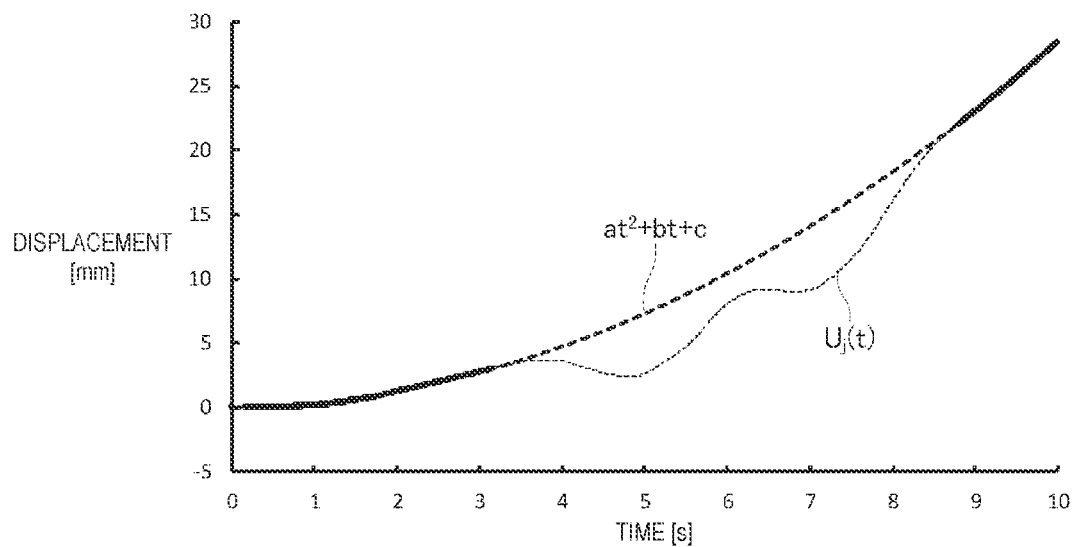
FIG. 36 is a diagram showing an example of a quadratic polynomial that represents an approximate integration error according to the fifth embodiment.

FIG. 36 shows, by a broken line, an example of a quadratic polynomial $at^2 + bt + c$ representing the approximate integration error $u_e(t)$. In FIG. 36, a horizontal axis represents time and a vertical axis represents a displacement. In FIG. 36, the displacement waveform $U_j(t)$ in a section in which the value of the function $H_{inv(Pk)}$ is 1 is indicated by a solid line, and the displacement waveform $U_j(t)$ in a section in which the value of the function $H_{inv(Pk)}$ is 0 is shown by a broken line. The solid line part of the displacement waveform $U_j(t)$ is used to calculate the values of the coefficients a, b, and c.

Then, the measurement device 1 substitutes the values of the coefficients $a_0$, $b_0$ and $c_0$ into Equation (51) to calculate the displacement waveform $CU_j(t)$ obtained by correcting the displacement waveform $U_j(t)$.

Figure 37:
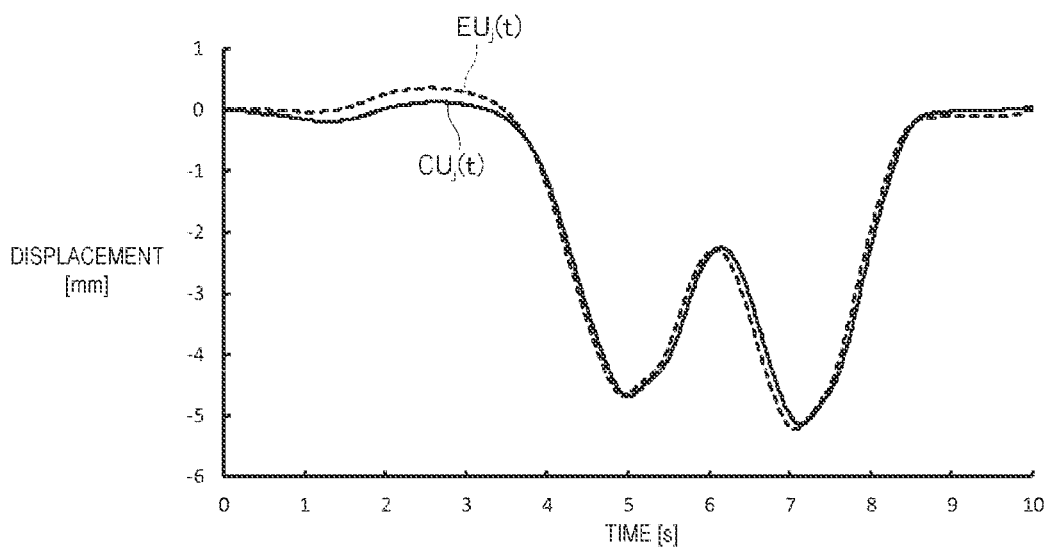
FIG. 37 is a diagram showing an example of a displacement waveform according to the fifth embodiment.

FIG. 37 shows an example of the displacement waveform $CU_j(t)$ by a solid line. In FIG. 37, a horizontal axis represents time and a vertical axis represents a displacement. A strain gauge is installed at the observation point $R_j$ in a test manner, and a displacement waveform $EU_j(t)$ converted from a waveform measured by the strain gauge is also shown in FIG. 37 by a broken line. As shown in FIG. 37, in the displacement waveform $CU_j(t)$, the integration error is almost removed, and the displacement waveform $CU_j(t)$ is similar to the displacement waveform $EU_j(t)$.

Figure 38:
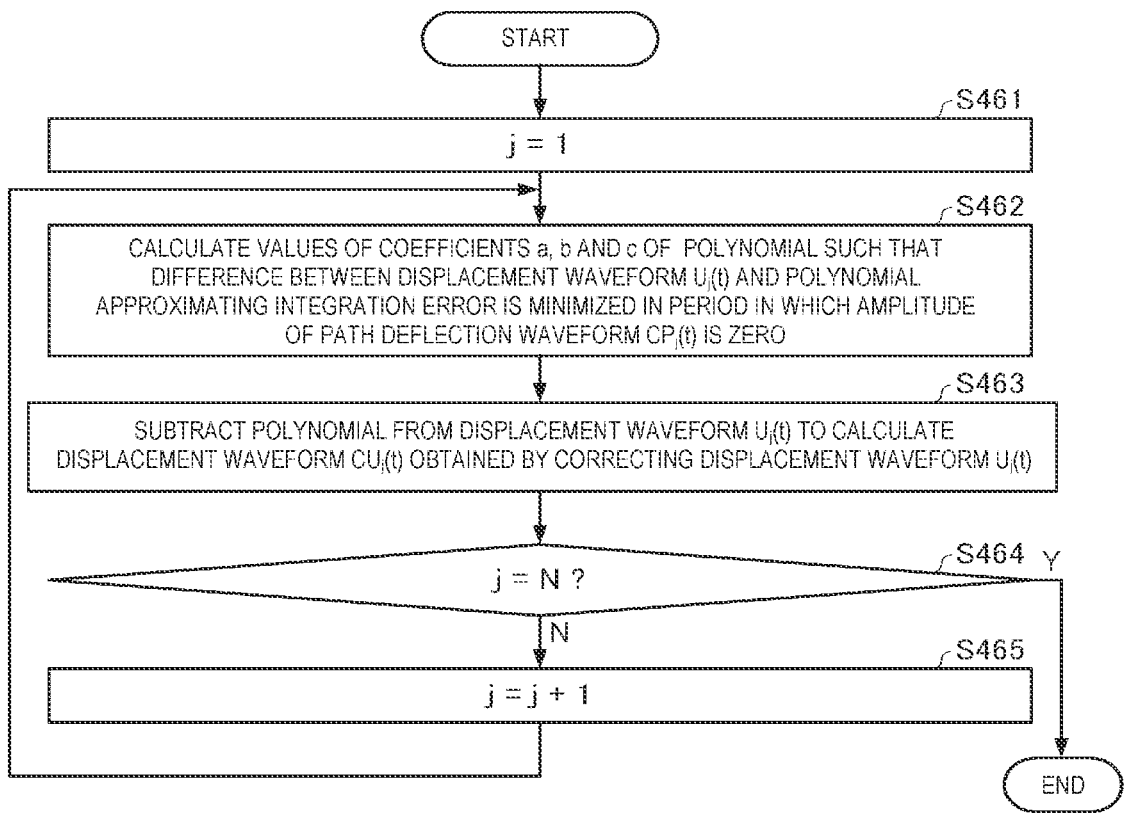
FIG. 38 is a flowchart showing an example of a procedure of a displacement waveform correction step according to the fifth embodiment.

FIG. 38 is a flowchart showing an example of a procedure of the displacement waveform correction step, which is step S6 in FIG. 22.

As shown in FIG. 38, first, the measurement device 1 sets the integer j to 1 (step S461), and calculates the values of the coefficients a, b and c of the quadratic polynomial such that a difference between the displacement waveform $U_j(t)$ and the quadratic polynomial $at^2 + bt + c$ which is the polynomial approximating the integration error is minimized in the period in which the amplitude of the path deflection waveform $CP_j(t)$ is zero (step S462). Specifically, the measurement device 1 calculates the values of the coefficients a, b and c according to Equations (122) to (124).

Next, the measurement device 1 subtracts the quadratic polynomial $at^2+bt+c$ which is the polynomial approximating the integration error from the displacement waveform $U_j(t)$, as shown in Equation (51), to calculate the displacement waveform $CU_j(t)$ obtained by correcting the displacement waveform $U_j(t)$ (step S463).

When the integer j is not N (N in step S464), the measurement device 1 adds 1 to the integer j (step S465), and repeats the processing in steps S462 and S463.

Then, when the integer j is N (Y in step S464), the measurement device 1 ends the processing in the displacement waveform correction step.

The configuration of the measurement device 1 according to the fifth embodiment is the same as that in FIG. 26, and thus illustration and description thereof will be omitted.

In the measurement method according to the fifth embodiment described above, the measurement device 1 calculates the values of the coefficients a, b and c of the quadratic polynomial such that the difference between the displacement waveform $U_j(t)$ and the quadratic polynomial $at^2+bt+c$ approximating the integration error is minimized in the period in which the amplitude of the path deflection waveform $CP_j(t)$ is zero. Next, the measurement device 1 subtracts the quadratic polynomial $at^2+bt+c$ from the displacement waveform $U_j(t)$, as show in Equation (51), to calculate the displacement waveform $CU_j(t)$ obtained by correcting the displacement waveform $U_j(t)$. Therefore, according to the measurement method of the fifth embodiment, the measurement device 1 can estimate the integration error when the acceleration acting on the superstructure 7 by the vehicle 6 is integrated, and can accurately calculate the displacement waveform $CU_j(t)$ of the superstructure 7.

According to the measurement method of the fifth embodiment, since the measurement device 1 estimates the integration error by using the value of the displacement waveform $U_j(t)$ during a period in which the amplitude of the path deflection waveform $CP_j(t)$ is zero, that is, during a period in which no vehicle 6 travels on the path, the calculation amount is small, and the displacement waveform $U_j(t)$ can be corrected with high accuracy in an environment where the influence of noise is small.

According to the measurement method of the fifth embodiment, since the measurement device 1 calculates the displacement waveform $CU_j(t)$ using the acceleration sensor that has a degree of freedom in installation higher than those of the displacement meter and the strain gauge, and that can be easily installed, the cost of the measurement system 10 can be reduced.

6. Sixth Embodiment

A measurement method according to a sixth embodiment is different from the measurement methods according to the first embodiment to the fifth embodiment in the processing of the displacement waveform correction step. Hereinafter, in the sixth embodiment, the same components as those in the first embodiment to the fifth embodiment will be denoted by the same reference numerals, repetitive description as that in the first embodiment to the fifth embodiment will be omitted or simplified, and contents different from those in the first embodiment to the fifth embodiment will be mainly described.

In the present embodiment, the integration error is also approximated to a quadratic polynomial, and an approximate integration error $u_\varepsilon(t)$ is also expressed by the above Equation (50). In the present embodiment, the measurement device 1 estimates the integration error using the value of the displacement waveform $U_j(t)$ at three different time points $t_1$, $t_2$, and $t_3$ in a period in which the vehicle 6 is not traveling on the lane L. Since the period in which the vehicle 6 is not travelling on the lane $L_j$ corresponds to a period in which the amplitude of the path deflection waveform $CP_j(t)$ is zero, three time points $t_1$, $t_2$, and $t_3$ when the amplitude of the path deflection waveform $CP_j(t)$ is zero are selected.

Figure 39:
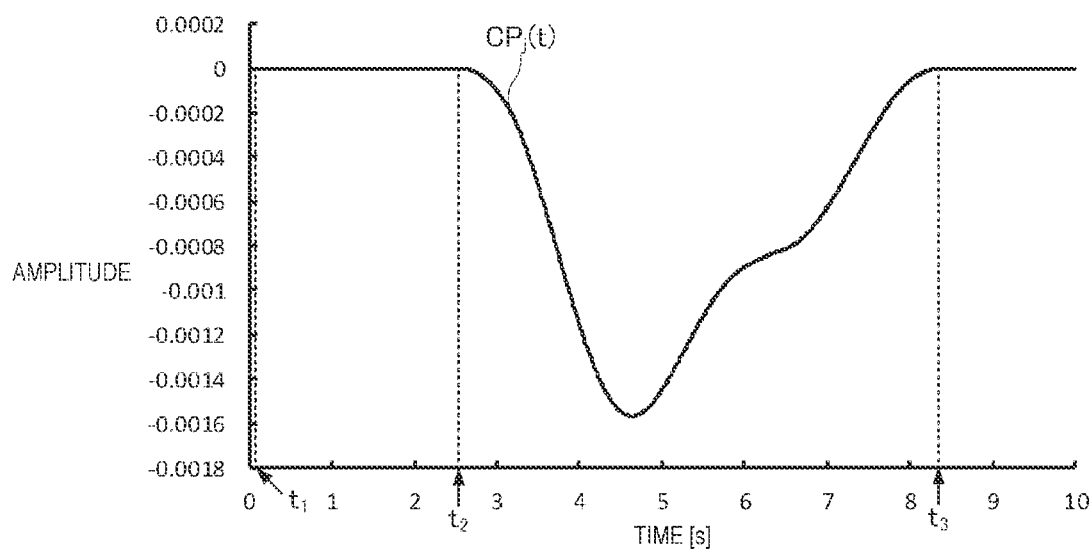
FIG. 39 is a diagram showing an example of a relationship between a path deflection waveform and three time points according to a sixth embodiment.

FIG. 39 shows an example of a relationship between the path deflection waveform $CP_j(t)$ and the time points $t_1$, $t_2$, and $t_3$. In the example of FIG. 39, the time point $t_1$ close to a start time point of the integral interval and the time point $t_2$ and the time point $t_3$ immediately before the start and immediately after the end of a period in which the amplitude of the path deflection waveform $CP_j(t)$ is not zero are selected.

As shown in Equation (125), at the time point $t_k$, the residual between the displacement waveform $U_j(t)$ and the approximate integration error $u_\varepsilon(t)$ is set to $e_k$. In Equation (125), k is an integer of from 1 to 3.

$$e_k = U_j(t_k) - u_\varepsilon(t_k) = U_j(t_k) - (at_k^2 + bt_k + c) \quad (125)$$

The coefficients a, b and c are calculated by the least square method such that the residual $e_k$ in Equation (125) is minimized. First, Equation (126) is obtained by squaring both sides of Equation (125).

$$e_k^2 = \{U_j(t_k) - (at_k^2 + bt_k + c)\}^2 \quad (126)$$

Equation (126) is partially differentiated by the coefficients a, b and c respectively and summarized, and Equation (127) is obtained.

$$\begin{pmatrix} t_k^4 & t_k^3 & t_k^2 \\ t_k^3 & t_k^2 & t_k \\ t_k^2 & t_k & 1 \end{pmatrix} \begin{pmatrix} a_0 \\ b_0 \\ c_0 \end{pmatrix} = \begin{pmatrix} t_k^2 U_j(t_k) \\ t_k U_j(t_k) \\ U_j(t_k) \end{pmatrix} \quad (127)$$

Each element of Equation (127) is replaced with a total sum of data at the time points $t_1$, $t_2$, and $t_3$, and Equation (128) is obtained.

$$\begin{pmatrix} \sum_{k=1}^{3} t_k^4 & \sum_{k=1}^{3} t_k^3 & \sum_{k=1}^{3} t_k^2 \\ \sum_{k=1}^{3} t_k^3 & \sum_{k=1}^{3} t_k^2 & \sum_{k=1}^{3} t_k \\ \sum_{k=1}^{3} t_k^2 & \sum_{k=1}^{3} t_k & \sum_{k=1}^{3} 1 \end{pmatrix} \begin{pmatrix} a \\ b \\ c \end{pmatrix} = \begin{pmatrix} \sum_{k=1}^{3} t_k^2 U'_j(t_k) \\ \sum_{k=1}^{3} t_k U'_j(t_k) \\ \sum_{k=1}^{3} U'_j(t_k) \end{pmatrix} \quad (128)$$

The elements of Equation (128) are replaced as shown in Equation (129), and values of coefficients a, b and c are calculated as in Equations (130) to (132) by the sweep-out method.

$$\begin{pmatrix} A & B & C \\ B & C & D \\ C & D & n \end{pmatrix} \begin{pmatrix} a \\ b \\ c \end{pmatrix} = \begin{pmatrix} E \\ F \\ G \end{pmatrix} \quad (129)$$

$$a = \frac{(nE - CG)(nC - D^2) - (nF - DC)(nB - CD)}{(nA - C^2)(nC - D^2) - (nB - CD)^2} \quad (130)$$

-continued $$b = \frac{nF - DC - a(nB - CD)}{nC - D^2} \quad (131)$$

$$c = \frac{1}{n}(G - Ca - Db) \quad (132)$$

Then, the measurement device 1 substitutes the values of the coefficients a, b and c into Equation (51) to calculate the displacement waveform $CU_j(t)$ obtained by correcting the displacement waveform $U_j(t)$.

In the present embodiment, the measurement device 1 evaluates the accuracy of the displacement waveform $CU_j(t)$ by comparing the displacement waveform $CU_j(t)$ with the path deflection waveform $CP_j(t)$.

A ratio of a maximum amplitude value of the displacement waveform $CU_j(t)$ to a maximum amplitude value of the path deflection waveform $CP_j(t)$ is set to be an amplitude ratio $r_j$, and according to Equation (133), a displacement model waveform $UCP_j(t)$ in which the amplitude of the path deflection waveform $CP_j(t)$ is adjusted to match the maximum amplitude of the displacement waveform $CU_j(t)$ is obtained.

$$UCP_j(t) = r_j CP_j(t) \quad (133)$$

The measurement device 1 compares the displacement waveform $CU_j(t)$ with the displacement model waveform $UCP_j(t)$, determines that the displacement waveform $CU_j(t)$ is normal if an error is within an allowable range, and determines that the displacement waveform $CU_j(t)$ is abnormal if the error is not within the allowable range.

Alternatively, when the error is not within the allowable range, the measurement device 1 may re-select three time points $t_1$, $t_2$, and $t_3$ and calculate the values of the coefficients a, b, and c again. Then, the measurement device 1 compares the displacement waveform $CU_j(t)$ with the displacement model waveform $UCP_j(t)$, determines that the displacement waveform $CU_j(t)$ is normal if the error is within the allowable range, and determines that the displacement waveform $CU_j(t)$ is abnormal if the error is not within the allowable range.

Figure 40:
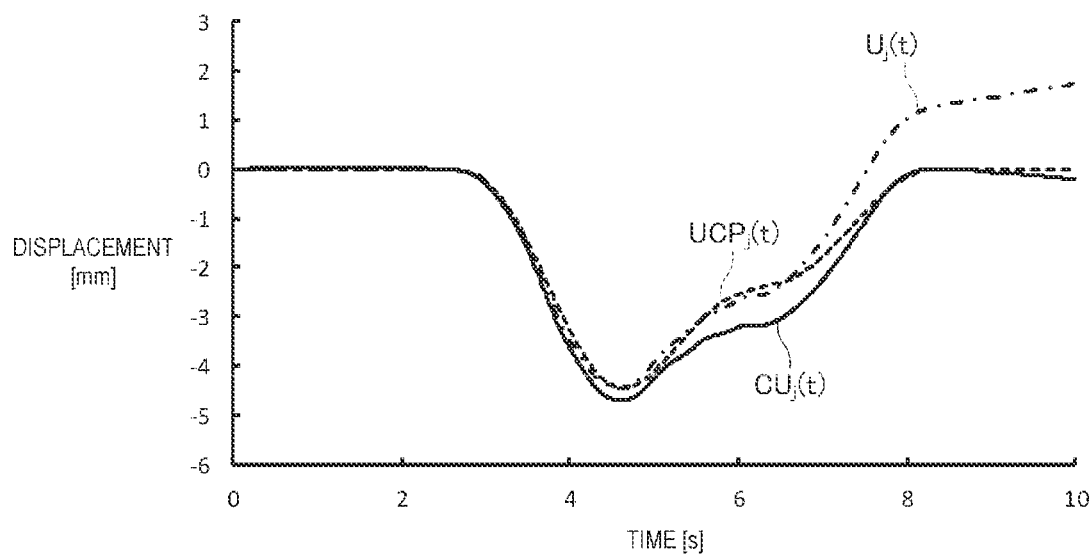
FIG. 40 is a diagram showing an example of a corrected displacement waveform according to the sixth embodiment.
Figure 41:
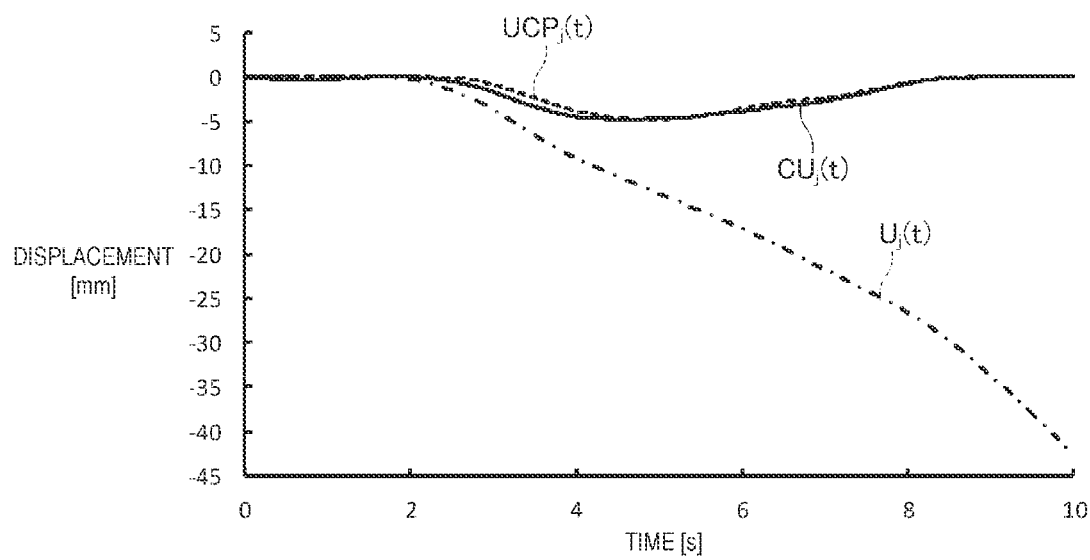
FIG. 41 is a diagram showing another example of the corrected displacement waveform according to the sixth embodiment.

FIG. 40 shows, by a solid line, an example of the displacement waveform $CU_j(t)$ obtained by correcting the displacement waveform $U_j(t)$. FIG. 41 shows, by a solid line, another example of the displacement waveform $CU_j(t)$ obtained by correcting the displacement waveform $U_j(t)$. In each of FIGS. 40 and 41, a horizontal axis represents time, and a vertical axis represents a displacement. In FIGS. 40 and 41, the displacement model waveform $UCP_j(t)$ is also indicated by a broken line, and the displacement waveform $U_j(t)$ is also indicated by a one dot chain line.

Figure 42:
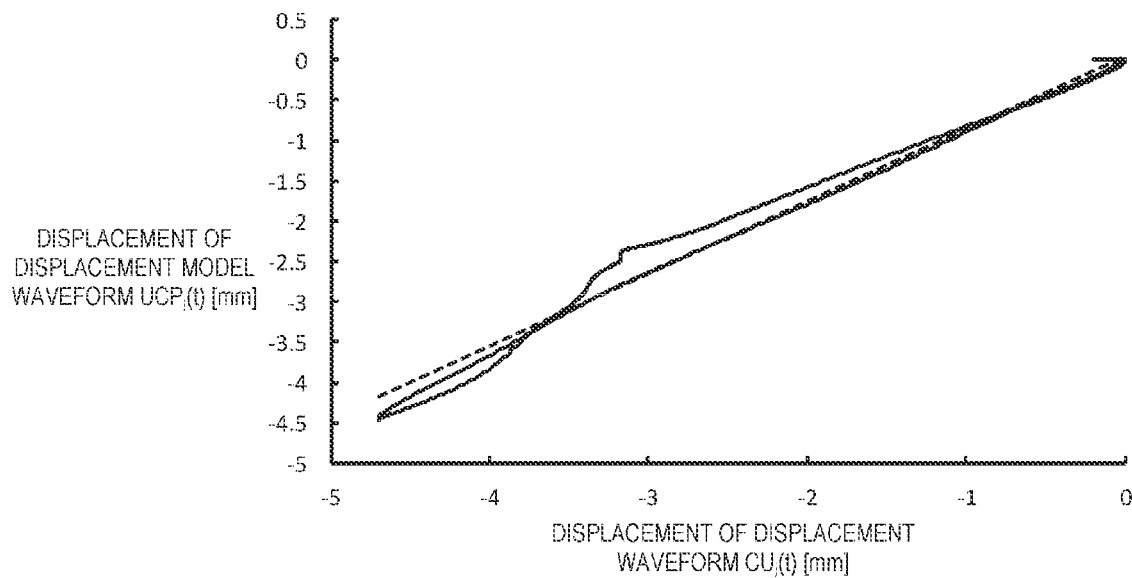
FIG. 42 is a diagram showing a correlation curve between the displacement waveform shown in FIG. 40 and a displacement model waveform.
Figure 43:
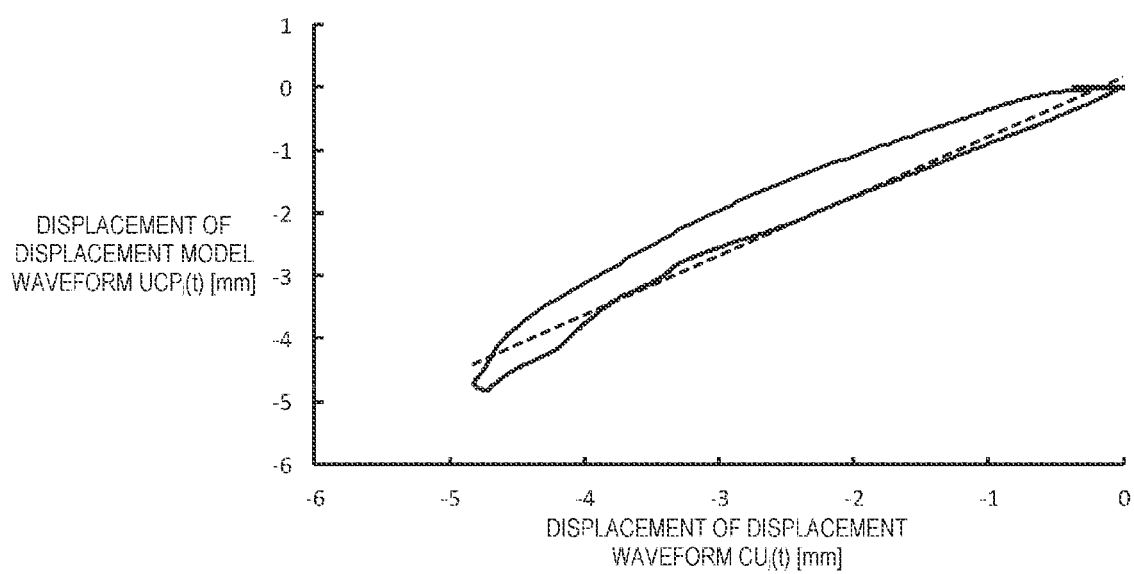
FIG. 43 is a diagram showing a correlation curve between the displacement waveform shown in FIG. 41 and the displacement model waveform.

FIG. 42 shows, by a solid line, a correlation curve between the displacement waveform $CU_j(t)$ and the displacement model waveform $UCP_j(t)$ shown in FIG. 40. FIG. 43 shows, by a solid line, a correlation curve between the displacement waveform $CU_j(t)$ and the displacement model waveform $UCP_j(t)$ shown in FIG. 41. In each of FIGS. 42 and 43, a horizontal axis represents a displacement of the displacement waveform $CU_j(t)$, and a vertical axis represents a displacement of the displacement model waveform $UCP_j(t)$. In each of FIGS. 42 and 43, an ideal correlation line is also indicated by a one dot chain line. For example, the measurement device 1 may determine that the displacement waveform $CU_j(t)$ is normal, if a maximum value of a difference between the correlation curve and the ideal correlation line is equal to or less than a predetermined threshold in the integral interval, and determine that the displacement waveform $CU_j(t)$ is abnormal if the maximum value of the difference is larger than the predetermined threshold.

Figure 44:
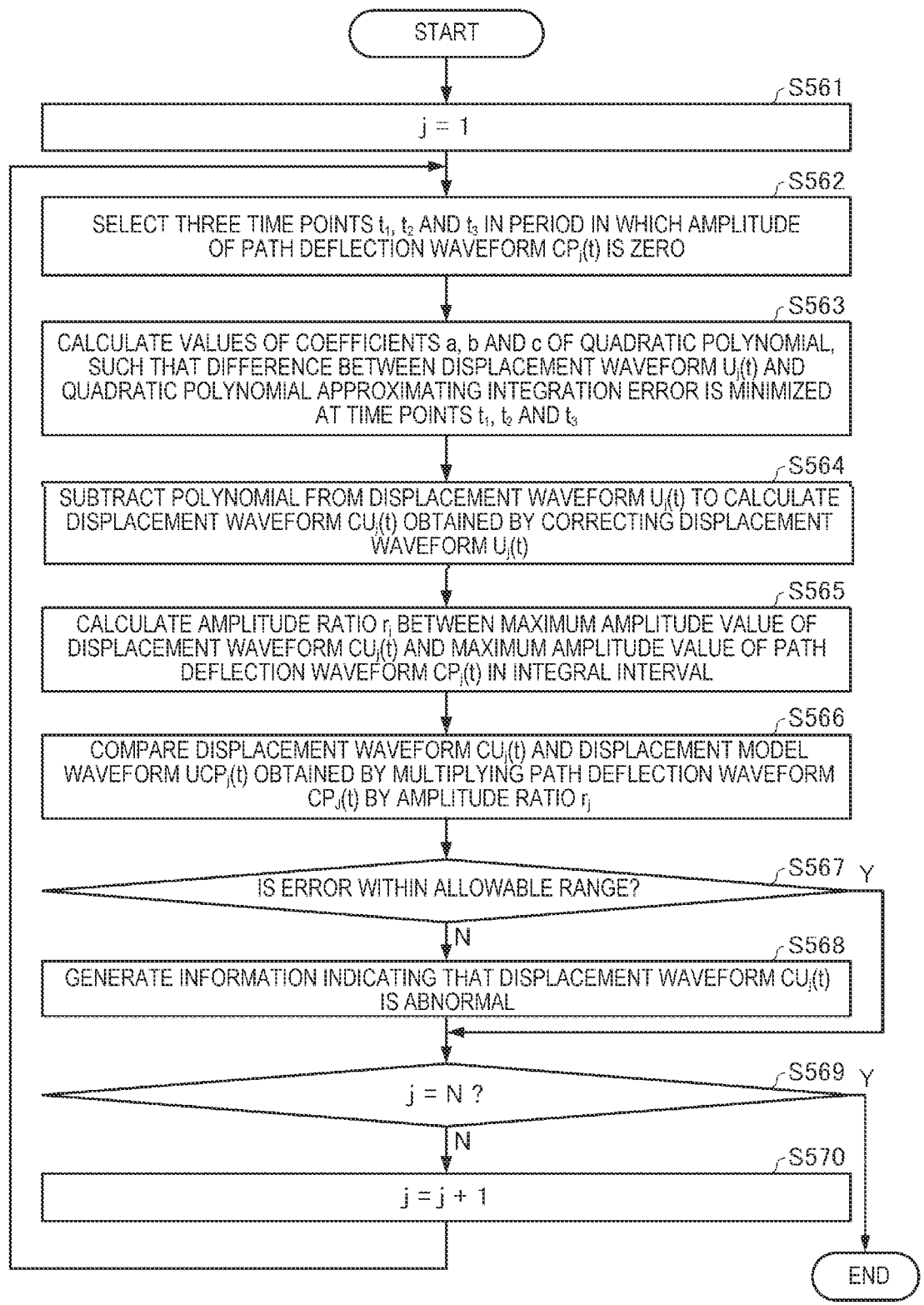
FIG. 44 is a flowchart showing an example of a procedure of a displacement waveform correction step according to the sixth embodiment.

FIG. 44 is a flowchart showing an example of a procedure of the displacement waveform correction step, which is step S6 in FIG. 22.

As shown in FIG. 44, first, the measurement device 1 sets the integer j to 1 (step S561), and selects three time points $t_1$, $t_2$ and $t_3$ in the period in which the amplitude of the path deflection waveform $CP_j(t)$ is zero (step S562). For example, the measurement device 1 selects the time point $t_1$ close to the start time point of the integral interval, and selects the time point $t_2$ and the time point $t_3$ immediately before the start and immediately after the end of a period in which the amplitude of the path deflection waveform $CP_j(t)$ is not zero.

Next, the measurement device 1 calculates the values of the coefficients a, b and c of the quadratic polynomial, such that a difference between the displacement waveform $U_j(t)$ and the quadratic polynomial $at^2 + bt + c$ approximating the integration error is minimized at the time points $t_1$, $t_2$ and $t_3$ (step S563). Specifically, the measurement device 1 calculates the values of the coefficients a, b and c according to Equations (130) to (132).

Next, the measurement device 1 subtracts the quadratic polynomial $at^2 + bt + c$ which is the polynomial approximating the integration error from the displacement waveform $U_j(t)$ as shown in Equation (51), to calculate the displacement waveform $CU_j(t)$ obtained by correcting the displacement waveform $U_j(t)$ (step S564).

Next, the measurement device 1 calculates the amplitude ratio r between the maximum amplitude value of the displacement waveform $CU_j(t)$ and the maximum amplitude value of the path deflection waveform $CP_j(t)$ in the integral interval (step S565).

Next, the measurement device 1 compares the displacement waveform $CU_j(t)$ and the displacement model waveform $UCP_j(t)$ obtained by multiplying the path deflection waveform $CP_j(t)$ by the amplitude ratio $r_j$ (step S566).

Then, if the error of the displacement waveform $CU_j(t)$ with respect to the displacement model waveform $UCP_j(t)$ is not within the allowable range (N in step S567), the measurement device 1 generates information indicating that the displacement waveform $CU_j(t)$ is abnormal (step S568).

If the error is within the allowable range (Y in step S567), the measurement device 1 does not perform the processing in step S568.

When the integer j is not N (N in step S569), the measurement device 1 adds 1 to the integer j (step S570), and repeats the processing in steps S562 and S568.

Then, when the integer j is N (Y in step S569), the measurement device 1 ends the processing in the displacement waveform correction step.

Figure 45:
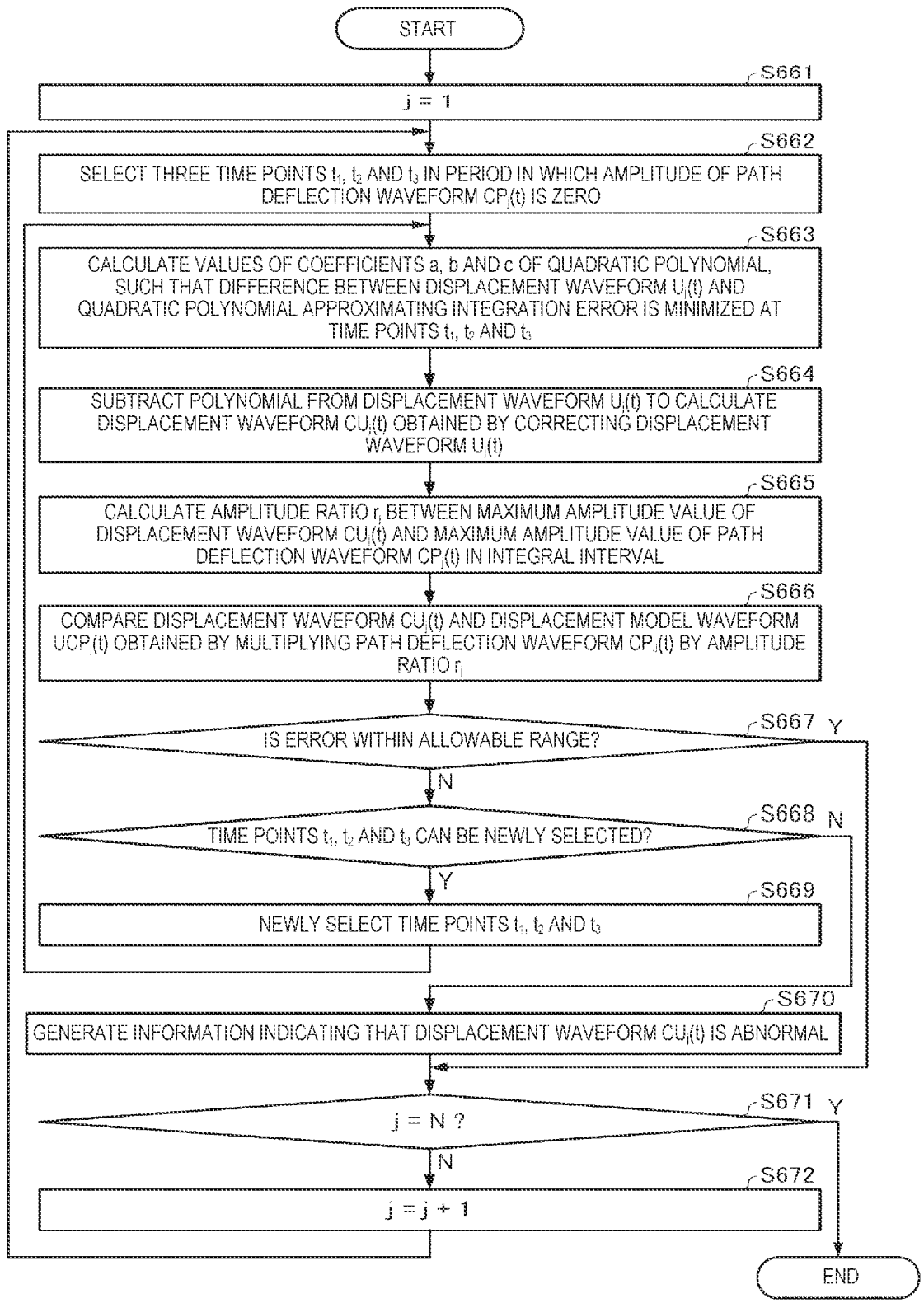
FIG. 45 is a flowchart showing another example of a procedure of a displacement waveform correction step according to the sixth embodiment.

FIG. 45 is a flowchart showing another example of a procedure of the displacement waveform correction step, which is step S6 in FIG. 22.

As shown in FIG. 45, first, the measurement device 1 sets the integer j to 1 (step S661), and performs the processing in steps S662 to S666 which are similar to that in steps S562 to S566 in FIG. 44.

Then, if the error of the displacement waveform $CU_j(t)$ with respect to the displacement model waveform $UCP_j(t)$ is not within the allowable range (N in step S667), the measurement device 1 newly selects the time points $t_1$, $t_2$ and $t_3$ (step S669) if a new selection can be performed (Y in step 668), and performs the processing in step S663 and subsequent steps thereof again. For example, in step S662, the measurement device 1 may select the time point $t_1$ close to the start time point of the integral interval, and select the time point $t_2$ and the time point $t_3$ immediately before the start and immediately after the end of a period in which the amplitude of the path deflection waveform $CP_j(t)$ is not zero, and in step S669, the measurement device 1 may newly select the time points $t_1$, $t_2$ and $t_3$ by changing the time point $t_2$ to a previous time point, and changing the time point $t_3$ to a next time point without changing the time point $t_1$.

Then, if the time points $t_1$, $t_2$ and $t_3$ cannot be newly selected (N in step S668), the measurement device 1 generates information indicating that the displacement waveform $CU_j(t)$ is abnormal (step S670).

If the error is within the allowable range (Y in step S667), the measurement device 1 does not perform the processing in steps S668 to S670.

When the integer j is not N (N in step S671), the measurement device 1 adds 1 to the integer j (step S672), and repeats the processing in steps S662 to S670.

Then, when the integer j is N (Y in step S671), the measurement device 1 ends the processing in the displacement waveform correction step.

The configuration of the measurement device 1 according to the sixth embodiment is the same as that in FIG. 26, and thus illustration and description thereof will be omitted.

In the measurement method according to the sixth embodiment described above, the measurement device 1 calculates the values of the coefficients a, b and c of the quadratic polynomial such that a difference between the displacement waveform $U_j(t)$ and the quadratic polynomial $at^2+bt+c$ is minimized at the three time points $t_1$, $t_2$ and $t_3$ in a period in which the amplitude of the path deflection waveform $CP_j(t)$ is zero. Next, the measurement device 1 subtracts the quadratic polynomial $at^2+bt+c$ from the displacement waveform $U_j(t)$, as show in Equation (51), to calculate the displacement waveform $CU_j(t)$ obtained by correcting the displacement waveform $U_j(t)$. Therefore, according to the measurement method of the sixth embodiment, the measurement device 1 can estimate an integration error when the acceleration acting on the superstructure 7 by the vehicle 6 is integrated, and can accurately calculate the displacement waveform $CU_j(t)$ of the superstructure 7.

In the measurement method according to the sixth embodiment, the measurement device 1 calculates the amplitude ratio $r_j$ between the maximum amplitude value of the displacement waveform $CU_j(t)$ and the maximum amplitude value of the path deflection waveform $CP_j(t)$ in the integral interval, compares the displacement waveform $CU_j(t)$ and the displacement model waveform $UCP_j(t)$, and generates information indicating that the displacement waveform $CU_j(t)$ is abnormal if the error is not within the allowable range. Therefore, according to the measurement method of the sixth embodiment, for example, the server 2 that receives the displacement waveform $CU_j(t)$ calculated by the measurement device 1 can determine whether the displacement waveform $CU_j(t)$ is normal.

According to the measurement method of the sixth embodiment, since the measurement device 1 estimates the integration error by using the value of the displacement waveform $U_j(t)$ at the three time points $t_1$, $t_2$ and $t_3$ in a period in which the amplitude of the path deflection waveform $CP_j(t)$ is zero, that is, in a period in which no vehicle 6 travels on the path, the calculation amount is small, and the displacement waveform $U_j(t)$ can be corrected with high accuracy in an environment where the influence of the noise is small.

According to the measurement method of the sixth embodiment, since the measurement device 1 calculates the displacement waveform $CU_j(t)$ using the acceleration sensor that has a degree of freedom in installation higher than those of the displacement meter and the strain gauge, and that can be easily installed, the cost of the measurement system 10 can be reduced.

7. Seventh Embodiment

In the measurement methods according to the first to the sixth embodiments, since the approximate expression of the deflection of the superstructure 7 is set to be an equation based on the structural model of the superstructure 7, as shown in Equation (29), the normalized deflection amount $w_{std}$ differs in an interval in which the load position a is smaller than ½ and an interval in which the load position a is larger than ½. In contrast, in a measurement method according to a seventh embodiment, the approximate expression of the deflection of the superstructure 7 is approximated to an expression of a sinusoidal half-wave waveform in order to make the normalized deflection amount $w_{std}$ in the interval in which the load position a is smaller than ½ and the normalized deflection amount $w_{std}$ in the interval in which the load position a is larger than ½ the same. Hereinafter, in the seventh embodiment, the same components as those in the first embodiment to the sixth embodiment will be denoted by the same reference numerals, repetitive description as that in the first embodiment to the sixth embodiment will be omitted or simplified, and contents different from those in the first embodiment to the sixth embodiment will be mainly described.

In the present embodiment, the normalized deflection amount $w_{std}$ is indicated by Equation (134).

$$w_{std} = \frac{w}{w_{max}} = \sin\left(a\frac{\pi}{l}\right) \tag{134}$$

In Equation (134), since the load position a is in a range of $0 \leq a \leq 1$, the normalized deflection amount $w_{std}$ is approximated to a sine half wave according to Equation (134).

Figure 46:
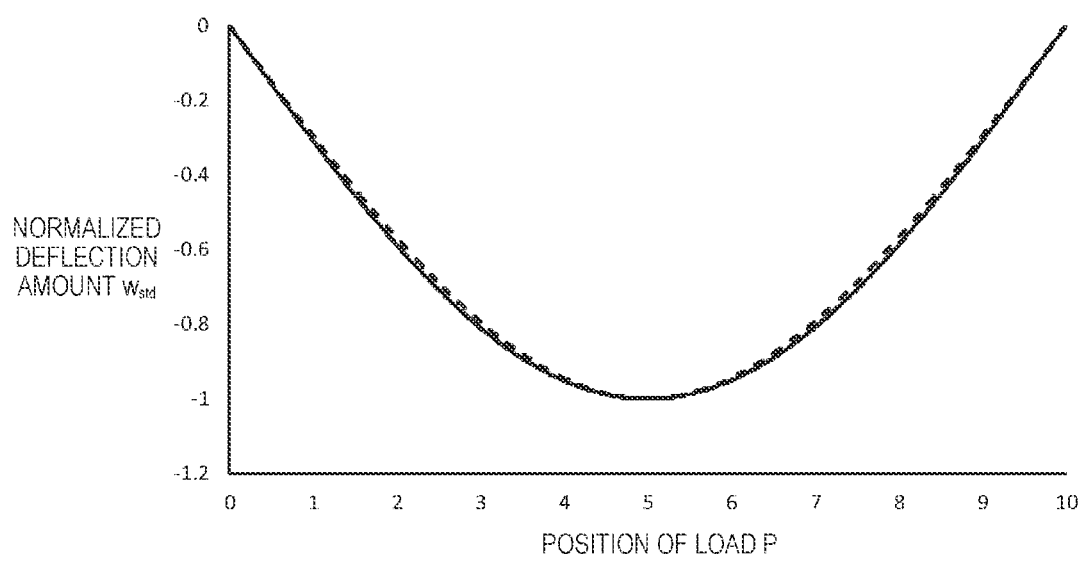
FIG. 46 is a diagram showing an example of a normalized deflection amount waveform according to a seventh embodiment.

FIG. 46 shows, by a solid line, an example of a waveform of the normalized deflection amount $w_{std}$ calculated according to Equation (134) in a case of the observation position $x = ½$. In FIG. 46, the horizontal axis represents a position of a load P, and the vertical axis represents the normalized deflection amount $w_{std}$. In the example in FIG. 46, a distance l between the fulcrums of the simple beam is 10. FIG. 46 shows, by a broken line, a waveform of the normalized deflection amount $w_{std}$ calculated according to Equation (29).

As shown in FIG. 46, the waveform of the normalized deflection amount $w_{std}$ calculated according to Equation (134) is similar to the waveform of the normalized deflection amount $w_{std}$ calculated according to Equation (29), and Equation (29) can be replaced by Equation (134). According to the replacement, Equation (39) can be replaced with Equation (135). Equation (135) is an equation normalized in a manner that the maximum value thereof is 1. Equation (135) is an approximate expression of the deflection of the superstructure 7 which is the structure, and is an expression of a sinusoidal half-wave waveform.

$$w_{std}(t) = \begin{cases} 0 & (\text{if } t < t_i) \\ \sin\left(a\frac{\pi}{l}\right) = \sin\left(\frac{t - t_i}{t_o - t_i}\pi\right) & (\text{if } t_i < t < t_o) \\ 0 & (\text{if } t < t_i) \end{cases} \tag{135}$$

According to Equation (135), Equation (44) can be replaced with Equation (136).

$$H_{jk}(t) = \begin{cases} 0 & \text{(if } t < t_i) \\ pa_{p_{jk}}\sin\left(a\frac{\pi}{l}\right) = pa_{p_{jk}}\sin\left(\frac{t-t_i}{t_o-t_i}\pi\right) & \text{(if } t_i < t < t_o) \\ 0 & \text{(if } t > t_o) \end{cases} \quad (136)$$

The deflection waveform calculation unit 113 calculates, according to Equation (136), the deflection waveform $H_{jk}(t)$ of the superstructure 7 generated by each axle of the vehicle 6 traveling on the lane L According to Equation (45), the path deflection waveform calculation unit 114 calculates the vehicle deflection waveform $CP_j(t)$ by adding the deflection waveforms $H_{jk}(t)$ calculated by the deflection waveform calculation unit 113, and calculates the path deflection waveform $CP_j(t)$ of the lane $L_j$ based on the vehicle deflection waveform $CP_{jm}(t)$.

Based on the path deflection waveform $CP_j(t)$ calculated by the path deflection waveform calculation unit 114, the displacement waveform correction unit 116 corrects the displacement waveform $U_j(t)$.

According to the measurement method of the seventh embodiment described above, similar as in the first embodiment and the sixth embodiment, the measurement device 1 can estimate the integration error when the acceleration acting on the superstructure 7 by the vehicle 6 is integrated and can accurately calculate the displacement waveform $CU_j(t)$ of the superstructure 7.

8. Modification

The present disclosure is not limited to the present embodiment, and various modifications can be made within the scope of the gist of the present disclosure.

In each of the embodiments described above, the polynomial approximating the integration error is a quadratic polynomial, but the polynomial approximating the integration error may also be a polynomial other than the quadratic polynomial. For example, the polynomial approximating the integration error may also be a polynomial of three orders or more in order to increase the approximating accuracy of the integration error.

In the above embodiments, the measurement device 1 calculates the displacement waveform $CU_j(t)$ according to Equation (51), Equation (66) or Equation (111), but the displacement waveform $CU_j(t)$ may also be converted into a load waveform according to a predetermined correlation expression. For example, a relationship between a load waveform $CW_j(t)$ and a displacement $x_j(t)$ at the observation point $R_j$ is represented by Equation (137). A primary coefficient Sc and a zero-order coefficient $Ic_j$ in Equation (137) are obtained by a load test performed on a plurality of vehicles.

$$CW_j(t) = Sc_j \cdot x_j(t) + Ic_j \quad (137)$$

Assuming that $Ic_j$ is sufficiently small in Equation (137), Equation (138) is obtained.

$$CW_j(t) = Sc_j \cdot x_j(t) \quad (138)$$

In Equation (138), the displacement x (t) is replaced with the displacement waveform $CU_j(t)$, and a correlation expression of the load waveform $CW_j(t)$ and the displacement waveform $CU_j(t)$ is Equation (139). The measurement device 1 can convert the displacement waveform $CU_j(t)$ into the load waveform $CW_j(t)$ according to the correlation Equation (139).

$$CW_j(t) = Sc_j \cdot CU_j(t) \quad (139)$$

In each of the above embodiments, the observation device that observes observation points $P_1$ to $P_N$ and the observation device that observes observation points $Q_1$ to $Q_N$ are acceleration sensors, but the present disclosure is not limited thereto. For example, the observation device may be an impact sensor, a microphone, a strain gauge, or a load cell. It is not necessary that the observation device and the observation point have a one-to-one correspondence, and one observation device may observe a part or all of the observation points $P_1$ to $P_N$ and $Q_1$ to $Q_N$.

The impact sensor detects an impact acceleration as a response to the action of each axle of the vehicle 6 on the observation points $P_1$ to $P_N$ and $Q_1$ to $Q_N$. The measurement device 1 acquires first observation point information based on the impact acceleration for the observation points $P_1$ to $P_N$, and acquires second observation point information based on the impact acceleration for the observation points $Q_1$ to $Q_N$. The microphone detects sound as a response to the action of each axle of the vehicle 6 on the observation points $P_1$ to $P_N$ and $Q_1$ to $Q_N$. The measurement device 1 acquires first observation point information based on the sound for the observation points $P_1$ to $P_N$, and acquires second observation point information based on the sound for the observation points $Q_1$ to $Q_N$. The strain gauge or the load cell detects a stress change as a response to the action of each axle of the vehicle 6 on the observation points $P_1$ to $P_N$ and $Q_1$ to $Q_N$. The measurement device 1 acquires first observation point information based on the stress change for the observation points $P_1$ to $P_N$, and acquires second observation point information based on the stress change for the observation points $Q_1$ to $Q_N$.

In each of the above embodiments, the direction in which the vehicle 6 travels on the lanes $L_1$ to $L_N$ is all the same. Alternatively, the traveling direction of the vehicle 6 may be different from at least one lane of the lanes $L_1$ to $L_N$ and other lanes. For example, the vehicle 6 may travel in a direction from the observation point $P_1$ to the observation point $Q_1$ on the lane $L_1$, and may travel in a direction from the observation point $Q_2$ to the observation point $P_2$ on the lane $L_2$. In this case, the measurement device 1 acquires the entry time of the vehicle 6 to the lane $L_1$ based on the acceleration data output from the sensor 21 that observes the observation point $P_1$, and acquires the exit time of the vehicle 6 from the lane $L_1$ based on the acceleration data output from the sensor 22 that observes the observation point $Q_1$. The measurement device 1 acquires the entry time of the vehicle 6 to the lane $L_2$ based on the acceleration data output from the sensor 22 that observes the observation point $Q_2$, and acquires the exit time of the vehicle 6 from the lane $L_2$ based on the acceleration data output from the sensor 21 that observes the observation point $P_2$.

In each of the above embodiments, the sensors 21, 22, and 23 are provided on the main girder G of the superstructure 7. Alternatively, the sensors may be provided on the surface or inside of the superstructure 7, a lower surface of the floor plate F, the bridge pier 8a, or the like. In each of the above embodiments, the road bridge is taken as an example of the bridge 5, but the present disclosure is not limited thereto. For example, the bridge 5 may be a railway bridge. In each of the above embodiments, the superstructure of the bridge is taken as an example of the structure, but the present disclosure is not limited thereto. The structure may be deformed by the movement of the moving object.

The embodiments and the modifications described above are merely examples, and the present disclosure is not limited thereto. For example, the embodiments and the modifications can be combined as appropriate.

The present disclosure includes a configuration substantially the same as the configuration described in the embodiments, for example, a configuration having the same function, method and result, or a configuration having the same purpose and effect. The present disclosure includes a configuration in which a non-essential portion of the configuration described in the embodiment is replaced. The present disclosure includes a configuration having the same action and effect as the configuration described in the embodiment, or a configuration capable of achieving the same object. The present disclosure includes a configuration in which a known technique is added to the configuration described in the embodiments.

What is claimed is:

1. A measurement method for causing a processor to execute a process, the method comprising executing on the processor the steps of:
acquiring first observation point information from a first acceleration sensor, the first acceleration sensor being disposed at a first observation point of a structure and detecting a first acceleration applied to the first observation point by each of a plurality of axles of a vehicle that moves along a path on the structure in a first direction above the first acceleration sensor, the first observation point information including a first time at which each of the plurality of axles of the vehicle passes the first observation point and the first acceleration relating to each of the plurality of axles of the vehicle;
acquiring second observation point information from a second acceleration sensor, the second acceleration sensor being disposed at a second observation point of the structure and detecting a second acceleration applied to the second observation point by each of the plurality of axles of the vehicle that moves along the path on the structure in the first direction above the second acceleration sensor, the second observation point information including a second time at which each of the plurality of axles of the vehicle passes the second observation point and the second acceleration relating to each of the plurality of axles of the vehicle, the structure having first and second ends outwardly opposite to each other along the first direction, the first observation point being located closer to the first end than the second observation point, the vehicle passing the first observation point earlier than the second observation point;
calculating a deflection waveform of the structure generated by each of the plurality of axles of the vehicle based on the first observation point information, the second observation point information, a predetermined coefficient, and a representative expression of deflection of the structure;
calculating a vehicle deflection waveform of the structure generated by the vehicle by adding the deflection waveform of the structure generated by each of the plurality of axles;
calculating a path deflection waveform of the path on the structure based on the vehicle deflection waveform;
acquiring third observation point information from a third acceleration sensor, the third acceleration sensor being disposed at a third observation point of the structure and detecting a third acceleration applied to the third observation point by each of the plurality of axles of the vehicle that moves along the path on the structure in the first direction above the third acceleration sensor, the third observation point information including the third acceleration relating to each of the plurality of axles of the vehicle, the third observation point being located between the first observation point and the second observation point along the first direction;
calculating a displacement waveform of the third observation point by twice integrating the acquired third acceleration;
calculating a value of each coefficient of a final quadratic polynomial representing an integration error when the third acceleration is twice integrated based on the path deflection waveform; and
correcting the displacement waveform based on the calculated value of each coefficient of the final quadratic polynomial.

2. The measurement method according to claim 1, wherein
the value of each coefficient of the polynomial is calculated assuming that a difference between the displacement waveform and the polynomial is representatively proportional to the path deflection waveform.

3. The measurement method according to claim 2, wherein
a value of a proportional coefficient and the value of each coefficient of the polynomial are calculated by a least square method, such that a difference between a waveform obtained by multiplying the proportional coefficient by the path deflection waveform and a waveform obtained by subtracting the polynomial from the displacement waveform is minimized.

4. The measurement method according to claim 2, wherein
the polynomial is a quadratic polynomial in which a value of a primary term coefficient and a value of a zero-order term coefficient are zero, and
a value of a proportional coefficient and a value of a secondary term coefficient of the polynomial are calculated by a least square method, such that a difference between a waveform obtained by multiplying the proportional coefficient by the path deflection waveform and a waveform obtained by subtracting the polynomial from the displacement waveform is minimized.

5. The measurement method according to claim 2, wherein
a value of each coefficient of a first quadratic polynomial is calculated, such that a waveform obtained by adding the first quadratic polynomial to a first difference between a waveform obtained by multiplying a first proportional coefficient and the path deflection waveform and the displacement waveform is minimized,
a value of each coefficient of a second quadratic polynomial is calculated, such that a waveform obtained by adding the second quadratic polynomial to a second difference between a waveform obtained by multiplying a second proportional coefficient and the path deflection waveform and the displacement waveform is minimized,
a first sum of values, each being obtained by adding the first difference to a secondary term of the first quadratic polynomial, in a period in which the displacement waveform is calculated is calculated,
a second sum of values, each being obtained by adding the second difference to a secondary term of the second quadratic polynomial, in a period in which the displacement waveform is calculated is calculated, a third proportional coefficient at which a sum is 0 is calculated based on a relationship of the first proportional coefficient, the second proportional coefficient, the first sum, and the second sum, and the value of each coefficient of the final quadratic polynomial is calculated, such that a waveform obtained by adding the final quadratic polynomial to a third difference between a waveform obtained by multiplying the third proportional coefficient and the path deflection waveform and the displacement waveform is minimized, and the displacement waveform is corrected based on the value of each of the coefficients of the final quadratic polynomial.

6. The measurement method according to claim 2, wherein a value of each coefficient of a first quadratic polynomial is calculated, such that a waveform obtained by adding the first quadratic polynomial to a first difference between a waveform obtained by multiplying a first proportional coefficient and the path deflection waveform and the displacement waveform is minimized, a value of each coefficient of a second quadratic polynomial is calculated, such that a waveform obtained by adding the second quadratic polynomial to a second difference between a waveform obtained by multiplying a second proportional coefficient and the path deflection waveform and the displacement waveform is minimized, a first sum of values, each being obtained by adding a first difference to a first quadratic polynomial, in a period in which an amplitude of the path deflection waveform is not zero is calculated, a second sum of values, each being obtained by adding a second difference to a second quadratic polynomial, in a period in which an amplitude of the path deflection waveform is not zero is calculated, a third proportional coefficient at which a sum is 0 is calculated based on a relationship of the first proportional coefficient, the second proportional coefficient, the first sum, and the second sum, and the value of each coefficient of the final quadratic polynomial is calculated, such that a waveform obtained by adding the final quadratic polynomial to a third difference between a waveform obtained by multiplying the third proportional coefficient and the path deflection waveform and the displacement waveform is minimized, and the displacement waveform is corrected based on the value of each of the coefficients of the final quadratic polynomial.

7. The measurement method according to claim 1, wherein the polynomial is a quadratic polynomial, and the value of each coefficient of the polynomial is calculated such that a difference between the displacement waveform and the polynomial is minimized in a period in which an amplitude of the path deflection waveform is zero.

8. The measurement method according to claim 1, wherein each of the first, second, and third accelerations is acquired in a direction intersecting a surface of the path on the structure on which the vehicle moves.

9. The measurement method according to claim 1, wherein the representative expression of deflection of the structure is an expression based on a structural model of the structure.

10. The measurement method according to claim 9, wherein the structural model is a simple beam whose both ends are supported.

11. The measurement method according to claim 1, wherein the representative expression of deflection of the structure is an expression normalized by a maximum amplitude of deflection at a central position between the first observation point and the second observation point.

12. The measurement method according to claim 1, wherein the representative expression of deflection of the structure is an expression of a sinusoidal half-wave waveform.

13. The measurement method according to claim 1, wherein the structure is a superstructure of a bridge, the superstructure is a structure across any one of a bridge abutment and a bridge pier adjacent to each other, two adjacent bridge abutments, or two adjacent bridge piers, both end portions of the superstructure are located at positions of the bridge abutment and the bridge pier adjacent to each other, at positions of the two adjacent bridge abutments, or at positions of the two adjacent bridge piers, and the bridge is a road bridge or a railway bridge.

14. The measurement method according to claim 1, wherein the first observation point is set at the first end of the structure, and the second observation point is set at the second end of the structure.

15. The measurement method according to claim 1, wherein the vehicle is a railway vehicle, an automobile, a tram, a construction vehicle, or a military vehicle.

16. The measurement method according to claim 1, wherein the structure is a structure in which bridge weigh in motion (BWIM) functions.

17. A measurement device comprising:

a memory configured to store a program; and a processor configured to execute the program so as to:

acquire first observation point information from a first acceleration sensor, the first acceleration sensor being disposed at a first observation point of a structure and detecting a first acceleration applied to the first observation point by each of a plurality of axles of a vehicle that moves along a path on the structure in a first direction above the first acceleration sensor, the first observation point information including a first time at which each of the plurality of axles of the vehicle passes the first observation point and the first acceleration relating to each of the plurality of axles of the vehicle;

acquire second observation point information from a second acceleration sensor, the second acceleration sensor being disposed at a second observation point of the structure and detecting a second acceleration applied to the second observation point by each of the plurality of axles of the vehicle that moves along the path on the structure in the first direction above the second acceleration sensor, the second observation point information including a second time at which each of the plurality of axles of the vehicle passes the second observation point and the second acceleration relating to each of the plurality of axles of the vehicle, the structure having first and second ends outwardly opposite to each other along the first direction, the first observation point being located closer to the first end than the second observation point, the vehicle passing the first observation point earlier than the second observation point;

calculate a deflection waveform of the structure generated by each of the plurality of axles of the vehicle based on the first observation point information, the second observation point information, a predetermined coefficient, and a representative expression of deflection of the structure;

calculate a vehicle deflection waveform of the structure generated by the vehicle by adding the deflection waveform of the structure generated by each of the plurality of axles;

calculate a path deflection waveform of the path on the structure based on the vehicle deflection waveform;

acquire third observation point information from a third acceleration sensor, the third acceleration sensor being disposed at a third observation point of the structure and detecting a third acceleration applied to the third observation point by each of the plurality of axles of the vehicle that moves along the path on the structure in the first direction above the third acceleration sensor, the third observation point information including the third acceleration relating to each of the plurality of axles of the vehicle, the third observation point being located between the first observation point and the second observation point along the first direction;

calculate a displacement waveform of the third observation point by twice integrating the acquired third acceleration;

calculate a value of each coefficient of a final quadratic polynomial representing an integration error when the third acceleration is twice integrated based on the path deflection waveform; and correct the displacement waveform based on the calculated value of each coefficient of the final quadratic polynomial.

18. A measurement system comprising:
the measurement device according to claim 17;
the first acceleration sensor configured to detect the first acceleration applied to the first observation point;
the second acceleration sensor configured to detect the second acceleration applied to the second observation point; and
the third acceleration sensor configured to detect the third acceleration applied to the third observation point.

19. A non-transitory computer-readable medium storing a measurement program for causing a computer to execute a process by a processor so as to perform the steps of:

acquiring first observation point information from a first acceleration sensor, the first acceleration sensor being disposed at a first observation point of a structure and detecting a first acceleration applied to the first observation point by each of a plurality of axles of a vehicle that moves along a path on the structure in a first direction above the first acceleration sensor, the first observation point information including a first time at which each of the plurality of axles of the vehicle passes the first observation point and the first acceleration relating to each of the plurality of axles of the vehicle;

acquiring second observation point information from a second acceleration sensor, the second acceleration sensor being disposed at a second observation point of the structure and detecting a second acceleration applied to the second observation point by each of the plurality of axles of the vehicle that moves along the path on the structure in the first direction above the second acceleration sensor, the second observation point information including a second time at which each of the plurality of axles of the vehicle passes the second observation point and the second acceleration relating to each of the plurality of axles of the vehicle, the structure having first and second ends outwardly opposite to each other along the first direction, the first observation point being located closer to the first end than the second observation point, the vehicle passing the first observation point earlier than the second observation point;

calculating a deflection waveform of the structure generated by each of the plurality of axles of the vehicle based on the first observation point information, the second observation point information, a predetermined coefficient, and a representative expression of deflection of the structure;

calculating a vehicle deflection waveform of the structure generated by the vehicle by adding the deflection waveform of the structure generated by each of the plurality of axles;

calculating a path deflection waveform of the path on the structure based on the vehicle deflection waveform;

acquiring third observation point information from a third acceleration sensor, the third acceleration sensor being disposed at a third observation point of the structure and detecting a third acceleration applied to the third observation point by each of the plurality of axles of the vehicle that moves along the path on the structure in the first direction above the third acceleration sensor, the third observation point information including the third acceleration relating to each of the plurality of axles of the vehicle, the third observation point being located between the first observation point and the second observation point along the first direction;

calculating a displacement waveform of the third observation point by twice integrating the acquired third acceleration;

calculating a value of each coefficient of a final quadratic polynomial representing an integration error when the third acceleration is twice integrated based on the path deflection waveform; and correcting the displacement waveform based on the calculated value of each coefficient of the final quadratic polynomial.

* * * * *